United States Patent
Komatsu et al.

(10) Patent No.: US 11,169,464 B2
(45) Date of Patent: Nov. 9, 2021

(54) ELECTROPHOTOGRAPHIC MEMBER, PROCESS CARTRIDGE, AND ELECTROPHOTOGRAPHIC IMAGE-FORMING APPARATUS

(71) Applicant: CANON KABUSHIKI KAISHA, Tokyo (JP)

(72) Inventors: Hiroaki Komatsu, Fuji (JP); Masaki Yamada, Numazu (JP); Hideya Arimura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 357 days.

(21) Appl. No.: 16/522,067

(22) Filed: Jul. 25, 2019

(65) Prior Publication Data
US 2020/0033742 A1    Jan. 30, 2020

(30) Foreign Application Priority Data

Jul. 30, 2018 (JP) .............................. JP2018-142811

(51) Int. Cl.
*G03G 15/08* (2006.01)
*C08G 18/08* (2006.01)
*C08K 3/36* (2006.01)
*G03G 15/02* (2006.01)

(52) U.S. Cl.
CPC ..... *G03G 15/0808* (2013.01); *C08G 18/0809* (2013.01); *C08K 3/36* (2013.01); *G03G 15/0233* (2013.01)

(58) Field of Classification Search
CPC ........... G03G 15/0233; G03G 15/0808; C08G 18/0809; C08K 3/36
See application file for complete search history.

(56) References Cited

U.S. PATENT DOCUMENTS

| | | | |
|---|---|---|---|
| 7,797,833 B2 | 9/2010 | Nakamura et al. |
| 7,799,398 B2 | 9/2010 | Nakamura et al. |
| 8,600,273 B2 | 12/2013 | Kamada et al. |
| 8,655,222 B2 | 2/2014 | Nakamura et al. |
| 8,706,011 B2 | 4/2014 | Anan et al. |
| 8,768,226 B2 | 7/2014 | Koyanagi et al. |
| 8,768,227 B2 | 7/2014 | Urushihara et al. |
| 8,774,677 B2 | 7/2014 | Sakurai et al. |

(Continued)

FOREIGN PATENT DOCUMENTS

| | | |
|---|---|---|
| JP | S57-5047 | 1/1982 |
| JP | 2003-107825 | 4/2003 |

(Continued)

OTHER PUBLICATIONS

U.S. Appl. No. 16/378,939, Hideya Arimura, filed Apr. 9, 2019.
U.S. Appl. No. 16/516,763, Hideya Arimura, filed Jul. 9, 2019.

*Primary Examiner* — Hoang X Ngo
(74) *Attorney, Agent, or Firm* — Venable LLP

(57) ABSTRACT

Provided is an electrophotographic member that shows a small increase in electrical resistance value even when used under a low-temperature environment. The electrophotographic member is an electrophotographic member including an electroconductive substrate and a resin layer on the electroconductive substrate, wherein the resin layer contains an anion, inorganic particles having a hydrophobicity degree of 40% or more and 80% or less, and a resin having a specific cation structure.

10 Claims, 5 Drawing Sheets

(56) References Cited

U.S. PATENT DOCUMENTS

| | | |
|---|---|---|
| 8,798,508 B2 | 8/2014 | Kamada et al. |
| 8,837,985 B2 | 9/2014 | Ishida et al. |
| 8,846,287 B2 | 9/2014 | Kamada et al. |
| 8,874,007 B2 | 10/2014 | Kawamura et al. |
| 8,874,012 B2 | 10/2014 | Kamada et al. |
| 8,913,930 B2 | 12/2014 | Ishii et al. |
| 9,581,931 B2 | 2/2017 | Yamada et al. |
| 9,599,913 B2 | 3/2017 | Nishioka et al. |
| 9,639,009 B2 | 5/2017 | Yamaguchi et al. |
| 9,665,028 B2 | 5/2017 | Arimura et al. |
| 9,811,009 B2 | 11/2017 | Yamada et al. |
| 9,964,914 B2 | 5/2018 | Arimura et al. |
| 9,977,353 B2 | 5/2018 | Nishioka et al. |
| 9,977,359 B2 | 5/2018 | Koyanagi et al. |
| 10,018,934 B2 | 7/2018 | Yamada et al. |
| 10,108,129 B2 | 10/2018 | Yamaguchi et al. |
| 10,197,930 B2 | 2/2019 | Yamada et al. |
| 10,303,079 B2 * | 5/2019 | Utsuno .............. G03G 5/14791 |
| 10,331,054 B2 * | 6/2019 | Urushihara ........ G03G 15/0233 |
| 10,379,460 B2 | 8/2019 | Arimura et al. |
| 2015/0331342 A1 | 11/2015 | Yamaguchi et al. |
| 2015/0331346 A1 | 11/2015 | Yamaguchi et al. |
| 2016/0363881 A1 | 12/2016 | Urushihara et al. |
| 2019/0094741 A1 | 3/2019 | Uno et al. |
| 2019/0302644 A1 | 10/2019 | Tamada et al. |

FOREIGN PATENT DOCUMENTS

| | | |
|---|---|---|
| JP | 2004-004147 | 1/2004 |
| JP | 2007-321115 | 12/2007 |
| JP | 2011-118113 | 6/2011 |

\* cited by examiner

ELECTROPHOTOGRAPHIC MEMBER, PROCESS CARTRIDGE, AND ELECTROPHOTOGRAPHIC IMAGE-FORMING APPARATUS

BACKGROUND OF THE INVENTION

Field of the Invention

The present disclosure relates to an electrophotographic member and a process cartridge to be used in an electrophotographic image-forming apparatus, and an electrophotographic image-forming apparatus.

Description of the Related Art

In an electrophotographic image-forming apparatus, electrophotographic members each including an electroconductive layer having an electrical resistance value (hereinafter referred to as "resistance value") of, for example, from $1×10^5 \Omega$ to $1×10^9 \Omega$ have been used as electrophotographic members, such as a developing roller, a charging member, a toner-supplying roller, a cleaning blade, and a developing blade. In Japanese Patent Application Laid-Open No. 2011-118113, there is a description of an electroconductive roller obtained by curing an ionic liquid having a specific cation structure, a polyol, and a polyisocyanate.

The electrophotographic image-forming apparatus has been required to be capable of stably forming an excellent electrophotographic image even under a severe environment. According to an investigation by the inventors, the resistance value of the electroconductive roller according to Japanese Patent Application Laid-Open No. 2011-118113 may increase particularly in a low-temperature environment having a temperature of, for example, 0° C.

SUMMARY OF THE INVENTION

One embodiment of the present disclosure is directed to providing an electrophotographic member that shows a small increase in resistance value even under a low-temperature environment having a temperature of, for example, 0° C. In addition, another embodiment of the present disclosure is directed to providing an electrophotographic image-forming apparatus that can stably output a high-quality electrophotographic image, and a process cartridge to be used in the apparatus.

According to one embodiment of the present disclosure, there is provided an electrophotographic member including: an electroconductive substrate; and a resin layer on the electroconductive substrate, wherein the resin layer contains: an anion, inorganic particles wherein a hydrophobicity degree calculated from the inorganic particles extracted from the resin layer is 40% or more and 80% or less, and a resin having at least one cation structure selected from the group consisting of structures represented by the structural formulae (1) to (6):

Structural formula (1)

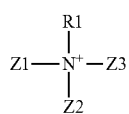

in the structural formula (1), R1 represents a hydrogen atom or a hydrocarbon group having 1 to 4 carbon atoms, Z1 to Z3 each independently represent any one structure selected from the group consisting of structures represented by the structural formulae (Z101) to (Z103), or a hydrocarbon group having 1 to 4 carbon atoms, and at least one of Z1 to Z3 represents any one structure selected from the group consisting of the structures represented by the structural formulae (Z101) to (Z103);

Structural formula (2)

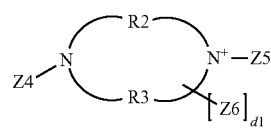

in the structural formula (2), R2 and R3 each represent a hydrocarbon group needed for forming a nitrogen-containing heteroaromatic five-membered ring together with nitrogen atoms to which the hydrocarbon group is bonded, Z4 and Z5 each independently represent any one structure selected from the group consisting of the structures represented by the structural formulae (Z101) to (Z103), a hydrogen atom, or a hydrocarbon group having 1 to 4 carbon atoms, and Z6 represents any one structure selected from the group consisting of the structures represented by the structural formulae (Z101) to (Z103), a hydrogen atom, or a hydrocarbon group having 1 to 4 carbon atoms, at least one of Z4 to Z6 represents any one structure selected from the group consisting of the structures represented by the structural formulae (Z101) to (Z103), and d1 represents an integer of 0 or 1;

Structurual formula (3)

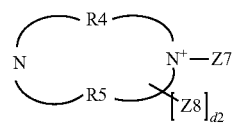

in the structural formula (3), R4 and R5 each represent a hydrocarbon group needed for forming a nitrogen-containing heteroaromatic six-membered ring together with nitrogen atoms to which the hydrocarbon group is bonded, Z7 represents any one structure selected from the group consisting of the structures represented by the structural formulae (Z101) to (Z103), a hydrogen atom, or a hydrocarbon group having 1 to 4 carbon atoms, Z8 represents any one structure selected from the group consisting of the structures represented by the structural formulae (Z101) to (Z103), a hydrogen atom, or a hydrocarbon group having 1 to 4 carbon atoms, at least one of Z7 or Z8 represents any one structure selected from the group consisting of the structures represented by the structural formulae (Z101) to (Z103), and d2 represents an integer of from 0 to 2, and when d2 represents 2, Z8s may be identical to or different from each other;

Structurual formula (4)

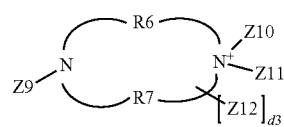

in the structural formula (4), R6 and R7 each represent a hydrocarbon group needed for forming a nitrogen-containing heteroalicyclic group together with nitrogen atoms to which the hydrocarbon group is bonded, Z9 to Z11 each independently represent any one structure selected from the group consisting of the structures represented by the structural formulae (Z101) to (Z103), a hydrogen atom, or a hydrocarbon group having 1 to 4 carbon atoms, Z12 represents any one structure selected from the group consisting of the structures represented by the structural formulae (Z101) to (Z103), a hydrogen atom, or a hydrocarbon group having 1 to 4 carbon atoms, at least one of Z9 to Z12 represents any one structure selected from the group consisting of the structures represented by the structural formulae (Z101) to (Z103), and d3 represents an integer of from 0 to 2, and when d3 represents 2, Z12s may be identical to or different from each other;

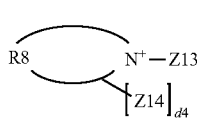

Structural formula (5)

in the structural formula (5), R8 represents a hydrocarbon group needed for forming a nitrogen-containing aromatic ring together with a nitrogen atom to which the hydrocarbon group is bonded, Z13 represents any one structure selected from the group consisting of the structures represented by the structural formulae (Z101) to (Z103), a hydrogen atom, or a hydrocarbon group having 1 to 4 carbon atoms, Z14 represents any one structure selected from the group consisting of the structures represented by the structural formulae (Z101) to (Z103), a hydrogen atom, or a hydrocarbon group having 1 to 4 carbon atoms, at least one of Z13 or Z14 represents any one structure selected from the group consisting of the structures represented by the structural formulae (Z101) to (Z103), and d4 represents an integer of 0 or 1;

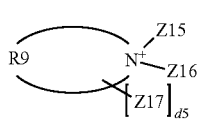

Structural formula (6)

in the structural formula (6), R9 represents a hydrocarbon group needed for forming a nitrogen-containing alicyclic group together with a nitrogen atom to which the hydrocarbon group is bonded, Z15 and Z16 each independently represent any one structure selected from the group consisting of the structures represented by the structural formulae (Z101) to (Z103), a hydrogen atom, or a hydrocarbon group having 1 to 4 carbon atoms, Z17 represents any one structure selected from the group consisting of the structures represented by the structural formulae (Z101) to (Z103), a hydrogen atom, or a hydrocarbon group having 1 to 4 carbon atoms, at least one of Z15 to Z17 represents any one structure selected from the group consisting of the structures represented by the structural formulae (Z101) to (Z103), and d5 represents an integer of 0 or 1;

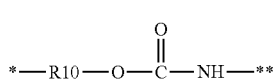

Structural formula (Z101)

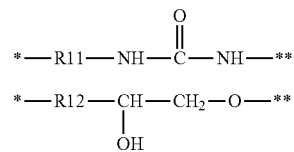

Structural formula (Z102)

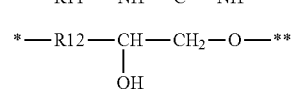

Structural formula (Z103)

in the structural formulae (Z101), (Z102), and (Z103), R10, R11, and R12 each independently represent a linear or branched divalent hydrocarbon group, symbol "*" represents a bonding site with a nitrogen atom in the structural formula (1), or a bonding site with a nitrogen atom in a nitrogen-containing heterocycle in any one of the structural formulae (2) to (6) or with a carbon atom in the nitrogen-containing heterocycle, and symbol "**" represents a bonding site with a carbon atom in a polymer chain forming the resin having the cation structure.

In addition, according to one embodiment of the present disclosure, there is provided a process cartridge removably mounted onto the main body of an electrophotographic image-forming apparatus, the process cartridge including the above-mentioned electrophotographic member.

Further, according to another embodiment of the present disclosure, there is provided an electrophotographic image-forming apparatus including the above-mentioned electrophotographic member.

Further features of the present disclosure will become apparent from the following description of exemplary embodiments with reference to the attached drawings.

DESCRIPTION OF THE EMBODIMENTS (1) Electrophotographic Member

An electrophotographic member according to one embodiment of the present disclosure includes an electroconductive substrate and an electroconductive resin layer on the electroconductive substrate.

Figure 1A:
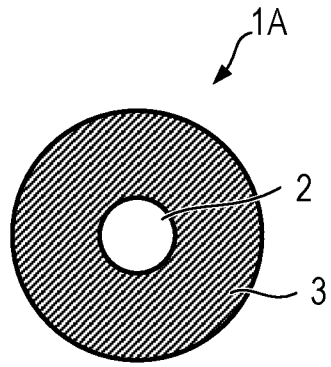
FIG. 1A, FIG. 1B, and FIG. 1C are each a schematic sectional view of an electrophotographic member according to one embodiment of the present disclosure.
Figure 1B:
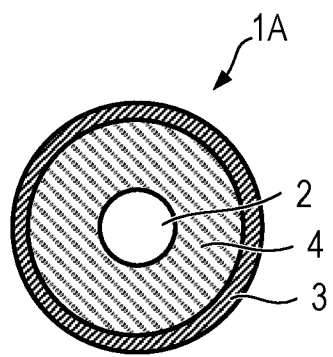

An electrophotographic member having a roller shape (hereinafter sometimes referred to as "electrophotographic roller") is illustrated as an example of the electrophotographic member in each of FIG. 1A to FIG. 1C. An electrophotographic roller 1A illustrated in FIG. 1A includes an electroconductive substrate 2 and an electroconductive resin layer 3 arranged on the outer periphery of the electroconductive substrate 2. As illustrated in FIG. 1B, an elastic layer 4 may be further arranged between the substrate 2 and the resin layer 3.

Figure 1C:
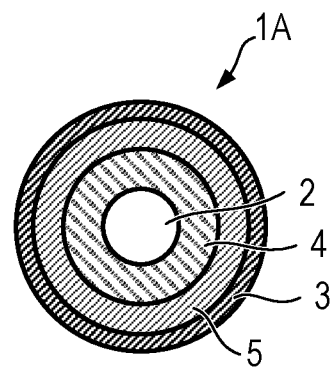

In addition, the electrophotographic roller 1A may have a three-layer structure in which an intermediate layer 5 is arranged between the elastic layer 4 and the resin layer 3 as illustrated in FIG. 1C, or may have a multi-layer configuration in which a plurality of intermediate layers 5 are arranged. In the electrophotographic roller 1A, in order for the electrophotographic member according to one embodiment of the present disclosure to more effectively exhibit an effect of the present disclosure, it is preferred that the resin layer 3 be present as the outermost layer of the electrophotographic roller 1A as illustrated in FIG. 1A to FIG. 1C. In addition, the electrophotographic roller 1A preferably includes the elastic layer 4.

The layer configuration of the electrophotographic roller 1A is not limited to the layer configuration in which the resin layer 3 is present as the outermost layer of the electrophotographic roller 1A. Examples of the electrophotographic roller 1A include: one including the substrate 2 and the electroconductive resin layer 3 arranged on the outer periphery of the substrate 2 and further including a surface layer on the resin layer 3; and one including another resin layer 3 as the intermediate layer 5.

Figure 2A:
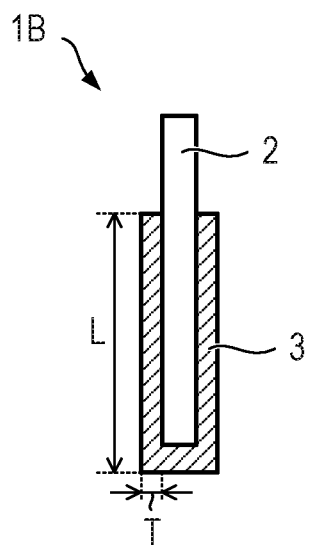
FIG. 2A and FIG. 2B are each a schematic sectional view for illustrating an electrophotographic blade according to one embodiment of the present disclosure.
Figure 2B:
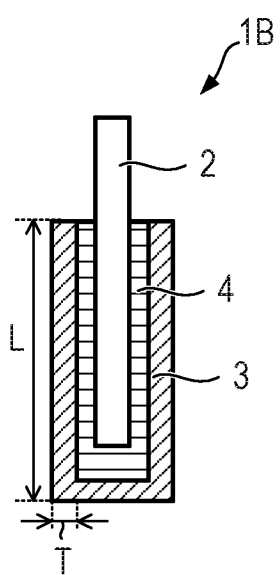

In addition, an electrophotographic member having a blade shape (hereinafter sometimes referred to as "electrophotographic blade") is given as another example of the electrophotographic member. FIG. 2A and FIG. 2B are each a schematic sectional view of an electrophotographic blade 1B. The electrophotographic blade 1B illustrated in FIG. 2A includes the electroconductive substrate 2 and the electroconductive resin layer 3 arranged on the outer periphery thereof. In the electrophotographic blade 1B illustrated in FIG. 2B, the elastic layer 4 is further arranged between the substrate 2 and the resin layer 3.

The electrophotographic member may be used for each of a developing roller, a charging roller, a toner-supplying roller, a developing blade, and a cleaning blade. In particular, the electrophotographic member may be suitably used as each of a developing roller, a developing blade, a charging roller, and a toner-supplying roller. Now, the configuration of the electrophotographic member according to one embodiment of the present disclosure is described in detail.

<Substrate>

The substrate 2 functions as a support member for the electrophotographic member, and in some cases, as an electrode. The substrate 2 is formed of an electroconductive material, such as: a metal or an alloy like aluminum, a copper alloy, or stainless steel; iron subjected to plating treatment with chromium or nickel; or a synthetic resin having electroconductivity. When the electrophotographic member has a roller shape, the substrate 2 has a solid columnar shape or a hollow cylindrical shape. When the electrophotographic member has a blade shape, the substrate 2 has a thin-plate shape.

<Elastic Layer>

The elastic layer 4 is configured to impart, particularly when the electrophotographic member is an electrophotographic roller 1A, elasticity needed for forming a nip having a predetermined width in an abutting portion between the electrophotographic roller 1A and a photosensitive member, to the electrophotographic roller 1A. It is preferred that the elastic layer 4 contain a rubber material. Examples of the rubber material include an ethylene-propylene-diene copolymerized rubber, an acrylonitrile-butadiene rubber, a chloroprene rubber, a natural rubber, an isoprene rubber, a styrene-butadiene rubber, a fluororubber, a silicone rubber, an epichlorohydrin rubber, and a urethane rubber. Those materials may be used alone or as a mixture thereof. Of those, a silicone rubber is preferred from the viewpoints of compression set and flexibility. The silicone rubber is, for example, a cured product of an addition-curable silicone rubber.

As a method of forming the elastic layer 4, there is given a method involving mold molding of a liquid rubber material, or a method involving extrusion molding of a kneaded rubber material. The thickness of the elastic layer is preferably 0.3 mm or more and 4.0 mm or less.

An electroconductivity-imparting agent is appropriately blended into the elastic layer 4 in order to impart electroconductivity. Fine particles of carbon black, of an electroconductive metal, such as aluminum or copper, or of an electroconductive metal oxide, such as tin oxide or titanium oxide, may be used as the electroconductivity-imparting agent. Of those, carbon black is preferred because the carbon black is relatively easily available and provides good electroconductivity. When the carbon black is used as the electroconductivity-imparting agent, the carbon black is preferably blended in an amount of from 2 parts by mass to 50 parts by mass with respect to 100 parts by mass of the rubber material.

Various additives, such as a non-electroconductive filler, a crosslinking agent, and a catalyst, may be each appropriately blended into the elastic layer 4. Examples of the non-electroconductive filler include silica, quartz powder, titanium oxide, and calcium carbonate. Examples of the crosslinking agent include di-t-butyl peroxide, 2,5-dimethyl-2,5-di(t-butylperoxy)hexane, and dicumyl peroxide. An example of the catalyst is a platinum catalyst.

<Resin Layer>

The resin layer 3 contains a resin having at least one cation structure selected from the group consisting of structures represented by the structural formulae (1) to (6), an anion, and inorganic particles having a hydrophobicity degree of 40% or more and 80% or less.

The resin is obtained by, for example, causing an ionic compound having a structure corresponding to a structure represented by any one of the structural formulae (1) to (6), and having at least one group selected from the group consisting of a hydroxy group, an amino group, and a glycidyl group, and at least one of a polyol or a polyisocyanate to react with each other.

The resin functions as a carrier for the anion responsible for electroconductivity. The resin layer 3 may contain a resin different from the resin having the cation structure.

The inventors have assumed the reason why the electrophotographic member according to one embodiment of the present disclosure exhibits a suppressing effect on an increase in resistance value thereof even under a low-temperature environment at about 0° C. to be as described below.

When a voltage is applied to the electrophotographic member, the anion in the resin layer migrates in the resin layer. During the application of the voltage, the anion stays at its destination, and hence the anion is unevenly distributed in the resin layer. The total amount of the anion present in the resin layer is constant. Accordingly, as a state in which the voltage is applied continues, the amount of the anion that can migrate in the resin layer reduces. As a result, the resistance value increases with time.

Meanwhile, when the application of the voltage to the electrophotographic member ends, the anion unevenly distributed in the resin layer diffuses to reduce the resistance value that has increased once. However, the diffusion of the anion after the end of the voltage application requires time longer than that of the migration of the anion during the voltage application. Accordingly, when a voltage is applied again before the state of presence of the anion in the resin layer returns to a state before the voltage application, the resistance value of the electrophotographic member increases.

Particularly under a low-temperature environment having a temperature of, for example, 0° C., molecular mobility reduces, and hence the resin serving as a carrier for the anion expresses crystallinity. Accordingly, a reduction in resistance value by the inhibition of the diffusion of the anion after the end of the voltage application may be inhibited.

The resin layer of the electrophotographic member generally contains inorganic particles that are untreated or subjected to hydrophilic treatment from the viewpoint of dispersibility, the particles being made of, for example, silica, quartz powder, titanium oxide, zinc oxide, or calcium carbonate, as a filler. When those inorganic particles are added to a paint for forming the resin layer, the particles exhibit a function as a film-forming aid or a reinforcing material at the time of coating with the paint in a formation process for the resin layer. Meanwhile, as a result of an investigation by the inventors, it has been found that such inorganic particles that are untreated or subjected to the hydrophilic treatment promote the inhibition of a reduction in resistance value of the electrophotographic member due to the inhibition of the diffusion of the anion in the resin layer occurring under a low-temperature environment at, for example, 0° C. Functional groups each having relatively high polarity are present on the surfaces of the inorganic particles that are untreated or subjected to the hydrophilic treatment, and the functional groups each having relatively high polarity, that is, functional groups each having electrical bias may interact with the negatively charged anion to inhibit the mobility of the anion. As a result, an increase in resistance value of the electrophotographic member due to the inhibition of the re-diffusion of the anion may occur.

In one embodiment of the present disclosure, in view of the result of the investigation, the inorganic particles having a hydrophobicity degree of 40% or more that were poor in dispersibility were used in the resin layer. Thus, the suppression of an increase in resistance value of the electrophotographic member under a low-temperature environment at, for example, 0° C. was achieved. When the inorganic particles having a hydrophobicity degree of 40% or more, that is, inorganic particles whose surface functional groups are each reduced in polarity are used as the filler, the number of the surface functional groups that strongly interact with the anion is reduced, and hence the inhibition of the re-diffusion of the anion is suppressed. The inventors have assumed that, as a result of the foregoing, the inventors have succeeded in suppressing a remarkable increase in resistance value particularly under a low-temperature environment at, for example, 0° C. Meanwhile, when the hydrophobicity degree of the inorganic particles is more than 80%, a difference in polarity between the particles and the resin having the cation structure to be incorporated into the resin layer 3 of the electrophotographic member becomes larger to cause the aggregation of the inorganic particles. The anion serving as an ion carrier cannot be present in a portion where the inorganic particles have aggregated, and hence portions where the anion is sparsely and densely present may occur. It is assumed that, as a result of the foregoing, an increase in resistance value becomes remarkable in the portion where the inorganic particles have aggregated.

The resin in the resin layer 3 of the electrophotographic member according to one embodiment of the present disclosure preferably further has at least one structure selected from the group consisting of structures represented by the following structural formulae (7) to (9) together with the above-mentioned cation structure:

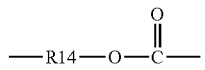
Structural formula (7)

in the structural formula (7), R13 represents a linear or branched divalent hydrocarbon group having 4 to 6 carbon atoms;

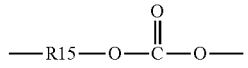
Structural formula (8)

in the structural formula (8), R14 represents a linear or branched divalent hydrocarbon group having 4 to 8 carbon atoms;

$$-R15-O-\overset{O}{\underset{\|}{C}}-O-$$
Structural formula (9)

in the structural formula (9), R15 represents a linear or branched divalent hydrocarbon group having 5 to 8 carbon atoms.

It has been found that any such structure improves the dispersibility of the filler, reduces the tackiness of the surface of the resin layer, and reduces toner sticking. The inventors have assumed the reason why such effects are exhibited to be as described below. That is, the portion of the structure represented by any one of the structural formulae (7) to (9) in the resin has relatively low polarity in the resin, and hence an affinity between the portion and the inorganic particles having a hydrophobicity degree of 40% or more and 80% or less may be improved. Probably as a result of the foregoing, the inorganic particles easily enter the polymer chain of the resin, and hence the aggregation of the inorganic particles in the resin layer can be suppressed. When the aggregation of the inorganic particles is suppressed, the number of regions where the inorganic particles are microscopically absent reduces in the resin layer, and hence the tackiness of the surface of the resin layer 3 may reduce.

[Resin]

The resin to be incorporated into the resin layer 3 has a cation structure obtained by causing an ionic compound having at least one group derived from a hydroxy group, an amino group, or a glycidyl group, and a binder resin to react with each other. A urethane resin obtained by causing a compound except the ionic compound, preferably a polyol and a polyisocyanate to react with each other is preferably used as the binder resin. In addition, the polymer chain of the urethane resin preferably has at least one structure out of the structures represented by the structural formulae (7) to (9).

(Cation Structure)

The ionic compound has at least one cation structure selected from the group consisting of the structures represented by the structural formulae (1) to (6). The respective structures represented by the structural formulae (1) to (6) are described below.

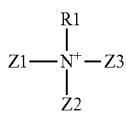

Structural formula (1)

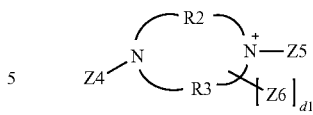

Structural formula (2)

In the structural formula (1), R1 represents a hydrogen atom or a hydrocarbon group having 1 to 4 carbon atoms. The hydrocarbon group is preferably an alkyl group. Z1 to Z3 each independently represent any one structure selected from the group consisting of structures represented by the structural formulae (Z101) to (Z103), or a hydrocarbon group having 1 to 4 carbon atoms, and at least one of Z1 to Z3 represents any one structure selected from the group consisting of the structures represented by the structural formulae (Z101) to (Z103). The hydrocarbon group is preferably an alkyl group.

The structure represented by the structural formula (1) is an ammonium cation having at least one group derived from a hydroxy group, an amino group, or a glycidyl group. When the structure represented by the structural formula (1) is an ammonium cation having at least one group derived from a hydroxy group, a structure having at least one structure represented by the structural formula (Z101) is obtained by causing an ionic compound corresponding to the cation and an isocyanate group to react with each other. When the structure represented by the structural formula (1) is an ammonium cation having at least one group derived from an amino group, a structure having at least one structure represented by the structural formula (Z102) is obtained by causing an ionic compound corresponding to the cation and an isocyanate group to react with each other. When the structure represented by the structural formula (1) is an ammonium cation having at least one group derived from a glycidyl group, a structure having at least one structure represented by the structural formula (Z103) is obtained by causing an ionic compound corresponding to the cation and a hydroxy group to react with each other.

Ammonium cations each having a hydroxy group are given below as examples of the structure represented by the structural formula (1):

a 2-hydroxyethyltrimethylammonium cation, a 2-hydroxyethyltriethylammonium cation, a 4-hydroxybutyltrimethylammonium cation, a 4-hydroxybutyl-tri-n-butylammonium cation, an 8-hydroxyoctyltrimethylammonium cation, and an 8-hydroxyoctyl-tri-n-butylammonium cation;

a bis(hydroxymethyl)dimethylammonium cation, a bis(2-hydroxyethyl)dimethylammonium cation, a bis(3-hydroxypropyl)dimethylammonium cation, a bis(4-hydroxybutyl)dimethylammonium cation, a bis(8-hydroxyoctyl)dimethylammonium cation, and a bis(8-hydroxyoctyl)-di-n-butylammonium cation;

a tris(hydroxymethyl)methylammonium cation, a tris(2-hydroxyethyl)methylammonium cation, a tris(3-hydroxypropyl)methylammonium cation, a tris(4-hydroxybutyl)methylammonium cation, and a tris(8-hydroxyoctyl)methylammonium cation; and derivatives thereof.

Examples of the ammonium cation having at least one amino group or glycidyl group include cations each having a structure obtained by substituting a hydroxy group of any one of those cations with an amino group or a glycidyl group.

In the structural formula (2), R2 and R3 each represent a hydrocarbon group needed for forming a nitrogen-containing heteroaromatic five-membered ring together with nitrogen atoms to which the hydrocarbon group is bonded. Z4 and Z5 each independently represent any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. Z6 represents any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. d1 represents an integer of 0 or 1, and at least one of Z4 to Z6 represents any one structure selected from the group consisting of the structures represented by the structural formulae (Z101) to (Z103).

The structure represented by the structural formula (2) is a nitrogen-containing heteroaromatic five-membered ring cation having at least one group derived from a hydroxy group, an amino group, or a glycidyl group and containing two nitrogen atoms. When the structure represented by the structural formula (2) is a nitrogen-containing heteroaromatic five-membered ring cation having at least one group derived from a hydroxy group, a structure having at least one structure represented by the structural formula (Z101) is obtained by causing an ionic compound corresponding to the cation and an isocyanate group to react with each other. When the structure represented by the structural formula (2) is a nitrogen-containing heteroaromatic five-membered ring cation having at least one group derived from an amino group, a structure having at least one structure represented by the structural formula (Z102) is obtained by causing an ionic compound corresponding to the cation and an isocyanate group to react with each other. When the structure represented by the structural formula (2) is a nitrogen-containing heteroaromatic five-membered ring cation having at least one group derived from a glycidyl group, a structure having at least one structure represented by the structural formula (Z103) is obtained by causing an ionic compound corresponding to the cation and a hydroxy group to react with each other.

The nitrogen-containing heteroaromatic five-membered ring in the structural formula (2) is preferably imidazolium, and a structure preferred as the structure represented by the structural formula (2) is, for example, a structure having an imidazoline ring represented by the structural formula (10). In the structural formula (10), Z4, Z5, Z6, and d1 are identical to those of the structural formula (2).

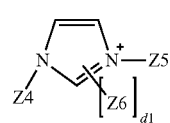

Structural formula (10)

Cations each having an imidazoline ring structure and a hydroxy group are given below as examples of the structure represented by the structural formula (2):

a 1-methyl-3-hydroxymethylimidazolium cation, a 1-methyl-3-(2-hydroxyethyl)imidazolium cation, a 1-methyl-3-(3-hydroxypropyl)imidazolium cation, a 1-methyl-3-(4-hydroxybutyl)imidazolium cation, a 1-methyl-3-(6-hydroxyhexyl)imidazolium cation, a 1-methyl-3-(8-hydroxyoctyl)imidazolium cation, a 1-ethyl-3-(2-hydroxyethyl)imidazolium cation, a 1-n-butyl-3-(2-hydroxyethyl)imidazolium cation, a 1,3-dimethyl-2-(2-hydroxyethyl)imidazolium cation, a 1,3-dimethyl-2-(4-hydroxybutyl)imidazolium cation, and a 1,3-dimethyl-4-(2-hydroxyethyl)imidazolium cation;

a 1,3-bishydroxymethylimidazolium cation, a 1,3-bis(2-hydroxyethyl)imidazolium cation, a 2-methyl-1,3-bishydroxymethylimidazolium cation, a 2-methyl-1,3-bis(2-hydroxyethyl)imidazolium cation, a 4-methyl-1,3-bis(2-hydroxyethyl)imidazolium cation, a 2-ethyl-1,3-bis(2-hydroxyethyl)imidazolium cation, a 4-ethyl-1,3-bis(2-hydroxyethyl)imidazolium cation, a 2-n-butyl-1,3-bis(2-hydroxyethyl)imidazolium cation, a 4-n-butyl-1,3-bis(2-hydroxyethyl)imidazolium cation, a 1,3-bis(3-hydroxypropyl)imidazolium cation, a 1,3-bis(4-hydroxybutyl)imidazolium cation, a 1,3-bis(6-hydroxyhexyl)imidazolium cation, a 1,3-bis(8-hydroxyoctyl)imidazolium cation, a 1-methyl-2,3-bis(2-hydroxyethyl)imidazolium cation, a 1-methyl-3,4-bis(2-hydroxyethyl)imidazolium cation, and a 1-methyl-3,5-bis(2-hydroxyethyl)imidazolium cation;

a 1,2,3-trishydroxymethylimidazolium cation, a 1,2,3-tris(2-hydroxyethyl)imidazolium cation, a 1,2,3-tris(3-hydroxypropyl)imidazolium cation, a 1,2,3-tris(4-hydroxybutyl)imidazolium cation, a 1,2,3-tris(6-hydroxyhexyl)imidazolium cation, a 1,2,3-tris(8-hydroxyoctyl)imidazolium cation, a 1,3,4-tris(2-hydroxyethyl)imidazolium cation, a 1,3,4-tris(3-hydroxypropyl)imidazolium cation, a 1,3,4-tris(4-hydroxybutyl)imidazolium cation, a 1,3,4-tris(6-hydroxyhexyl)imidazolium cation, and a 1,3,4-tris(8-hydroxyoctyl)imidazolium cation; and derivatives thereof.

Examples of the cation having at least one amino group or glycidyl group include cations each having a structure obtained by substituting a hydroxy group of any one of those cations with an amino group or a glycidyl group.

atoms. The hydrocarbon group is preferably an alkyl group. d2 represents an integer of from 0 to 2, and at least one of Z7 or Z8 represents any one structure selected from the group consisting of the structures represented by the structural formulae (Z101) to (Z103). When d2 represents 2, Z8s may be identical to or different from each other.

The structure represented by the structural formula (3) represents a nitrogen-containing heteroaromatic six-membered ring cation having at least one group derived from a hydroxy group, an amino group, or a glycidyl group and containing two nitrogen atoms. When the structure represented by the structural formula (3) is a nitrogen-containing heteroaromatic six-membered ring cation having at least one group derived from a hydroxy group, a structure having at least one structure represented by the structural formula (Z101) is obtained by causing an ionic compound corresponding to the cation and an isocyanate group to react with each other. When the structure represented by the structural formula (3) is a nitrogen-containing heteroaromatic six-membered ring cation having at least one group derived from an amino group, a structure having at least one structure represented by the structural formula (Z102) is obtained by causing an ionic compound corresponding to the cation and an isocyanate group to react with each other. When the structure represented by the structural formula (3) is a nitrogen-containing heteroaromatic six-membered ring cation having at least one group derived from a glycidyl group, a structure having at least one structure represented by the structural formula (Z103) is obtained by causing an ionic compound corresponding to the cation and a hydroxy group to react with each other.

Examples of the nitrogen-containing heteroaromatic six-membered ring in the structural formula (3) include a pyrimidine ring and a pyrazine ring.

Cations each having a pyrimidine ring structure and a hydroxy group are given below as examples of the structure represented by the structural formula (3):

a 1,4-bis(2-hydroxyethyl)pyrimidinium cation, a 1,5-bis(3-hydroxypropyl)pyrimidinium cation, a 1-(4-hydroxybutyl)-4-(2-hydroxyethyl)pyrimidinium cation, and a 1,4-bis(2-hydroxyethyl)-2-methylpyrimidinium cation; and derivatives thereof.

Examples of the cation having at least one amino group or glycidyl group include cations each having a structure obtained by substituting a hydroxy group of any one of those cations with an amino group or a glycidyl group.

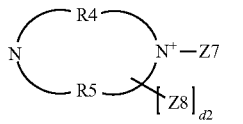

Structural formula (3)

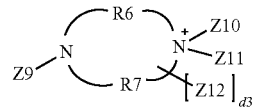

Structural formula (4)

In the structural formula (3), R4 and R5 each represent a hydrocarbon group needed for forming a nitrogen-containing heteroaromatic six-membered ring together with nitrogen atoms to which the hydrocarbon group is bonded. Z7 represents any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. Z8 represents any one structure selected from the group consisting of the structures represented by the structural formulae (Z101) to (Z103), a hydrogen atom, or a hydrocarbon group having 1 to 4 carbon In the structural formula (4), R6 and R7 each represent a hydrocarbon group needed for forming a nitrogen-containing heteroalicyclic group together with nitrogen atoms to which the hydrocarbon group is bonded. The hydrocarbon group is preferably an alkylene group. Z9 to Z11 each independently represent any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. Z12 represents any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. d3 represents an integer of from 0 to 2, and at least one of Z9 to Z12 represents any one structure selected from the group consisting of the structures represented by the structural formulae (Z101) to (Z103). When d3 represents 2, Z12s may be identical to or different from each other.

The structure represented by the structural formula (4) represents a nitrogen-containing heteroalicyclic cation having at least one group derived from a hydroxy group, an amino group, or a glycidyl group and containing two nitrogen atoms. When the structure represented by the structural formula (4) is a nitrogen-containing heteroalicyclic cation having at least one group derived from a hydroxy group, a structure having at least one structure represented by the structural formula (Z101) is obtained by causing an ionic compound corresponding to the cation and an isocyanate group to react with each other. When the structure represented by the structural formula (4) is a nitrogen-containing heteroalicyclic cation having at least one group derived from an amino group, a structure having at least one structure represented by the structural formula (Z102) is obtained by causing an ionic compound corresponding to the cation and an isocyanate group to react with each other. When the structure represented by the structural formula (4) is a nitrogen-containing heteroalicyclic cation having at least one group derived from a glycidyl group, a structure having at least one structural formula (Z103) is obtained by causing an ionic compound corresponding to the cation and a hydroxy group to react with each other.

Examples of the nitrogen-containing heteroalicyclic group in the structural formula (4) include a piperazine group, an imidazoline group, an imidazolidine group, a 1,3-diazepane group, and a 1,4-diazepane group. Of those, a piperazine group is preferred, and the structure represented by the structural formula (4) is preferably a structure represented by the structural formula (11). In the structural formula (11), Z9, Z10, Z11, Z12, and d3 are identical to those of the structural formula (4).

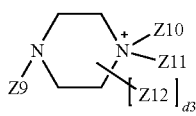

Structural formula (11)

Cations each having a piperazine group and a hydroxy group are given below as examples of the structure represented by the structural formula (4):

a 1,1-bis(2-hydroxyethyl)piperazinium cation, a 1,1,4-tris(2-hydroxyethyl)piperazinium cation, a 1,4-bis(3-hydroxypropyl)-1-ethylpiperazinium cation, and a 1,4-bis(2-hydroxyethyl)-1,3-diethylpiperazinium cation; and derivatives thereof.

Examples of the cation having at least one amino group or glycidyl group include cations each having a structure obtained by substituting a hydroxy group of any one of those cations with an amino group or a glycidyl group.

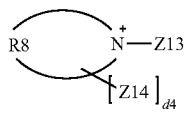

Structural formula (5)

In the structural formula (5), R8 represents a hydrocarbon group needed for forming a nitrogen-containing aromatic ring together with a nitrogen atom to which the hydrocarbon group is bonded. Z13 represents any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. Z14 represents any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. d4 represents an integer of 0 or 1, and at least one of Z13 or Z14 represents any one structure selected from the group consisting of the structures represented by the structural formulae (Z101) to (Z103).

The structure represented by the structural formula (5) represents a nitrogen-containing aromatic ring cation having at least one group derived from a hydroxy group, an amino group, or a glycidyl group and containing one nitrogen atom. When the structure represented by the structural formula (5) is a nitrogen-containing aromatic ring cation having at least one group derived from a hydroxy group, a structure having at least one structure represented by the structural formula (Z101) is obtained by causing an ionic compound corresponding to the cation and an isocyanate group to react with each other. When the structure represented by the structural formula (5) is a nitrogen-containing aromatic ring cation having at least one group derived from an amino group, a structure having at least one structure represented by the structural formula (Z102) is obtained by causing an ionic compound corresponding to the cation and an isocyanate group to react with each other. When the structure represented by the structural formula (5) is a nitrogen-containing aromatic ring cation having at least one group derived from a glycidyl group, a structure having at least one structure represented by the structural formula (Z103) is obtained by causing an ionic compound corresponding to the cation and a hydroxy group to react with each other.

Examples of the nitrogen-containing aromatic ring in the structural formula (5) include a pyrrole ring, a pyridine ring, and an azepine ring. Of those, a pyridine group is preferred, and the structure represented by the structural formula (5) is preferably a structure represented by the structural formula (12). In the structural formula (12), Z13, Z14, and d4 are identical to those of the structural formula (5).

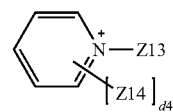

Structural formula (12)

Cations each having a pyridine ring structure and a hydroxy group are given below as examples of the structure represented by the structural formula (5):

a 1-hydroxymethylpyridinium cation, a 1-(2-hydroxyethyl)pyridinium cation, a 1-(3-hydroxypropyl)pyridinium cation, a 1-(4-hydroxybutyl)pyridinium cation, a 1-(6-hydroxyhexyl)pyridinium cation, a 1-(8-hydroxyoctyl)pyridinium cation, a 2-methyl-1-(2-hydroxyethyl)pyridinium cation, a 3-methyl-1-(2-hydroxyethyl)pyridinium cation, a 4-methyl-1-(2-hydroxyethyl)pyridinium cation, a 3-ethyl-1-(2-hydroxyethyl)pyridinium cation, a 3-n-butyl-1-(2-hydroxyethyl)pyridinium cation, a 1-methyl-2-hydroxymethylpyridinium cation, a 1-methyl-3-hydroxymethylpyridinium cation, a 1-methyl-4-hydroxymethylpyridinium cation, a 1-methyl-2-(2-hydroxyethyl)pyridinium cation, a 1-methyl-3-(2-hydroxyethyl)pyridinium cation, a 1-methyl-4-(2-hydroxyethyl)pyridinium cation, a 1-ethyl-3-(2-hydroxyethyl)pyridinium cation, a 1-n-butyl-3-(2-hydroxyethyl)pyridinium cation, and a 2-methyl-4-n-butyl-1-(2-hydroxyethyl)pyridinium cation;

a 1,2-bishydroxymethylpyridinium cation, a 1,3-bishydroxymethylpyridinium cation, a 1,4-bishydroxymethylpyridinium cation, a 1,2-bis(2-hydroxyethyl)pyridinium cation, a 1,3-bis(2-hydroxyethyl)pyridinium cation, a 1,4-bis(2-hydroxyethyl)pyridinium cation, a 1,2-bis(3-hydroxypropyl)pyridinium cation, a 1,3-bis(3-hydroxypropyl)pyridinium cation, a 1,4-bis(3-hydroxypropyl)pyridinium cation, a 1,2-bis(4-hydroxybutyl)pyridinium cation, a 1,3-bis(4-hydroxybutyl)pyridinium cation, a 1,4-bis(4-hydroxybutyl)pyridinium cation, a 1,2-bis(6-hydroxyhexyl)pyridinium cation, a 1,3-bis(6-hydroxyhexyl)pyridinium cation, a 1,4-bis(6-hydroxyhexyl)pyridinium cation, a 1,2-bis(8-hydroxyoctyl)pyridinium cation, a 1,3-bis(8-hydroxyoctyl)pyridinium cation, a 1,4-bis(8-hydroxyoctyl)pyridinium cation, a 2-methyl-1,3-bis(2-hydroxyethyl)pyridinium cation, a 2-ethyl-1,3-bis(2-hydroxyethyl)pyridinium cation, a 5-methyl-1,3-bis(2-hydroxyethyl)pyridinium cation, and a 5-ethyl-1,3-bis(2-hydroxyethyl)pyridinium cation;

a 1,2,4-trishydroxymethylpyridinium cation, a 1,2,4-tris(2-hydroxyethyl)pyridinium cation, a 1,2,4-tris(3-hydroxypropyl)pyridinium cation, a 1,2,4-tris(4-hydroxybutyl)pyridinium cation, a 1,2,4-tris(6-hydroxyhexyl)pyridinium cation, a 1,2,4-tris(8-hydroxyoctyl)pyridinium cation, a 1,3,5-trishydroxymethylpyridinium cation, a 1,3,5-tris(2-hydroxyethyl)pyridinium cation, a 1,3,5-tris(3-hydroxypropyl)pyridinium cation, a 1,3,5-tris(4-hydroxybutyl)pyridinium cation, a 1,3,5-tris(6-hydroxyhexyl)pyridinium cation, and a 1,3,5-tris(8-hydroxyoctyl)pyridinium cation; and derivatives thereof.

Examples of the cation having at least one amino group or glycidyl group include cations each having a structure obtained by substituting a hydroxy group of any one of those cations with an amino group or a glycidyl group.

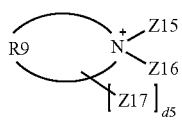

Structural formula (6)

In the structural formula (6), R9 represents a hydrocarbon group needed for forming a nitrogen-containing alicyclic group together with a nitrogen atom to which the hydrocarbon group is bonded. The hydrocarbon group is preferably an alkylene group. Z15 and Z16 each independently represent any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. Z17 represents any one structure selected from the group consisting of the structures represented by the structural formulae (Z101) to (Z103), a hydrogen atom, or a hydrocarbon group having 1 to 4 carbon atoms. The hydrocarbon group is preferably an alkyl group. d5 represents an integer of 0 or 1, and at least one of Z15 to Z17 represents any one structure selected from the group consisting of the structures represented by the structural formulae (Z101) to (Z103).

The structure represented by the structural formula (6) represents a nitrogen-containing alicyclic cation having at least one group derived from a hydroxy group, an amino group, or a glycidyl group. When the structure represented by the structural formula (6) is a nitrogen-containing alicyclic cation having at least one group derived from a hydroxy group, a structure having at least one structure represented by the structural formula (Z101) is obtained by causing an ionic compound corresponding to the cation and an isocyanate group to react with each other. When the structure represented by the structural formula (6) is a nitrogen-containing alicyclic cation having at least one group derived from an amino group, a structure having at least one structure represented by the structural formula (Z102) is obtained by causing an ionic compound corresponding to the cation and an isocyanate group to react with each other. When the structure represented by the structural formula (6) is a nitrogen-containing alicyclic cation having at least one group derived from a glycidyl group, a structure having at least one structure represented by the structural formula (Z103) is obtained by causing an ionic compound corresponding to the cation and a hydroxy group to react with each other.

Examples of the nitrogen-containing alicyclic group in the structural formula (6) include a pyrrolidine group, a pyrroline group, a piperidine group, an azepane group, and an azocane group. Of those, a pyrrolidine group is preferred, and the structure represented by the structural formula (6) is preferably a structure represented by the structural formula (13). In the structural formula (13), Z15, Z16, Z17, and d5 are identical to those of the structural formula (6).

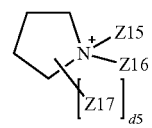

Structural formula (13)

Cations each having a pyrrolidine group and a hydroxy group are given below as examples of the structure represented by the structural formula (6):

a 1-methyl-1,2-bis(2-hydroxyethyl)pyrrolidinium cation, a 1-ethyl-1,2-bis(2-hydroxyethyl)pyrrolidinium cation, a 1-butyl-1,2-bis(2-hydroxyethyl)pyrrolidinium cation, and a 1-methyl-1,2-bis(4-hydroxybutyl)pyrrolidinium cation; and derivatives thereof.

Examples of the cation having at least one amino group or glycidyl group include cations each having a structure obtained by substituting a hydroxy group of any one of those cations with an amino group or a glycidyl group.

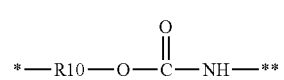

Structural formula (Z101)

In the structural formula (Z101), R10 represents a linear or branched divalent hydrocarbon group. The hydrocarbon group is preferably a linear or branched alkylene group having 1 to 8 carbon atoms.

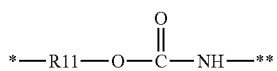

Structural formula (Z102)

In the structural formula (Z102), R11 represents a linear or branched divalent hydrocarbon group. The hydrocarbon group is preferably a linear or branched alkylene group having 1 to 8 carbon atoms.

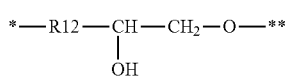

Structural formula (Z103)

In the structural formula (Z103), R12 represents a linear or branched divalent hydrocarbon group. The hydrocarbon group is preferably a linear or branched alkylene group having 1 to 8 carbon atoms. In the structural formulae (Z101) to (Z103), symbol "*" represents a bonding site with a nitrogen atom in the structural formula (1), or represents a bonding site with a nitrogen atom in a nitrogen-containing heterocycle in any one of the structural formulae (2) to (6) or with a carbon atom in the nitrogen-containing heterocycle. In addition, symbol "**" represents a bonding site with a carbon atom in the polymer chain forming the resin.

The structure represented by the structural formula (Z101) is a residue formed by a reaction between a hydroxy group of the cation and an isocyanate group. The structure represented by the structural formula (Z102) is a residue formed by a reaction between an amino group of the cation and an isocyanate group. The isocyanate group that reacts with the hydroxy group or the amino group is preferably an isocyanate group of the binder resin. The structure represented by the structural formula (Z103) is a residue formed by a reaction between a glycidyl group of the cation and a hydroxy group. The hydroxy group that reacts with the glycidyl group is preferably a hydroxy group of the binder resin.

A case in which the resin layer contains a resin having the structure represented by the structural formula (2) out of the structures represented by the structural formulae (1) to (6) is preferred because of the following reason: the ratio (ionization ratio) at which the resin layer dissociates into the cation and the anion concerning ion carrier mobility is high even at low temperature because of the chemical structure of the cation, and hence the resistance value of the electrophotographic member under a low-temperature environment at about 0° C. more hardly increases.

(Binder Resin)

In the resin layer 3, the resin preferably further has a structure except at least one cation structure selected from the group consisting of the structures represented by the formulae (1) to (6). Such structure is more preferably a structure derived from the binder resin.

Examples of the resin to be incorporated as the binder resin include a polyurethane resin, a polyester resin, a polyether resin, an acrylic resin, an epoxy resin, and an amino resin, such as a melamine resin. Of those, a polyurethane resin or a melamine crosslinked resin is preferred from the viewpoints of the strength of a coating film and toner chargeability. Of those, a polyurethane resin, such as a thermosetting polyether-polyurethane resin or a thermosetting polyester-polyurethane resin, is suitably used because the resin has flexibility in addition to the strength and the chargeability.

The polyurethane resin is obtained by causing a known polyol and a known polyisocyanate to react with each other. The polyurethane resin is preferably a urethane prepolymer polyol obtained by causing a polyol and an isocyanate to react with each other from the viewpoints of a self film-reinforcing property and compatibility with the ionic compound. Examples of the polyol component of the urethane prepolymer polyol include a polyether polyol, a polyester polyol, a polycaprolactone polyol or a polycarbonate polyol, a polyolefin polyol, and an acrylic polyol. Of those, a polyether polyol, a polyester polyol, a polycaprolactone polyol, and a polycarbonate polyol are preferred.

That is, in the resin layer 3 of the electrophotographic member according to one embodiment of the present disclosure, when the resin further has the binder resin, a polyether polyol component in a polymer chain in the binder resin corresponds to the structure represented by the structural formula (7). Similarly, a polyester polyol component or polycaprolactone polyol component in the binder resin corresponds to the structure represented by the structural formula (8), and a polycarbonate polyol component therein corresponds to the structure represented by the structural formula (9).

Examples of the polyether polyol include polyethylene glycol, polypropylene glycol, poly-1,4-butanediol, poly-1,5-pentanediol, polyneopentyl glycol, poly-3-methyl-1,5-pentanediol, poly-1,6-hexanediol, poly-1,8-octanediol, and poly-1,9-nonanediol. Of those, polypropylene glycol, poly-1,4-butanediol, poly-1,5-pentanediol, polyneopentyl glycol, poly-3-methyl-1,5-pentanediol, and poly-1,6-hexanediol are preferred from the viewpoint of suppressing the aggregation of inorganic particles.

In addition, examples of the polyester polyol include polyester polyols each obtained through a condensation reaction of a diol component, such as ethylene glycol, propylene glycol, 1,4-butanediol, 1,5-pentanediol, neopentyl glycol, 3-methyl-1,5-pentanediol, 1,6-hexanediol, 1,8-octanediol, or 1,9-nonanediol, or a triol component, such as trimethylolpropane, and a dicarboxylic acid, such as adipic acid, suberic acid, sebacic acid, phthalic anhydride, terephthalic acid, or hexahydroxyphthalic acid. Of those, a polyester polyol obtained through a condensation reaction of a diol component, such as propylene glycol, 1,4-butanediol, 1,5-pentanediol, neopentyl glycol, 3-methyl-1,5-pentanediol, or 1,6-hexanediol, and a dicarboxylic acid, such as adipic acid, suberic acid, or sebacic acid, is preferred from the viewpoint of suppressing the aggregation of inorganic particles.

In addition, examples of the polycaprolactone polyol include poly ε-caprolactone and poly γ-caprolactone.

In addition, examples of the polycarbonate polyol include polycarbonate polyols each obtained through a condensation reaction of a diol component, such as ethylene glycol, propylene glycol, 1,4-butanediol, 1,5-pentanediol, neopentyl glycol, 3-methyl-1,5-pentanediol, 1,6-hexanediol, 1,8-octanediol, or 1,9-nonanediol, phosgene, a dialkyl carbonate, such as dimethyl carbonate, or a cyclic carbonate, such as ethylene carbonate. Of those, a polycarbonate polyol obtained through a condensation reaction of a diol component, such as neopentyl glycol, 3-methyl-1,5-pentanediol, 1,5-pentanediol, 1,6-hexanediol, or 1,8-octanediol, and a dialkyl carbonate, such as dimethyl carbonate, is preferred from the viewpoint of suppressing the aggregation of inorganic particles.

The polyol component may be formed in advance into a prepolymer through chain extension with an isocyanate compound, such as 2,4-tolylene diisocyanate (TDI), 4,4'-diphenylmethane diisocyanate (MDI), or isophorone diisocyanate (IPDI), as required.

The isocyanate compound is not particularly limited, and the following compounds may be used: an aliphatic polyisocyanate, such as ethylene diisocyanate or 1,6-hexamethylene diisocyanate (HDI); an alicyclic polyisocyanate, such as isophorone diisocyanate (IPDI), cyclohexane-1,3-diisocyanate, or cyclohexane-1,4-diisocyanate; an aromatic isocyanate, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, or naphthalene diisocyanate; and a copolymerized product, isocyanurate form, TMP adduct, and biuret form thereof and block forms thereof. Of those, an aromatic isocyanate, such as tolylene diisocyanate, diphenylmethane diisocyanate, or polymeric diphenylmethane diisocyanate, is preferred.

The polyol component and the isocyanate compound are preferably mixed so that the ratio (molar ratio) of an isocyanate group in the isocyanate compound may fall within the range of from 1.0 or more to 2.0 or less with respect to 1.0 of a hydroxy group in the polyol component. When the mixing ratio falls within the range, the remaining of an unreacted component can be suppressed.

[Anion]

The anion in the resin layer 3 only needs to be an anion that can impart electroconductivity to the electrophotographic member according to one embodiment of the present disclosure. Of those, at least one selected from the group consisting of a fluoroalkylsulfonylimide anion, a fluorosulfonylimide anion, a fluoroalkylsulfonate anion, a fluorosulfonate anion, a fluoroalkylcarboxylic acid anion, a fluoroalkylmethide anion, a fluoroboric acid anion, a fluorophosphoric acid anion, a dicyanamide anion, and a thiocyanate anion is particularly preferred. The reason for the foregoing is as follows: each of the anions is chemically extremely stable as compared to the anion of a halogen, a sulfuric acid anion, or a nitric acid anion because of its chemical structure, and hence has a high ionization ratio. Specifically, a possible reason for the foregoing is as follows: each of the anions has a strong electron-withdrawing group in a molecule thereof to stabilize the negative charge of the anion, and hence shows a high ionization ratio in a wide temperature region to contribute to the expression of high electroconductivity even at low temperature. The anion of chlorine or a perchlorate anion may be used as the anion.

Specific examples of the fluoroalkylsulfonylimide anion include: fluoroalkylsulfonylimide anions each including a fluoroalkyl group having 1 or more and 6 or less carbon atoms, such as a bis(trifluoromethanesulfonyl)imide anion, a bis(pentafluoroethanesulfonyl)imide anion, a bis(heptafluoropropanesulfonyl)imide anion, a bis(nonafluorobutanesulfonyl)imide anion, a bis(dodecafluoropentanesulfonyl) imide anion, and a bis(perfluorohexanesulfonyl)imide anion; and cyclic fluoroalkylsulfonylimide anions, such as N,N-hexafluoropropane-1,3-disulfonylimide.

A specific example of the fluorosulfonylimide anion is a bis(fluorosulfonyl)imide anion.

Specific examples of the fluoroalkylsulfonate anion include a trifluoromethanesulfonic acid anion, a fluoromethanesulfonic acid anion, a perfluoroethanesulfonic acid anion, a perfluoropropanesulfonic acid anion, a perfluorobutanesulfonic acid anion, a perfluoropentanesulfonic acid anion, a perfluorohexanesulfonic acid anion, and a perfluorooctanesulfonic acid anion.

Specific examples of the fluoroalkylcarboxylic acid anion include a trifluoroacetic acid anion, a perfluoropropionic acid anion, a perfluorobutyric acid anion, a perfluorovaleric acid anion, and a perfluorocaproic acid anion.

Specific examples of the fluoroalkylmethide anion include a tris(trifluoromethanesulfonyl)methide anion, a tris (perfluoroethanesulfonyl)methide anion, a tris(perfluoropropanesulfonyl)methide anion, a tris(perfluorobutanesulfonyl) methide anion, a tris(perfluoropentanesulfonyl)methide anion, a tris(perfluorohexanesulfonyl)methide anion, and a tris(perfluorooctanesulfonyl)methide anion.

A specific example of the fluoroboric acid anion is a tetrafluoroboric acid anion.

A specific example of the fluorophosphoric acid anion is a hexafluorophosphoric acid anion.

Of those anions, a fluoroalkylsulfonylimide anion, a fluorosulfonylimide anion, a fluoroboric acid anion, a dicyanamide anion, and a thiocyanate anion are particularly preferably used because a reduction in electroconductivity under a low-temperature environment is suppressed more.

[Inorganic Particles]

In the resin layer 3, the inorganic particles having a hydrophobicity degree of 40% or more and 80% or less are used as the filler. When the filler is added to the paint for forming the resin layer, the particles exhibit a function as a film-forming aid or a reinforcing material at the time of coating with the paint in the formation process for the resin layer.

Examples of the inorganic particles include silica particles, aluminum oxide, titanium oxide, zinc oxide, quartz fine powder, diatomaceous earth, basic magnesium carbonate, active calcium carbonate, magnesium silicate, aluminum silicate, talc, mica powder, aluminum sulfate, calcium sulfate, barium sulfate, and glass fibers. Of those, silica particles are preferred from the viewpoint of the ease of hydrophobic treatment.

The silica particles are roughly classified into the following two kinds: dry silica and wet silica. Each of the two kinds may be used. The dry silica is produced by the vapor phase oxidation of a silicon halide, and is also referred to as "fumed silica". The wet silica is produced from water glass. The silica particles are preferably the dry silica because the dry silica has a small number of silanol groups present on its surface and in its inside, and causes a small amount of a production residue, such as sodium oxide or a sulfite ion. In addition, the dry silica may be obtained as composite fine powder of silica and any other metal oxide by using any other metal halide, such as aluminum chloride or titanium chloride, together with the silicon halide. The silica particles include such composite fine powder.

The surfaces of the inorganic particles may be subjected to hydrophobic treatment by using, for example, an organosilicon compound or an organotitanium compound as a treatment agent. Examples of the treatment agent for the organosilicon compound include unmodified silicone varnishes, various modified silicone varnishes, unmodified silicone oils, various modified silicone oils, silane compounds, and silane coupling agents. Those treatment agents may be used alone or in combination thereof.

An oil having a viscosity at 25° C. of from about 30 $mm^2/s$ (cSt) to about 1,000 $mm^2/s$ (cSt) is used as any such silicone oil, and preferred examples thereof include a dimethyl silicone oil, a methyl phenyl silicone oil, an α-methylstyrene-modified silicone oil, a chlorophenyl silicone oil, and a fluorine-modified silicone oil. With regard to a method for silicone oil treatment, the inorganic particles and the silicone oil may be directly mixed with each other with a mixer, such as a Henschel mixer, or a method involving jetting the silicone oil toward the inorganic particles serving as a base may be adopted. Alternatively, surface-treated particles may be produced by: dissolving or dispersing the silicone oil in a proper solvent; then mixing the inorganic particles serving as a base in the resultant; and removing the solvent.

Examples of the silane coupling agent include vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-propyltrimethoxysilane, isopropyltrimethoxysilane, n-butyltrimethoxysilane, isobutyltrimethoxysilane, trimethylmethoxysilane, n-hexyltrimethoxysilane, n-octyltrimethoxysilane, n-octyltriethoxysilane, n-decyltrimethoxysilane, hydroxypropyltrimethoxysilane, n-hexadecyltrimethoxysilane, and n-octadecyltrimethoxysilane. When the silane coupling agents are used, the inorganic particles may be treated with any one kind of the agents alone, or may be treated by using two or more kinds thereof in combination. When two or more kinds of the coupling agents are used in combination, the inorganic particles may be treated with each of the coupling agents separately, or may be treated with the agents simultaneously.

A treatment method with the silane coupling agent is, for example, a dry treatment method or a wet treatment method. In the dry treatment method, first, for example, about 1 part by mass of the silane coupling agent with respect to 100 parts by mass of the inorganic particles to be treated and water or an aqueous solution of an alcohol are mixed with each other to prepare an aqueous solution of the silane coupling agent. Next, the inorganic particles are loaded into a Henschel mixer, and the aqueous solution of the silane coupling agent is dropped or sprayed thereon over several tens of minutes. After that, the treated inorganic particles are dried at from 100° C. to 150° C. over from 30 minutes to 90 minutes, and are subjected to pulverization treatment with a ball mill or the like. In the wet treatment method, first, water or an aqueous solution of an alcohol is added to the inorganic particles to be treated to provide a slurry. Next, an aqueous solution of the silane coupling agent prepared in the same manner as in the dry treatment method is added to the slurry, and the mixture is stirred. After that, the mixture is filtered, and is dried and subjected to pulverization treatment in the same manner as in the dry treatment method.

The hydrophobicity degree of the inorganic particles is preferably 40% or more and 80% or less, more preferably 60% or more and 80% or less. From the viewpoint that the hydrophobicity degree in the range is obtained with reliability, the treatment method is preferably two-stage treatment formed of the silicone oil treatment and the treatment with the silane coupling agent. In addition, the hydrophobicity degree may be adjusted by the kind of a treatment agent, the usage amount of the treatment agent, a stirring time, a drying temperature, and a drying time.

A method of measuring the hydrophobicity degree of the inorganic particles is described below. The hydrophobicity degree is measured with a powder wettability tester (product name: WET-100P, manufactured by Rhesca Co., Ltd.) by the following method. 70 Milliliters of pure water is loaded into a 250-milliliter tall beaker, and 0.03 g of the particles whose hydrophobicity degree is to be measured are floated on the surface of the water. While the mixture is stirred with a stirrer at 300 rpm, methanol is dropped therein with a metering pump at 2.6 ml/min, followed by the measurement of the transmittance of the resultant solution. A methanol concentration intermediate between a methanol concentration at the time point when the transmittance of the solution starts to change and a methanol concentration at the time point when the transmittance becomes minimum is defined as the "hydrophobicity degree".

The content of the inorganic particles is preferably 5 parts by mass or more and 30 parts by mass or less with respect to 100 parts by mass of a resin component forming the resin layer.

In addition, in consideration of the reinforcing performance and electroconductivity of the resin layer, with regard to the primary particle diameters of the inorganic particles, the number-average primary particle diameter thereof preferably falls within the range of from 10 nm or more to 120 nm or less, more preferably falls within the range of from 15 nm or more to 80 nm or less, and still more preferably falls within the range of from 15 nm or more to 40 nm or less. In the present disclosure, the number-average primary particle diameter is obtained as follows: the inorganic particles are observed with a scanning electron microscope; the average value of the long diameter and short diameter of each of the inorganic particles is defined as a particle diameter; and an arithmetic average value obtained by measuring the particle diameters of 100 particles in the field of view is defined as the number-average primary particle diameter.

(Production of Paint for Forming Resin Layer)

When a urethane resin is used as the binder resin, a paint for forming a resin layer for forming the resin layer of the electrophotographic member according to one embodiment of the present disclosure is obtained by, for example, mixing the following materials and causing the materials to react with each other.

1. As materials for forming the binder resin,
A polyether polyol, a polyester polyol, a polycarbonate polyol, or the like
A polyisocyanate
2. An ionic compound containing at least one selected from the group consisting of a hydroxy group, an amino group, and a glycidyl group in a cation structure
3. As a filler, inorganic particles having a hydrophobicity degree of 40% or more and 80% or less The states of those materials after the reaction may be identified through analysis by a known method, such as pyrolysis GC/MS, FT-IR, or NMR.

From the viewpoints of the electroconductivity of the electrophotographic member and the suppression of a fluctuation in resistance thereof due to electrification, the above-mentioned materials are preferably mixed so that the sum of the content of at least one cation structure selected from the group consisting of the structures represented by the structural formulae (1) to (6) in the paint for forming a resin layer may be 1 part by mass or more and 10 parts by mass or less with respect to 100 parts by mass of the binder resin in the resin layer.

(Method of Forming Resin Layer)

A method of forming the resin layer is not particularly limited, and examples thereof include spray coating, dip coating, and roll coating methods. Of those, a dip coating method involving causing a paint to overflow from the upper end of a dipping tank as described in Japanese Patent Application Laid-Open No. S57-5047 is preferably used as the method of forming the resin layer because of its simplicity and excellent production stability.

The thickness of the resin layer is preferably 1.0 µm or more and 20.0 µm or less.

(Other Component in Resin Layer)

The resin layer may contain an electroconductive filler as required to the extent that the effects of the present disclosure are not inhibited. Carbon black or an electroconductive metal, such as aluminum or copper, may be used as the electroconductive filler. Of those, carbon black is particularly preferably used because the carbon black is relatively easily available and has a high electroconductivity-imparting property and reinforcing property.

The electroconductivity of the resin layer depends on the total amount of the anion serving as a carrier in the resin layer. Therefore, the total amount of the anion in the resin layer is preferably increased for improving the electroconductivity of the resin layer. Herein, the anion is present so as to form a pair with the cation, and hence when the total amount of the anion is increased, the total amount of the cation in the resin layer is also increased. In addition, when every cation serving as a counterion of the anion is the resin having at least one cation structure selected from the group consisting of the structures represented by the structural formulae (1) to (6), the amount of the resin component in the resin layer may increase to increase the hardness of the resin layer.

Accordingly, in order to increase the amount of the anion in the resin layer while suppressing the increase in hardness of the resin layer, an excessive increase in the amount of the resin component in the resin layer is preferably suppressed by combining an ionic electroconductive agent, for example: a salt of a Group 1 metal in the periodic table, such as $KCF_3SO_3$, $LiCF_3SO_3$, $LiN(CF_3SO_2)_2$, $NaClO_4$, $LiClO_4$, $LiAsF_6$, $LiBF_4$, NaSCN, KSCN, or NaCl; an ammonium salt, such as $NH_4Cl$, $(NH_4)_2SO_4$, or $NH_4NO_3$; a salt of a Group 2 metal in the periodic table, such as $Ca(ClO_4)_2$ and $Ba(ClO_4)_2$; a complex of any such salt and a polyhydric alcohol, such as 1,4-butanediol, ethylene glycol, polyethylene glycol, propylene glycol, or polypropylene glycol, or a derivative thereof; a complex of any such salt and a monool, such as ethylene glycol monomethyl ether, ethylene glycol monoethyl ether, polyethylene glycol monomethyl ether, or polyethylene glycol monoethyl ether; an aliphatic sulfonic acid salt, an alkyl sulfuric acid ester salt, or an alkyl phosphoric acid ester salt; or a betaine salt. In addition, the sum of the contents of the ionic electroconductive agents is preferably 0.1 part by mass or more and 10 parts by mass or less with respect to 100 parts by mass of the resin forming the resin layer from the viewpoint of the stability of the layer.

In the case where the resin layer is the outermost layer, when the electrophotographic member is required to have some degree of surface roughness, fine particles for controlling roughness (fine particles for roughness control) may be added to the resin layer. Fine particles of a polyurethane resin, a polyester resin, a polyether resin, a polyamide resin, an acrylic resin, or a phenol resin may be used as the fine particles for roughness control. The volume-average particle diameter of the fine particles for roughness control is preferably 1 µm or more and 15 µm or less. The content of the fine particles for roughness control in the resin layer is preferably 1 part by mass or more and 60 parts by mass or less with respect to 100 parts by mass of the resin forming the resin layer. When particles of a urethane resin are used, the glass transition temperature of each of the resin particles is preferably set to −10° C. or less because the fall of the resin particles can be suppressed to a larger extent, and the glass transition temperature is more preferably −30° C. or less. When the glass transition temperature of each of the resin particles is −10° C. or less, it is assumed that molecular mobility on the surfaces of the resin particles is hardly suppressed even at low temperature, and hence the ionic compound easily interacts with a urethane bond of a urethane resin binder.

(2) Electrophotographic Image-Forming Apparatus

The electrophotographic member according to one embodiment of the present disclosure may be suitably used as each of a developing roller, a charging roller, a toner-supplying roller, a developing blade, and a cleaning blade in an electrophotographic image-forming apparatus. The electrophotographic member may be applied to any of the following developing apparatus: a noncontact-type developing apparatus or contact-type developing apparatus using magnetic one-component toner or nonmagnetic one-component toner, and a developing apparatus using two-component toner.

Figure 3:
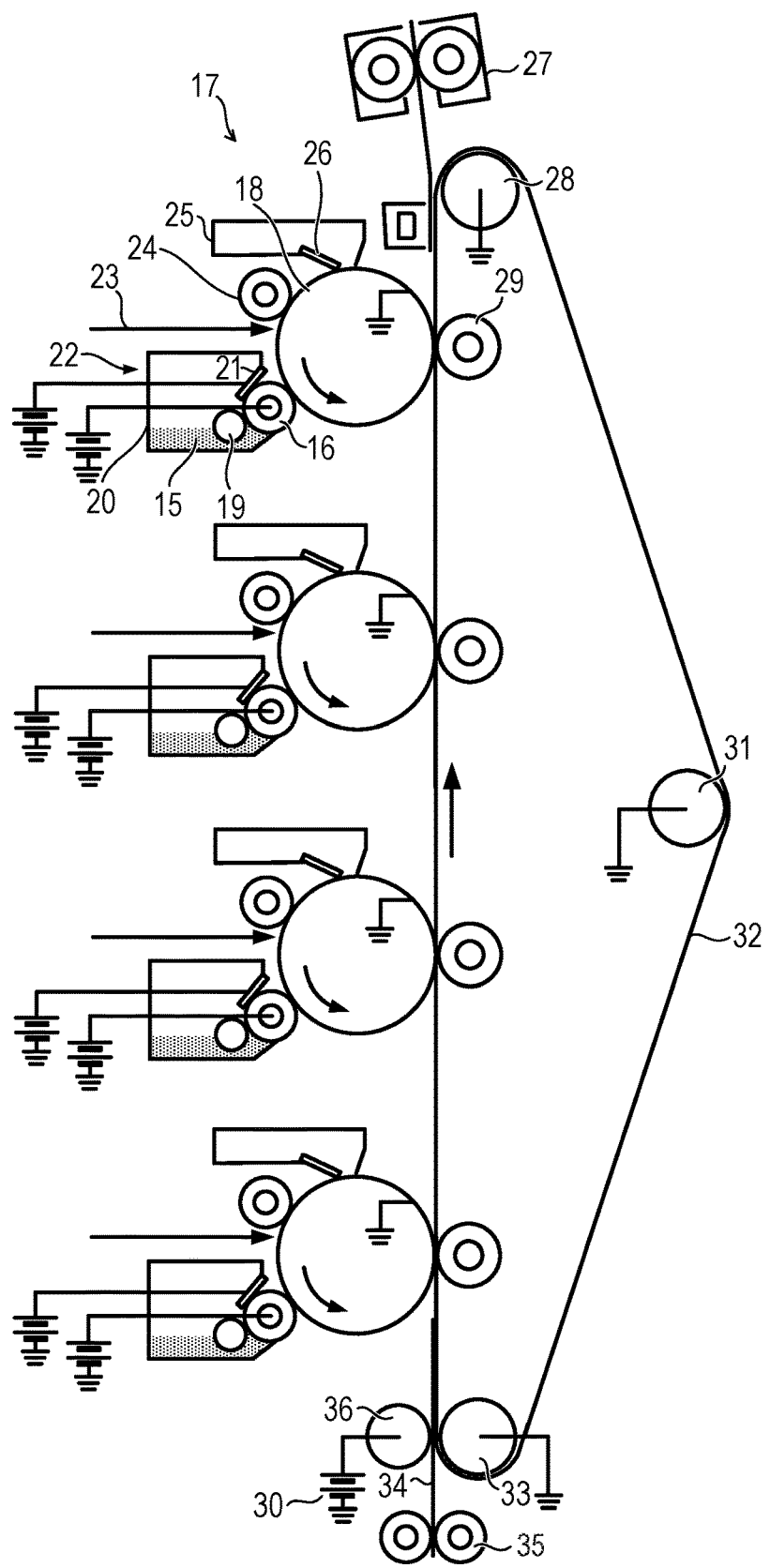
FIG. 3 is a schematic sectional view of an electrophotographic image-forming apparatus according to one embodiment of the present disclosure.

FIG. 3 is a schematic sectional view of an example of an electrophotographic image-forming apparatus including the electrophotographic member according to one embodiment of the present disclosure as a developing roller of a contact-type developing apparatus using one-component toner. The developing apparatus 22 includes: a toner container 20 storing a toner 15 as the one-component toner; a developing roller 16; a toner-supplying roller 19 configured to supply the toner to the developing roller 16; and a developing blade 21 configured to regulate the thickness of a toner layer on the developing roller 16. The developing roller 16 is positioned in an opening portion extending in a longitudinal direction in the toner container 20, and is arranged so as to be in contact with an electrophotographic photosensitive member 18. The electrophotographic photosensitive member 18, a cleaning blade 26, a waste toner-storing container 25, and a charging roller 24 may be arranged in the main body of the electrophotographic image-forming apparatus. The developing apparatus 22 are prepared for the respective color toners, that is, black (Bk), cyan (C), magenta (M), and yellow (Y) toners to enable color printing.

The printing operation of the electrophotographic image-forming apparatus is described below. The electrophotographic photosensitive member 18 rotates in a direction indicated by the arrow, and is uniformly charged by the charging roller 24 for subjecting the electrophotographic photosensitive member 18 to charging treatment. Subsequently, an electrostatic latent image is formed on the surface of the electrophotographic photosensitive member 18 by laser light 23 serving as an exposing unit. The toner 15 is applied to the electrostatic latent image from the developing roller 16, which is arranged so as to be brought into contact with the electrophotographic photosensitive member 18, by the developing apparatus 22, to thereby visualize the image as a toner image (development). The development is the so-called reversal development in which the toner image is formed in an exposure portion. The toner image formed on the electrophotographic photosensitive member 18 is transferred onto paper 34 serving as a recording medium by a transfer roller 29 serving as a transfer member. The paper 34 is fed into the apparatus through a sheet-feeding roller 35 and an adsorption roller 36, and is conveyed to a gap between the electrophotographic photosensitive member 18 and the transfer roller 29 by an endless belt-shaped transfer conveyance belt 32. The transfer conveyance belt 32 is operated by a driven roller 33, a driver roller 28, and a tension roller 31. A voltage is applied from a bias power source 30 to each of the developing roller 16, the developing blade 21, and the adsorption roller 36. The paper 34 onto which the toner image has been transferred is subjected to fixation treatment by a fixing apparatus 27, and is then discharged to the outside of the apparatus. Thus, a printing operation is completed. Meanwhile, transfer residual toner remaining on the electrophotographic photosensitive member 18 without being transferred is scraped off by the cleaning blade 26 serving as a cleaning member for cleaning the surface of the photosensitive member, and is stored in the waste toner-storing container 25. The cleaned electrophotographic photosensitive member 18 repeatedly performs the above-mentioned printing operation.

(3) Process Cartridge

Figure 4:
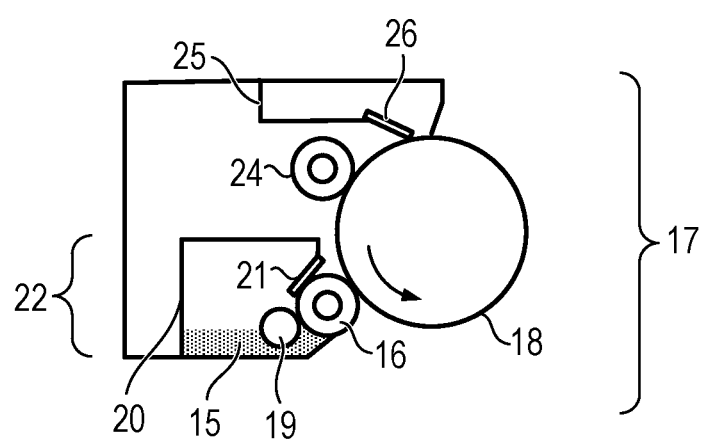
FIG. 4 is a schematic configuration view for illustrating a process cartridge according to one embodiment of the present disclosure.

The electrophotographic member according to one embodiment of the present disclosure may be suitably used as each of the developing roller 16, the charging roller 24, the toner-supplying roller 19, the developing blade 21, and the cleaning blade 26 in a process cartridge 17. FIG. 4 is a schematic sectional view for illustrating an example of the process cartridge 17 according to one embodiment of the present disclosure. In FIG. 4, the electrophotographic member is mounted as the developing roller 16. The process cartridge 17 is removably mounted onto the main body of an electrophotographic image-forming apparatus. In addition, the process cartridge 17 is obtained by integrating the developing apparatus 22, which includes the developing roller 16 serving as a developing unit and the developing blade 21, the electrophotographic photosensitive member 18, the cleaning blade 26 serving as a cleaning unit, the waste toner-storing container 25, and the charging roller 24 serving as a charging unit. The developing apparatus 22 further includes the toner container 20, and the toner 15 is loaded into the toner container 20. The toner 15 in the toner container 20 is supplied to the surface of the developing roller 16 by the toner-supplying roller 19, and a layer of the toner 15 having a predetermined thickness is formed on the surface of the developing roller 16 by the developing blade 21.

According to one embodiment of the present disclosure, the electrophotographic member that shows a small increase in resistance value even when used under a low-temperature environment having a temperature of, for example, 0° C. is obtained by incorporating, into the resin layer, the combination of the resin containing a specific cation structure, the anion, and the inorganic particles having a hydrophobicity degree of 40% or more and 80% or less. In addition, according to one embodiment of the present disclosure, the process cartridge and the electrophotographic image-forming apparatus each of which can stably output a high-quality electrophotographic image are obtained.

EXAMPLES

Now, specific Examples and Comparative Examples of the electrophotographic member according to one embodiment of the present disclosure are described.

First, raw material compounds needed for producing an ionic compound and a binder resin serving as raw materials for a resin to be incorporated into the resin layer of the electrophotographic member were synthesized. In addition, inorganic particles to be incorporated into the resin layer of the electrophotographic member were prepared.

<Synthesis of Ionic Compound>

(Ionic Compound I-1)

15.0 Grams of bis(2-hydroxyethyl)dimethylammonium chloride (manufactured by Tokyo Chemical Industry Co., Ltd.) was dissolved in 40.0 g of ion-exchanged water. Next, 37.7 g of lithium bis(pentafluoroethanesulfonyl)imide (manufactured by Kishida Chemical Co., Ltd.) serving as an anion exchange reagent (hereinafter referred to as "anion raw material") dissolved in 60 g of ion-exchanged water was dropped in the solution over 30 minutes, and then the mixture was stirred at 30° C. for 2 hours. The resultant reaction solution was subjected to an extraction operation with 100.0 g of ethyl acetate twice. Subsequently, the ethyl acetate layer separated from the solution was washed with 60 g of ion-exchanged water three times. Subsequently, ethyl acetate was removed by evaporation under reduced pressure. Thus, an ionic compound I-1 whose anion was a bis(pentafluoroethanesulfonyl)imide anion was obtained. The ionic compound I-1 is a compound represented by the following formula.

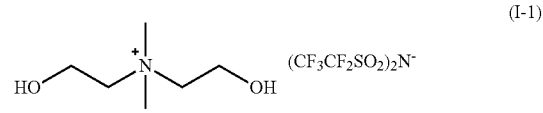

(I-1)

(Ionic Compounds I-2 to I-6)

Ionic compounds I-2 to I-6 were each obtained in the same manner as in the synthesis of the ionic compound I-1 except that the anion raw material and its blending amount were changed as shown in Table 1.

TABLE 1

| Ionic compound | Anion raw material | |
|---|---|---|
| | Product name | Mass (g) |
| I-2 | Sodium perchlorate (anhydrous) (manufactured by Kanto Chemical Co., Inc.) | 11.9 |
| I-3 | Lithium tetrafluoroborate (manufactured by Tokyo Chemical Industry Co., Ltd.) | 9.2 |
| I-4 | Potassium N,N-hexafluoropropane-1,3-disulfonylimide (product name: EF-N302; manufactured by Mitsubishi Materials Electronic Chemicals Co., Ltd.) | 32.2 |
| I-5 | Sodium dicyanamide (manufactured by Tokyo Chemical Industry Co., Ltd.) | 8.7 |
| I-6 | Lithium trifluoromethanesulfonate (product name: EF-15; manufactured by Mitsubishi Materials Electronic Chemicals Co., Ltd.) | 15.2 |

(Ionic Compound I-7)

30.0 Grams of a 50% aqueous solution of tris(2-hydroxyethyl)methylammonium hydroxide (manufactured by Tokyo Chemical Industry Co., Ltd.) was dissolved in 50.0 g of ion-exchanged water. Next, 30.8 g of potassium nonafluorobutanesulfonate (product name: KFBS; manufactured by Mitsubishi Materials Electronic Chemicals Co., Ltd.) serving as an anion raw material dissolved in 30 g of ion-exchanged water was dropped in the solution over 30 minutes, and then the mixture was stirred at 30° C. for 6 hours. The resultant reaction solution was subjected to an extraction operation with 100.0 g of ethyl acetate twice. Subsequently, the ethyl acetate layer separated from the solution was washed with 80 g of ion-exchanged water three times. Subsequently, ethyl acetate was removed by evaporation under reduced pressure. Thus, an ionic compound I-7 was obtained. The ionic compound I-7 is a compound represented by the following formula.

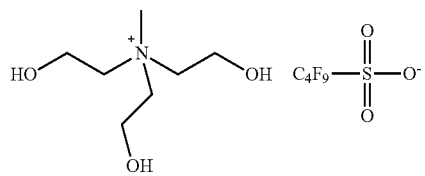
(I-7)

(Ionic Compounds I-8 to I-11)

Ionic compounds I-8 to I-11 were each obtained in the same manner as in the synthesis of the ionic compound I-7 except that the anion raw material and its blending amount were changed as shown in Table 2.

TABLE 2

| Ionic compound | Anion raw material | |
|---|---|---|
| | Product name | Mass (g) |
| I-8 | Potassium N,N-hexafluoropropane-1,3-disulfonylimide (product name: EF-N302; manufactured by Mitsubishi Materials Electronic Chemicals Co., Ltd.) | 30.1 |
| I-9 | Sodium dicyanamide (manufactured by Tokyo Chemical Industry Co., Ltd.) | 8.1 |
| I-10 | Lithium tetrafluoroborate (manufactured by Tokyo Chemical Industry Co., Ltd.) | 8.6 |
| I-11 | Sodium thiocyanate (manufactured by Wako Pure Chemical Industries, Ltd.) | 7.4 |

(Ionic Compound I-12)

15.0 Grams of diethylenetriamine (manufactured by Tokyo Chemical Industry Co., Ltd.) was dissolved in 35.0 g of tetrahydrofuran. Next, a reaction system was placed under a nitrogen atmosphere and cooled with ice. Subsequently, 45.5 g of methyl iodide (manufactured by Tokyo Chemical Industry Co., Ltd.) dissolved in 80.0 g of tetrahydrofuran was dropped in the solution over 30 minutes. The reaction solution was heated to reflux for 12 hours, and then 100 ml of water was added thereto, followed by the removal of the solvent by evaporation under reduced pressure. 100 Milliliters of ethanol was added to the residue, and the mixture was stirred at room temperature. Insoluble matter was removed by Celite filtration, and then the solvent was removed by evaporation under reduced pressure again. The resultant product was dissolved in 160 ml of pure water, and 37.7 g of sodium heptafluorobutyrate (manufactured by Wako Pure Chemical Industries, Ltd.) was added as an anion raw material to the solution, followed by stirring under room temperature for 1 hour. The resultant reaction solution was subjected to an extraction operation with 100.0 g of ethyl acetate twice. Next, the ethyl acetate layer separated from the solution was washed with 60 g of ion-exchanged water three times. Subsequently, ethyl acetate was removed by evaporation under reduced pressure. Thus, an ionic compound I-12 was obtained. The ionic compound I-12 is a compound represented by the following formula.

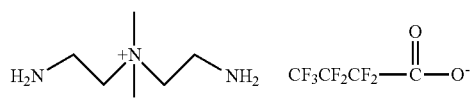
(I-12)

(Ionic Compound I-13)

An ionic compound I-13 was obtained in the same manner as in the synthesis of the ionic compound I-12 except that the anion raw material and its blending amount were changed as shown in Table 3.

TABLE 3

| Ionic compound | Anion raw material | |
|---|---|---|
| | Product name | Mass (g) |
| I-13 | Sodium perchlorate (anhydrous) (manufactured by Kanto Chemical Co., Inc.) | 19.5 |

(Ionic Compound I-14)

15.0 Grams of 2-methylimidazole-1-ethanol (manufactured by Sigma-Aldrich) and 9.2 g of a 60% dispersion of sodium hydride in liquid paraffin (manufactured by Tokyo Chemical Industry Co., Ltd.) were dissolved in 80.0 g of tetrahydrofuran. 14.5 Grams of ethyl bromide (manufactured by Showa Chemicals Co., Ltd.) dissolved in 80.0 g of tetrahydrofuran was dropped in the solution at room temperature over 30 minutes, and then the mixture was heated to reflux at 85° C. for 12 hours. Next, 100 ml of water was added to the reaction solution, and the solvent was removed by evaporation under reduced pressure. 200 Milliliters of ethanol was added to the residue, and the mixture was stirred at room temperature. Insoluble matter was removed by Celite filtration, and then the solvent was removed by evaporation under reduced pressure again. The resultant product was dissolved in 100 ml of pure water, and 38.2 g of lithium N,N-bis(trifluoromethanesulfonyl)imide (product name: EF-N115, manufactured by Mitsubishi Materials Electronic Chemicals Co., Ltd.) was added as an anion raw material to the solution, followed by stirring under room temperature for 1 hour. 100 Milliliters of ethyl acetate was added to the reaction solution, and the organic layer was washed with 80 g of ion-exchanged water three times. Next, ethyl acetate was removed by evaporation under reduced pressure. Thus, an ionic compound I-14 was obtained. The ionic compound I-14 is a compound represented by the following formula.

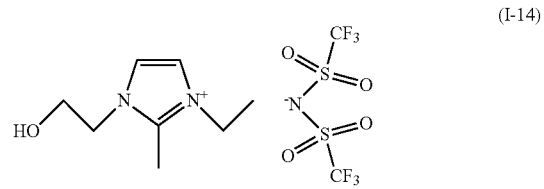
(I-14)

(Ionic Compound I-15)

Under a nitrogen atmosphere, 15.0 g of imidazole (manufactured by The Nippon Synthetic Chemical Industry Co., Ltd.) and 9.2 g of a 60% dispersion of sodium hydride in liquid paraffin (manufactured by Tokyo Chemical Industry Co., Ltd.) were dissolved in 60.0 g of tetrahydrofuran. 60.7 Grams of 2-bromoethanol (manufactured by Tokyo Chemical Industry Co., Ltd.) dissolved in 80.0 g of tetrahydrofuran was dropped in the solution at room temperature over 30 minutes, and then the mixture was heated to reflux at 85° C. for 12 hours. Next, 100 ml of water was added to the reaction solution, and the solvent was removed by evaporation under reduced pressure. 200 Milliliters of ethanol was added to the residue, and the mixture was stirred at room temperature. Insoluble matter was removed by Celite filtration, and then the solvent was removed by evaporation under reduced pressure again. The resultant product was dissolved in 200 ml of pure water, and 69.6 g of lithium N,N-bis(trifluoromethanesulfonyl)imide (product name: EF-N115, manufactured by Mitsubishi Materials Electronic Chemicals Co., Ltd.) was added as an anion raw material to the solution, followed by stirring under room temperature for 1 hour. 200 Milliliters of ethyl acetate was added to the reaction solution, and the organic layer was washed with 120 g of ion-exchanged water three times. Next, ethyl acetate was removed by evaporation under reduced pressure. Thus, an ionic compound I-15 was obtained. The ionic compound I-15 is a compound represented by the following formula.

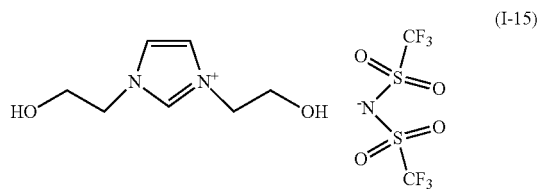

(I-15)

(Ionic Compounds I-16 to I-19)

Ionic compounds I-16 to I-19 were each obtained in the same manner as in the synthesis of the ionic compound I-15 except that the anion raw material and its blending amount were changed as shown in Table 4.

TABLE 4

| Ionic compound | Anion raw material Product name | Mass (g) |
| --- | --- | --- |
| I-16 | Lithium trifluoroacetate (manufactured by Wako Pure Chemical Industries, Ltd.) | 29.1 |
| I-17 | Potassium N,N-bis(fluorosulfonyl)imide (product name: "K-FSI"; manufactured by Mitsubishi Materials Electronic Chemicals Co., Ltd.) | 53.1 |
| I-18 | Lithium trifluoromethanesulfonate (product name: EF-15; manufactured by Mitsubishi Materials Electronic Chemicals Co., Ltd.) | 37.9 |
| I-19 | Sodium thiocyanate (manufactured by Wako Pure Chemical Industries, Ltd.) | 19.7 |

(Ionic Compound I-20)

Under a nitrogen atmosphere, 15.0 g of imidazole-2-ethanol (manufactured by Sigma-Aldrich) and 9.2 g of a 60% dispersion of sodium hydride in liquid paraffin (manufactured by Tokyo Chemical Industry Co., Ltd.) were dissolved in 60.0 g of tetrahydrofuran. 42.1 Grams of 2-bromoethanol (manufactured by Tokyo Chemical Industry Co., Ltd.) dissolved in 80.0 g of tetrahydrofuran was dropped in the solution at room temperature over 30 minutes, and then the mixture was heated to reflux at 85° C. for 12 hours. Next, 100 ml of water was added to the reaction solution, and the solvent was removed by evaporation under reduced pressure. 200 Milliliters of ethanol was added to the residue, and the mixture was stirred at room temperature. Insoluble matter was removed by Celite filtration, and then the solvent was removed by evaporation under reduced pressure again. The resultant product was dissolved in 200 ml of pure water, and 48.3 g of lithium N,N-bis(trifluoromethanesulfonyl)imide (product name: EF-N115, manufactured by Mitsubishi Materials Electronic Chemicals Co., Ltd.) was added as an anion raw material to the solution, followed by stirring under room temperature for 1 hour. 200 Milliliters of ethyl acetate was added to the reaction solution, and the organic layer was washed with 120 g of ion-exchanged water three times. Next, ethyl acetate was removed by evaporation under reduced pressure. Thus, an ionic compound I-20 was obtained. The ionic compound I-20 is a compound represented by the following formula.

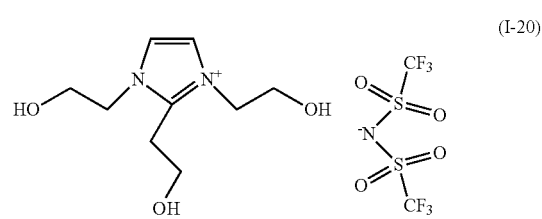

(I-20)

(Ionic Compound I-21)

15.0 Grams of imidazole (manufactured by Tokyo Chemical Industry Co., Ltd.) was dissolved as a cation raw material in 50.0 g of dichloromethane, and 44.9 g of epichlorohydrin (manufactured by Tokyo Chemical Industry Co., Ltd.) dissolved in 50.0 g of dichloromethane was dropped in the solution at room temperature over 30 minutes. After that, the mixture was heated to reflux for 6 hours. Next, the reaction solution was cooled to room temperature, and 200 ml of a 5 mass % aqueous solution of sodium carbonate was added to the solution, followed by stirring for 30 minutes. After that, the mixture was subjected to liquid separation, and the dichloromethane layer was washed with 120 g of ion-exchanged water twice. Next, dichloromethane was removed by evaporation under reduced pressure. Thus, a residue was obtained.

Further, the resultant residue was dissolved in 50.0 g of acetone, and then 69.6 g of lithium N,N-bis(trifluoromethanesulfonyl)imide (product name: EF-N115, manufactured by Mitsubishi Materials Electronic Chemicals Co., Ltd.) serving as an anion raw material dissolved in 150.0 g of ion-exchanged water was dropped in the solution over 30 minutes. After that, the mixture was stirred at 30° C. for 2 hours. The resultant solution was subjected to liquid separation, and the organic layer was washed with 50.0 g of ion-exchanged water three times. Subsequently, acetone was removed by evaporation under reduced pressure. Thus, an ionic compound I-21 was obtained. The ionic compound I-21 is a compound represented by the following formula.

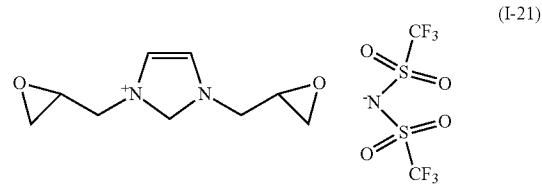

(I-21)

(Ionic Compound I-22)

15.0 Grams of 5-methylpyrazine-2-methanol (manufactured by Sigma-Aldrich) and 9.2 g of a 60% dispersion of sodium hydride in liquid paraffin (manufactured by Tokyo Chemical Industry Co., Ltd.) were dissolved in 80.0 g of tetrahydrofuran. 18.9 Grams of methyl iodide (manufactured by Tokyo Chemical Industry Co., Ltd.) dissolved in 80.0 g of tetrahydrofuran was dropped in the solution at room temperature over 30 minutes, and then the mixture was heated to reflux at 85° C. for 12 hours. Next, 100 ml of water was added to the reaction solution, and the solvent was removed by evaporation under reduced pressure. 200 Milliliters of ethanol was added to the residue, and the mixture was stirred at room temperature. Insoluble matter was removed by Celite filtration, and then the solvent was removed by evaporation under reduced pressure again. The resultant product was dissolved in 100 ml of pure water, and 59.8 g of potassium tris(trifluoromethanesulfonyl)methide (product name: K-TFSM, manufactured by Central Glass Co., Ltd.) was added as an anion raw material to the solution, followed by stirring under room temperature for 1 hour. 100 Milliliters of ethyl acetate was added to the reaction solution, and the organic layer was washed with 80 g of ion-exchanged water three times. Next, ethyl acetate was removed by evaporation under reduced pressure. Thus, an ionic compound I-22 was obtained. The ionic compound I-22 is a compound represented by the following formula.

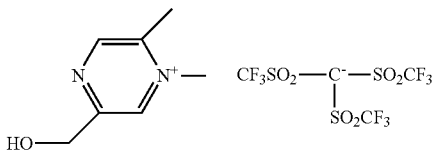

(I-22)

(Ionic Compound I-23)

15.0 Grams of N,N'-bis(2-hydroxyethyl)-2,5-dimethylpiperazine (manufactured by Sigma-Aldrich) and 9.2 g of a 60% dispersion of sodium hydride in liquid paraffin (manufactured by Tokyo Chemical Industry Co., Ltd.) were dissolved in 80.0 g of tetrahydrofuran. 11.6 Grams of methyl iodide (manufactured by Tokyo Chemical Industry Co., Ltd.) dissolved in 80.0 g of tetrahydrofuran was dropped in the solution at room temperature over 30 minutes, and then the mixture was heated to reflux at 85° C. for 12 hours. Next, 100 ml of water was added to the reaction solution, and the solvent was removed by evaporation under reduced pressure. 200 Milliliters of ethanol was added to the residue, and the mixture was stirred at room temperature. Insoluble matter was removed by Celite filtration, and then the solvent was removed by evaporation under reduced pressure again. The resultant product was dissolved in 100 ml of pure water, and 23.4 g of lithium N,N-bis(trifluoromethanesulfonyl)imide (product name: EF-N115, manufactured by Mitsubishi Materials Electronic Chemicals Co., Ltd.) was added as an anion raw material to the solution, followed by stirring under room temperature for 1 hour. 100 Milliliters of ethyl acetate was added to the reaction solution, and the organic layer was washed with 80 g of ion-exchanged water three times. Next, ethyl acetate was removed by evaporation under reduced pressure. Thus, an ionic compound I-23 was obtained. The ionic compound I-23 is a compound represented by the following formula.

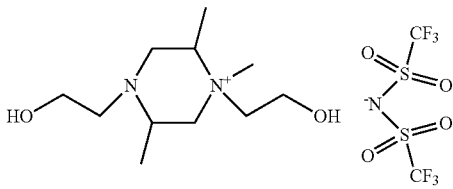

(I-23)

(Ionic Compound I-24)

15.0 Grams of 4-pyridinebutanol (manufactured by Sigma-Aldrich) was dissolved in 45.0 g of acetonitrile, and 16.7 g of 4-bromo-1-butanol (manufactured by Tokyo Chemical Industry Co., Ltd.) was dropped in the solution at room temperature over 30 minutes. After that, the mixture was heated to reflux at 90° C. for 12 hours. Next, the reaction solution was cooled to room temperature, and acetonitrile was removed by evaporation under reduced pressure. The resultant concentrate was washed with 30.0 g of diethyl ether, and the supernatant was removed by liquid separation. The washing and liquid separation operation was repeated three times to provide a residue. Further, the resultant residue was dissolved in 110.0 g of dichloromethane, and then 31.4 g of lithium N,N-bis(trifluoromethanesulfonyl)imide (product name: EF-N115, manufactured by Mitsubishi Materials Electronic Chemicals Co., Ltd.) serving as an anion raw material dissolved in 40.0 g of ion-exchanged water was dropped in the solution over 30 minutes. After that, the mixture was stirred at 30° C. for 12 hours. The resultant solution was subjected to liquid separation, and the organic layer was washed with 80.0 g of ion-exchanged water three times. Subsequently, dichloromethane was removed by evaporation under reduced pressure. Thus, an ionic compound I-24 was obtained. The ionic compound I-94 is a compound represented by the following formula.

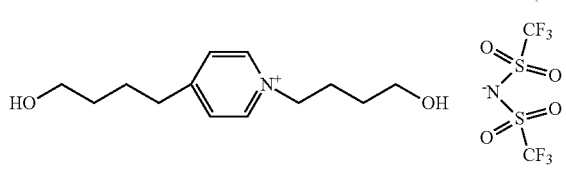

(I-24)

(Ionic Compound I-25)

15.0 Grams of 2-(2-hydroxyethyl)-1-methylpyrrolidine (manufactured by Tokyo Chemical Industry Co., Ltd.) and 13.5 g of a 60% dispersion of sodium hydride in liquid paraffin (manufactured by Tokyo Chemical Industry Co., Ltd.) were dissolved in 65.0 g of tetrahydrofuran. Next, a reaction system was placed under a nitrogen atmosphere and cooled with ice. Subsequently, 16.0 g of 2-bromoethanol (manufactured by Tokyo Chemical Industry Co., Ltd.) dissolved in 40.0 g of tetrahydrofuran was dropped in the solution over 30 minutes. The reaction solution was heated to reflux for 12 hours, and then 100 ml of water was added thereto, followed by the removal of the solvent by evaporation under reduced pressure. 80 Milliliters of ethanol was added to the residue, and the mixture was stirred at room temperature. Insoluble matter was removed by Celite filtration, and then the solvent was removed by evaporation under reduced pressure again. The resultant product was dissolved in 160 ml of pure water, and 36.7 g of lithium N,N-bis(trifluoromethanesulfonyl)imide (product name: EF-N115, manufactured by Mitsubishi Materials Electronic Chemicals Co., Ltd.) was added as an anion raw material to the solution, followed by stirring under room temperature for 1 hour. 70 Milliliters of chloroform was added to the reaction solution, and 40 ml of a 5 mass % aqueous solution of sodium carbonate was added to the mixture, followed by stirring for 30 minutes. After that, the resultant was subjected to liquid separation, and a chloroform layer was subjected to a washing operation with 50 g of ion-exchanged water three times. Next, chloroform was removed by evaporation under reduced pressure. Thus, an ionic compound I-25 was obtained. The ionic compound I-25 is a compound represented by the following formula.

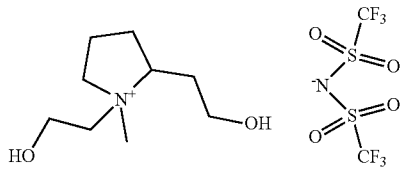
(I-25)

(Ionic Compound I-26)

An ionic compound I-26 was obtained in the same manner as in the synthesis of the ionic compound I-25 except that the anion raw material and its blending amount were changed as shown in Table 5.

TABLE 5

| Ionic compound | Anion raw material | |
|---|---|---|
| | Product name | Mass (g) |
| I-26 | Potassium N,N-bis(fluorosulfonyl)imide (product name: "K-FSI"; manufactured by Mitsubishi Materials Electronic Chemicals Co., Ltd.) | 28.0 |

(Ionic Compound I-27 for Comparative Example)

N,N,N-Trimethyl-N-propylammonium bis(trifluoromethanesulfonyl)imide (manufactured by Kanto Chemical Co., Inc.) was used as it was as an ionic compound I-27 for Comparative Example.

With regard to the respective ionic compounds used in Examples, the structures of the ionic compounds and their relationships with R1 to R9 and Z1 to Z17 in the respective structural formulae are shown in Table 6.

TABLE 6

| Ionic Compound Number | Structural formula described in claims that corresponds to ionic compound at left | Contents of R in structural formula at left | Content of Z in structural formula at left | | | Contents of d in structural formula at left |
|---|---|---|---|---|---|---|
| I-1 to I-6 | Structural formula (1) | R1 —CH$_3$ | Z1 Z101 [R10: —C$_2$H$_4$] | Z2 —CH$_3$ | Z3 Z101 [R10: —C$_2$H$_4$] | |
| I-7 to I-11 | Structural formula (1) | R1 —CH$_3$ | Z1 Z101 [R10: —C$_2$H$_4$] | Z2 Z101 [R10: —C$_2$H$_4$] | Z3 Z101 [R10: —C$_2$H$_4$] | |
| I-12 to I-13 | Structural formula (1) | R1 —CH$_3$ | Z1 Z102 [R11: —C$_2$H$_4$] | Z2 —CH$_3$ | Z3 Z102 [R11: —C$_2$H$_4$] | |
| I-14 | Structural formulae (2) and (10) | R2 and R3 (imidazolium with —CH$_3$) | Z4 Z101 [R10: —C$_2$H$_4$] | Z5 —C$_2$H$_5$ | Z6 —CH$_3$ | d1 1 |
| I-15 to I-19 | Structural formulae (2) and (10) | R2 and R3 (imidazolium) | Z4 Z101 [R10: —C$_2$H$_4$] | Z5 Z101 [R10: —C$_2$H$_4$] | Z6 | d1 0 |
| I-20 | Structural formulae (2) and (10) | R2 and R3 (imidazolium) | Z4 Z101 [R10: —C$_2$H$_4$] | Z5 Z101 [R10: —C$_2$H$_4$] | Z6 Z101 [R10: —C$_2$H$_4$] | d1 1 |

TABLE 6-continued

| Ionic Compound Number | Structural formula described in claims that corresponds to ionic compound at left | Contents of R in structural formula at left | Content of Z in structural formula at left | | | Contents of d in structural formula at left |
|---|---|---|---|---|---|---|
| I-21 | Structural formulae (2) and (10) | R2 and R3 (imidazolium ring —N⟨⟩N⁺—) | Z4<br>Z103<br>[R10: —C₂H₄] | Z5<br>Z103<br>[R10: —C₂H₄] | Z6 | d1<br>0 |
| I-22 | Structural formula (3) | R4 and R5 (dimethylpyrazinium) | Z7<br>—CH₃ | Z8<br>Z101<br>[R10: —C₂H₄] | Z8<br>—CH₃ | d2<br>2 |
| I-23 | Structural formulae (4) and (11) | R6 and R7 (methylpiperazinium) | Z9<br>Z101<br>[R10: —C₂H₄] | Z10<br>—CH₃ | Z11<br>Z101<br>[R10: —C₂H₄] | Z12 —CH₃ · d3 2 |
| I-24 | Structural formulae (5) and (12) | R8 (methylpyridinium) | Z13<br>Z101<br>[R10: —C₄H₈] | Z14<br>Z101<br>[R10: —C₄H₈] | | d4<br>1 |
| I-25 to I-26 | Structural formulae (6) and (13) | R9 (methylpyrrolidinium) | Z15<br>—CH₃ | Z16<br>Z101<br>[R10: —C₂H₄] | Z17<br>Z101<br>[R10: —C₂H₄] | d5<br>1 |

<Polyol>

(Polyols A-1 to A-11)

The following materials were used as polyols A-1 to A-11.

Polyol A-1: polyether polyol (product name: PTG-L1000, manufactured by Hodogaya Chemical Co., Ltd.)

Polyol A-2: polyester polyol (product name: Kuraray Polyol P-2010, manufactured by Kuraray Co., Ltd.)

Polyol A-3: polycaprolactone polyol (product name: PLACCEL 220, manufactured by Daicel Corporation)

Polyol A-4: polycarbonate polyol (product name: Kuraray Polyol C-2090, manufactured by Kuraray Co., Ltd.)

Polyol A-5: polyether polyol (product name: SANNIX PP-1000, manufactured by Sanyo Chemical Industries, Ltd.)

Polyol A-6: polycarbonate polyol (product name: Kuraray Polyol C-1065N, manufactured by Kuraray Co., Ltd.)

Polyol A-7: polyester polyol (product name: Nippollan 4040, manufactured by Tosoh Corporation)

Polyol A-8: polyester polyol (product name: Kuraray Polyol N-2010, manufactured by Kuraray Co., Ltd.)

Polyol A-9: polycarbonate polyol (product name: Kuraray Polyol C-3090, manufactured by Kuraray Co., Ltd.)

Polyol A-10: polyester polyol (product name: Kuraray Polyol F-2010, manufactured by Kuraray Co., Ltd.)

Polyol A-11: polycarbonate polyol (product name: Kuraray Polyol C-2015N, manufactured by Kuraray Co., Ltd.)

With regard to the respective polyols used in Examples, specific structures of the polyols are shown in Table 7.

TABLE 7

| Polyol No. | Skeleton structure corresponding to polyol at left | Structural formula described in claim that corresponds to polyol at left | Specific structure |
|---|---|---|---|
| A-1 | Polyether | Structural formula (7) | 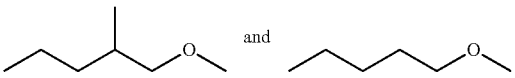 and  |
| A-2 | Polyester | Structural formula (8) | 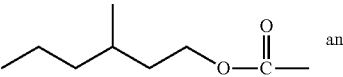 and 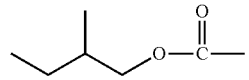 |
| A-3 | Polycaprolactone | Structural formula (8) | 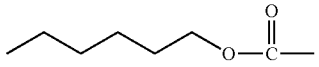 |
| A-4 | Polycaprolactone | Structural formula (9) | 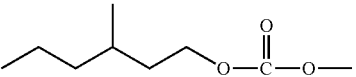 |
| A-5 | Polyether | — |  |
| A-6 | Polycarbonate | — | 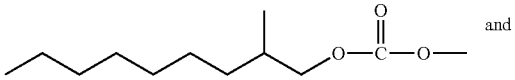 and 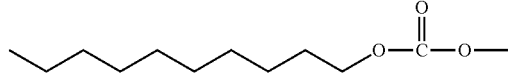 |
| A-7 | Polyester | — | 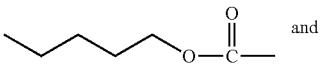 and 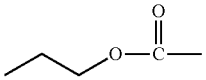 |
| A-8 | Polyester | — | 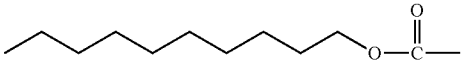 |
| A-9 | Polycarbonate | Structural formula (9) | 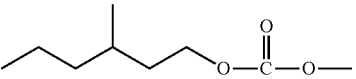 |
| A-10 | Polyester | Structural formula (8) | 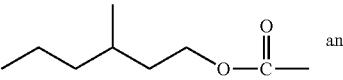 and 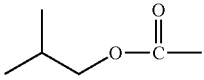 |

TABLE 7-continued

| Polyol No. | Skeleton structure corresponding to polyol at left | Structural formula described in claim that corresponds to polyol at left | Specific structure |
|---|---|---|---|
| A-11 | Polycarbonate | — | 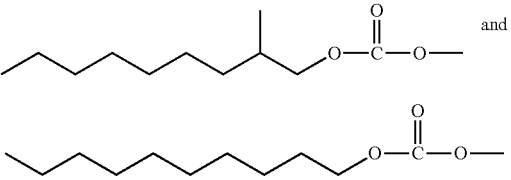 and |

<Curing Agent>

(Isocyanate Group-Terminated Prepolymer B-1)

Under a nitrogen atmosphere, 100.0 parts by mass of the polyol A-1 was gradually dropped to 86.6 parts by mass of polymeric MDI (product name: "MILLIONATE MR-200", manufactured by Nippon Polyurethane Industry Co., Ltd.) in a reaction vessel while a temperature in the reaction vessel was held at 65° C. After the completion of the dropping, the mixture was subjected to a reaction at a temperature of 65° C. for 2.5 hours, and 80.0 parts by mass of methyl ethyl ketone was added to the resultant. The resultant reaction mixture was cooled to room temperature. Thus, an isocyanate group-terminated prepolymer B-1 having an isocyanate group content of 5.4 mass % was obtained.

(Isocyanate Group-Terminated Prepolymers B-2 to B-8)

Isocyanate group-terminated prepolymers B-2 to B-8 were each obtained in the same manner as in the synthesis of the isocyanate group-terminated prepolymer B-1 except that the kind of the polyol to be used and the blending amount of the polymeric MDI with respect to 100.0 parts by mass of the polyol were changed as shown in Table 8.

TABLE 8

| Isocyanate group-terminated prepolymer | Polyol | Blending amount of polymeric MDI (part(s) by mass) |
|---|---|---|
| B-2 | A-2 | 43.3 |
| B-3 | A-3 | 43.3 |
| B-4 | A-4 | 43.3 |
| B-5 | A-5 | 86.6 |
| B-6 | A-6 | 86.6 |
| B-7 | A-7 | 43.3 |
| B-8 | A-8 | 43.3 |

<Inorganic Particles>

A commercially available product may be used as it is as the inorganic particles having a hydrophobicity degree of 40% or more and 80% or less, or may be used after having been subjected to any treatment. In addition, a treatment agent, such as an alkylsilane or a silicone oil, may be used as a method for the treatment. The kind of the treatment agent and the treatment method are by no means limited.

(Inorganic Particles P-1 to P-4)

The following commercially available products were used as inorganic particles P-1 to P-4.

Inorganic particles P-1: silica particles (product name: MSP-011, manufactured by Tayca Corporation)

Inorganic particles P-2: silica particles (product name: MSP-009, manufactured by Tayca Corporation)

Inorganic particles P-3: titanium oxide particles (product name: AEROXIDE TiO$_2$ T 805, manufactured by Nippon Aerosil Co., Ltd.)

Inorganic particles P-4: alumina particles (product name: AEROXIDE Alu C 805, manufactured by Nippon Aerosil Co., Ltd.)

(Inorganic Particles P-5)

100 Parts by mass of fumed silica (product name: AEROSIL 200, manufactured by Nippon Aerosil Co., Ltd.) was loaded into a reaction tank. Under a nitrogen atmosphere, 0.3 part by mass of water was added to the silica, and 2 parts by mass of hexamethyldisilazane (product name: SZ-31, manufactured by Shin-Etsu Silicone) was dropped and loaded into the mixture while the mixture was stirred. The resultant was stirred under heating at 200° C. for 1 hour, and then ammonia was removed under reduced pressure. Thus, inorganic particles P-5 were obtained.

(Inorganic Particles P-6)

100 Parts by mass of fumed silica (product name: AEROSIL 200, manufactured by Nippon Aerosil Co., Ltd.) was loaded into a reaction tank. Under a nitrogen atmosphere, 0.6 part by mass of 3-aminopropyltriethoxysilane (manufactured by Tokyo Chemical Industry Co., Ltd.) and 0.7 part by mass of hexamethyldisilazane (product name: SZ-31, manufactured by Shin-Etsu Silicone) were sprayed on the silica. While being placed under the nitrogen atmosphere, the resultant was held at 60° C. for 10 hours, and was then further held at 150° C. for 5 hours. After the removal of a volatile component, inorganic particles P-6 were obtained.

(Inorganic Particles P-7)

100 Parts by mass of fumed silica (product name: AEROSIL 200, manufactured by Nippon Aerosil Co., Ltd.) was loaded into a reaction tank. Under a nitrogen atmosphere, while the silica was stirred, a mixed solution of 10 parts by mass of an organopolysiloxane (product name: KF-96-50cs, manufactured by Shin-Etsu Silicone) and 10,000 parts by mass of hexane was introduced into the silica, and the mixture was held at 100° C. for 1 hour. The mixture was further stirred under heating at 300° C. for 2 hours, and the solvent was removed. After that, the residue was subjected to crushing treatment with a pin-type crusher. Under the nitrogen atmosphere, a mixed solution of 10 parts by mass of a 90% aqueous solution of methanol, 20 parts by mass of hexamethyldisilazane (product name: SZ-31, manufactured by Shin-Etsu Silicone), and 10,000 parts by mass of hexane was introduced into the pulverized product, and the mixture was stirred under heating at 200° C. for 1 hour. After that, ammonia was removed under reduced pressure. Thus, inorganic particles P-7 were obtained.

(Inorganic Particles P-8 to P-11 for Comparative Examples)

The following commercially available products were used as inorganic particles P-8 to P-11.

Inorganic particles P-8: silica particles (product name: ACEMATT OK-60, manufactured by Nippon Aerosil Co., Ltd.)

Inorganic particles P-9: titanium oxide particles (product name: MT-500B, manufactured by Tayca Corporation)

Inorganic particles P-10: alumina particles (product name: AEROXIDE Alu C, manufactured by Nippon Aerosil Co., Ltd.)

Inorganic particles P-11: silica particles (product name: OX50, manufactured by Nippon Aerosil Co., Ltd.)

(Inorganic Particles P-12 for Comparative Example)

100 Parts by mass of fumed silica (product name: AEROSIL 200, manufactured by Nippon Aerosil Co., Ltd.) was loaded into a reaction tank. Under a nitrogen atmosphere, while the silica was stirred, a mixed solution of 20 parts by mass of an organopolysiloxane (product name: KF-96-50cs, manufactured by Shin-Etsu Silicone) and 100 parts by mass of hexane was introduced into the silica, and the mixture was held at 100° C. for 1 hour. The mixture was further stirred under heating at 300° C. for 2 hours, and the solvent was removed. After that, the residue was subjected to crushing treatment with a pin-type crusher. Under the nitrogen atmosphere, 2 parts by mass of a 50% aqueous solution of methanol and 10 parts by mass of hexamethyldisilazane (product name: SZ-31, manufactured by Shin-Etsu Silicone) were dropped and loaded into the pulverized product, and the mixture was stirred under heating at 200° C. for 1 hour. After that, ammonia was removed under reduced pressure. Thus, inorganic particles P-12 were obtained.

The hydrophobicity degrees, inorganic particle cores, primary particle diameters, and treatment agents of the inorganic particles P-1 to P-12 are shown in Table 9.

TABLE 9

| Inorganic particles | Hydrophobicity degree | Inorganic particle core | Primary particle diameter | Treatment agent |
|---|---|---|---|---|
| P-1 | 60% | Silica | 30 nm | Alkylsilane Silicone oil |
| P-2 | 60% | Silica | 80 nm | Alkylsilane Silicone oil |
| P-3 | 50% | Titanium oxide | 22 nm | Alkylsilane |
| P-4 | 70% | Alumina | 15 nm | Alkylsilane |
| P-5 | 42% | Silica | 30 nm | Alkylsilane |
| P-6 | 58% | Silica | 15 nm | Alkylsilane |
| P-7 | 78% | Silica | 15 nm | Alkylsilane Silicone oil |
| P-8 | 10% or less | Silica | Secondary particle diameter 2 μm | Polyethylene wax |
| P-9 | 10% | Titanium oxide | 35 nm | — |
| P-10 | 10% | Alumina | 20 nm | — |
| P-11 | 35% | Silica | 40 nm | — |
| P-12 | 82% | Silica | 15 nm | Alkylsilane Silicone oil |

Next, an electrophotographic member was produced and evaluated.

Production of Developing Roller

Example 1

(Preparation of Substrate)

Prepared as the substrate was a product obtained by applying and baking a primer (product name: "DY39-012", manufactured by Dow Corning Toray Co., Ltd.) to a cored bar made of stainless steel (SUS304) having a diameter of 6 mm.

(Formation of Elastic Layer)

The substrate prepared in the foregoing was placed in a mold, and an addition-type silicone rubber composition obtained by mixing the following materials was injected into a cavity formed in the mold.

Liquid silicone rubber material (product name: SE6905A/B, manufactured by Dow Corning Toray Co., Ltd.) 100.0 parts by mass Carbon black (product name: TOKABLACK #4300, manufactured by Tokai Carbon Co., Ltd.) 15.0 parts by mass Platinum catalyst 0.1 part by mass Subsequently, the mold was heated, and the silicone rubber composition was vulcanized and cured at a temperature of 150° C. for 15 minutes. The substrate having a cured silicone rubber layer on its peripheral surface was removed from the mold, and then the curing reaction of the silicone rubber layer was completed by further heating the cored bar at a temperature of 180° C. for 1 hour. Thus, an elastic roller D-1 including a silicone rubber elastic layer having a diameter of 12 mm formed on the outer periphery of the substrate was produced.

(Formation of Resin Layer)

The following materials were mixed and stirred as materials for the resin layer.

Ionic compound I-15: 8.2 parts by mass
Inorganic particles P-1: 43.3 parts by mass
Polyol A-1: 100.0 parts by mass
Isocyanate group-terminated prepolymer B-1: 258.0 parts by mass
Urethane resin fine particles (product name: Art Pearl C-400, manufactured by Negami Chemical Industrial Co., Ltd.): 28.9 parts by mass Next, methyl ethyl ketone was added to the mixed solution so as to achieve a total solid content ratio of 35 mass %, and then the contents were mixed in a sand mill. Then, the viscosity of the mixture was further adjusted to from 10 cps to 12 cps with methyl ethyl ketone. Thus, a paint for forming a resin layer was prepared.

A coating film of the paint for forming a resin layer was formed on the surface of the elastic layer of the elastic roller D-1 produced in advance by immersing the elastic roller D-1 in the paint, and was dried. Further, the resultant was subjected to heating treatment at a temperature of 150° C. for 1 hour. Thus, a developing roller according to Example 1 including a resin layer having a thickness of about 15 μm formed on the outer periphery of the elastic layer was produced.

[Collection of Inorganic Particles in Resin Layer]

32 Grams of the resin layer peeled from one developing roller according to Example 1, 320 ml of diethanolamine (manufactured by Tokyo Chemical Industry Co., Ltd.) serving as a decomposer, and 1.5 ml of pure water were loaded into a flask having attached thereto a Dimroth condenser, and the mixture was heated to reflux at 160° C. for 20 hours while being stirred. 300 Milliliters of methyl ethyl ketone was added to the solution after the reaction, and the mixture was centrifuged. Further, the centrifuged product was washed with 200 ml of methyl ethyl ketone twice, and was centrifuged. After that, the centrifuged product was dried under reduced pressure. Thus, 3.2 g of the inorganic particles in the peeled resin layer were obtained.

[Measurement of Hydrophobicity Degree of Inorganic Particles in Resin Layer]

The hydrophobicity degree of the inorganic particles was measured with the powder wettability tester. As a result, the hydrophobicity degree was 60%.

Examples 2 to 15 and 17 to 30

Developing rollers according to Examples 2 to 15 and 17 to 30 were each produced in the same manner as in Example 1 except that the kinds and blending amounts of the ionic compound, the inorganic particles, the polyol, the isocyanate group-terminated prepolymer, and the urethane resin fine particles were changed as shown in Table 10.

Example 16

A developing roller according to Example 16 was produced in the same manner as in Example 1 except that the following materials were used as materials for a resin layer.

Ionic compound I-15: 2.7 parts by mass

Inorganic particles P-1: 18.8 parts by mass

Polyol A-4: 100.0 parts by mass

Isocyanate group-terminated prepolymer B-1: 122.1 parts by mass

Urethane resin fine particles (product name: Art Pearl C-400, manufactured by Negami Chemical Industrial Co., Ltd.): 18.8 parts by mass Carbon black (product name: SUNBLACK X55, manufactured by Asahi Carbon Co., Ltd.): 9.4 parts by mass Ion conductive agent (product name: EF-N115, manufactured by Mitsubishi Materials Electronic Chemicals Co., Ltd.): 2.7 parts by mass Comparative Examples 1 to 10

Developing rollers according to Comparative Examples 1 to 10 were each produced in the same manner as in Example 1 except that the kinds and blending amounts of the ionic compound, the inorganic particles, the polyol, the isocyanate group-terminated prepolymer, and the urethane resin fine particles were changed as shown in Table 11.

TABLE 10

|  | Ionic compound (part(s) by mass) | | Inorganic particles (part(s) by mass) | | Polyol (part(s) by mass) | | Isocyanate group-terminated prepolymer (part(s) by mass) | | Urethane resin fine particles (part(s) by mass) |
| --- | --- | --- | --- | --- | --- | --- | --- | --- | --- |
| Example 2 | I-20 | 9.5 | P-1 | 46.0 | A-1 | 100.0 | B-1 | 282.0 | 30.7 |
| Example 3 | I-21 | 8.6 | P-1 | 43.4 | A-1 | 100.0 | B-1 | 258.0 | 28.9 |
| Example 4 | I-14 | 7.7 | P-1 | 41.0 | A-1 | 100.0 | B-1 | 236.6 | 27.3 |
| Example 5 | I-23 | 9.3 | P-1 | 43.5 | A-1 | 100.0 | B-1 | 258.0 | 29.0 |
| Example 6 | I-24 | 9.4 | P-1 | 43.5 | A-1 | 100.0 | B-1 | 258.0 | 29.0 |
| Example 7 | I-25 | 8.5 | P-1 | 43.4 | A-1 | 100.0 | B-1 | 258.0 | 28.9 |
| Example 8 | I-15 | 8.2 | P-1 | 43.3 | A-1 | 100.0 | B-1 | 258.0 | 28.9 |
| Example 9 | I-15 | 8.2 | P-1 | 43.3 | A-1 | 100.0 | B-1 | 258.0 | 28.9 |
| Example 10 | I-15 | 8.2 | P-1 | 43.3 | A-1 | 100.0 | B-1 | 258.0 | 28.9 |
| Example 11 | I-15 | 8.2 | P-1 | 43.3 | A-1 | 100.0 | B-1 | 258.0 | 28.9 |
| Example 12 | I-15 | 8.2 | P-2 | 43.3 | A-1 | 100.0 | B-1 | 258.0 | 28.9 |
| Example 13 | I-15 | 8.2 | P-5 | 43.3 | A-1 | 100.0 | B-1 | 258.0 | 28.9 |
| Example 14 | I-15 | 8.2 | P-6 | 43.3 | A-1 | 100.0 | B-1 | 258.0 | 28.9 |
| Example 15 | I-15 | 8.2 | P-7 | 43.3 | A-1 | 100.0 | B-1 | 258.0 | 28.9 |
| Example 17 | I-15 | 5.7 | P-6 | 30.2 | A-2 | 100.0 | B-2 | 137.1 | 20.2 |
| Example 18 | I-15 | 5.7 | P-6 | 30.2 | A-3 | 100.0 | B-3 | 137.1 | 20.2 |
| Example 19 | I-15 | 5.7 | P-6 | 30.2 | A-4 | 100.0 | B-4 | 137.1 | 20.2 |
| Example 20 | I-1 | 9.6 | P-1 | 43.5 | A-1 | 100.0 | B-1 | 258.0 | 29.0 |
| Example 21 | I-7 | 9.1 | P-1 | 46.0 | A-1 | 100.0 | B-1 | 282.0 | 30.7 |
| Example 22 | I-12 | 6.7 | P-1 | 43.1 | A-1 | 100.0 | B-1 | 258.0 | 28.7 |
| Example 23 | I-22 | 9.7 | P-1 | 41.3 | A-1 | 100.0 | B-1 | 236.6 | 27.5 |
| Example 24 | I-1 | 9.6 | P-3 | 43.5 | A-1 | 100.0 | B-1 | 258.0 | 29.0 |
| Example 25 | I-1 | 9.6 | P-4 | 43.5 | A-1 | 100.0 | B-1 | 258.0 | 29.0 |
| Example 26 | I-1 | 6.7 | P-4 | 30.4 | A-1 | 100.0 | B-1 | 137.1 | 20.3 |
| Example 27 | I-1 | 9.6 | P-4 | 43.5 | A-5 | 100.0 | B-5 | 258.0 | 29.0 |
| Example 28 | I-1 | 9.6 | P-4 | 43.5 | A-6 | 100.0 | B-6 | 258.0 | 29.0 |
| Example 29 | I-1 | 6.7 | P-4 | 30.4 | A-7 | 100.0 | B-7 | 137.1 | 20.3 |
| Example 30 | I-1 | 6.7 | P-4 | 30.4 | A-8 | 100.0 | B-8 | 137.1 | 20.3 |

TABLE 11

|  | Ionic compound (part(s) by mass) | | Inorganic particles (part(s) by mass) | | Polyol (part(s) by mass) | | Isocyanate group-terminated prepolymer (part(s) by mass) | | Urethane resin fine particles (part(s) by mass) |
|---|---|---|---|---|---|---|---|---|---|
| Comparative Example 1 | I-27 | 18.5 | P-1 | 40.6 | A-1 | 100.0 | B-1 | 217.4 | 27.1 |
| Comparative Example 2 | I-15 | 14.7 | P-8 | 47.7 | A-1 | 100.0 | B-1 | 290.7 | 31.8 |
| Comparative Example 3 | I-20 | 18.1 | P-10 | 53.4 | A-1 | 100.0 | B-1 | 339.7 | 35.6 |
| Comparative Example 4 | I-21 | 15.5 | P-11 | 47.8 | A-1 | 100.0 | B-1 | 290.7 | 31.9 |
| Comparative Example 5 | I-15 | 14.7 | P-12 | 47.7 | A-1 | 100.0 | B-1 | 290.7 | 31.8 |
| Comparative Example 6 | I-23 | 16.7 | P-8 | 48.0 | A-1 | 100.0 | B-1 | 290.7 | 32.0 |
| Comparative Example 7 | I-24 | 17.0 | P-10 | 48.1 | A-1 | 100.0 | B-1 | 290.7 | 32.0 |
| Comparative Example 8 | I-25 | 15.3 | P-11 | 47.8 | A-1 | 100.0 | B-1 | 290.7 | 31.9 |
| Comparative Example 9 | I-1 | 17.3 | P-12 | 48.1 | A-1 | 100.0 | B-1 | 290.7 | 32.1 |
| Comparative Example 10 | I-7 | 17.3 | P-9 | 53.3 | A-1 | 100.0 | B-1 | 339.7 | 35.5 |

<Evaluation of Developing Roller>

The developing rollers according to Examples 1 to 30 and Comparative Examples 1 to 10 thus obtained were each evaluated for the following items. The evaluation results are collectively shown in Table 12 and Table 13.

[Measurement of Resistance Value of Roller]

Each of the developing rollers was left to stand under an environment having a temperature of 23° C. and a relative humidity of 50% (hereinafter sometimes referred to as "under a N/N environment"), and under an environment at 0° C. for 6 hours each, and then its resistance values were measured under the respective environments. Under a low-temperature environment at, for example, 0° C., a saturated water vapor pressure is much lower than that under an environment at 23° C., and hence may not affect the general trend of the results of the evaluations of the resistance value of the roller and image quality. Accordingly, a relative humidity is not particularly considered at the time of an evaluation under the environment at 0° C.

(Measurement of Resistance Value)

Figure 5A:
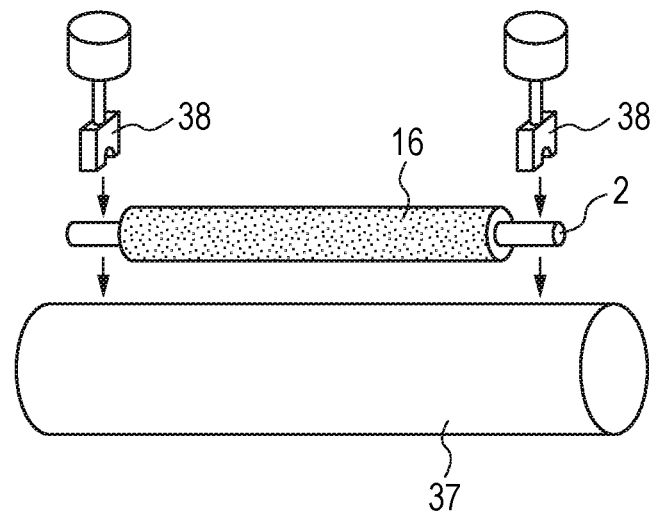
FIG. 5A and FIG. 5B are each a schematic configuration view of a jig for evaluating the resistance value of a developing roller.
Figure 5B:
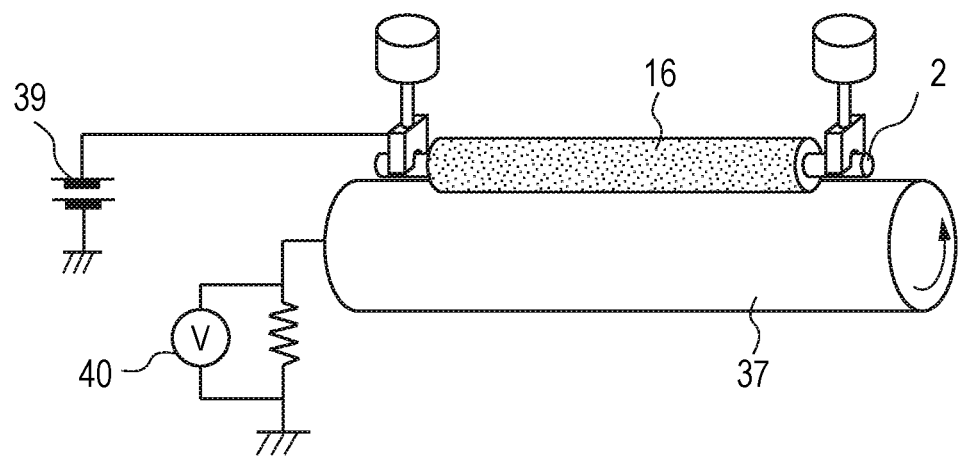

FIG. 5A and FIG. 5B are each a schematic configuration view of a jig for evaluating the resistance value of a developing roller, to be used in this measurement. As illustrated in FIG. 5A, while both ends of the electroconductive substrate 2 were each pressed with a load of 4.9 N through the intermediation of an electroconductive bearing 38, a columnar metal 37 having a diameter of 30 mm was rotated to rotationally drive the developing roller 16 at a speed of 60 rpm. Next, as illustrated in FIG. 5B, a voltage of 50 V was applied from a high-voltage power source 39, and a potential difference between both ends of a resistor having a known resistance value (having a resistance value lower than the resistance value of the developing roller 16 by two orders of magnitude or more) placed between the columnar metal 37 and the ground was measured. The potential difference was measured by using a voltmeter 40 (product name: 189TRUE RMS MULTIMETER, manufactured by Fluke Corporation). A current that had flowed through the developing roller 16 into the columnar metal 37 was determined by calculation based on the measured potential difference and the resistance value of the resistor. Then, the applied voltage of 50 V was divided by the resultant current to determine the resistance value of the developing roller 16. In the measurement of the potential difference, 2 seconds after the application of the voltage, sampling was performed for 3 seconds and a value calculated from the average value of the sampled data was defined as a roller resistance value.

[Evaluation of Performance as Developing Roller]

(Evaluation of Ghost Under Environment Having Temperature of 0° C.)

The following evaluation was performed by using a developing roller whose resistance value had been measured in the environment having a temperature of 0° C. The developing roller obtained in each of Examples and Comparative Examples was loaded as the developing roller 16 into a process cartridge for a laser printer (product name: LBP7700C, manufactured by Canon Inc.) having a configuration illustrated in FIG. 4. Then, the process cartridge was incorporated into the laser printer. The printer was placed in the environment at 0° C., and was then left to stand for 2 hours.

Then, a ghost image was evaluated. Specifically, as an image pattern, a 15 mm square solid black image was printed at a tip portion in one sheet by using black toner, and then an entire halftone image was printed on the sheet by using the toner. Then, the density unevenness (ghost) of the period of a toner carrier appearing in a halftone portion was visually observed. Evaluation criteria for the evaluation of the ghost are as described below.

Rank A: No ghost is observed.
Rank B: An extremely slight ghost is observed.
Rank C: A remarkable ghost is observed.

TABLE 12

|  | Roller resistance under N/N environment (Ω) | Roller resistance at 0° C. (Ω) | (Resistance at 0° C.)/ (resistance under N/N environment) | Ghost at 0° C. |
|---|---|---|---|---|
| Example 1 | $8.41 \times 10^6$ | $8.24 \times 10^7$ | 9.80 | A |
| Example 2 | $1.00 \times 10^7$ | $3.82 \times 10^7$ | 3.81 | A |
| Example 3 | $8.90 \times 10^6$ | $2.68 \times 10^7$ | 3.01 | A |

TABLE 12-continued

| | Roller resistance under N/N environment (Ω) | Roller resistance at 0° C. (Ω) | (Resistance at 0° C.)/ (resistance under N/N environment) | Ghost at 0° C. |
|---|---|---|---|---|
| Example 4 | $9.47 \times 10^6$ | $5.30 \times 10^7$ | 5.60 | A |
| Example 5 | $9.26 \times 10^6$ | $5.93 \times 10^7$ | 6.40 | A |
| Example 6 | $9.50 \times 10^6$ | $6.69 \times 10^7$ | 7.04 | A |
| Example 7 | $7.97 \times 10^6$ | $1.77 \times 10^7$ | 2.22 | A |
| Example 8 | $8.08 \times 10^6$ | $3.01 \times 10^7$ | 3.72 | A |
| Example 9 | $7.89 \times 10^6$ | $3.95 \times 10^7$ | 5.01 | A |
| Example 10 | $7.59 \times 10^6$ | $6.80 \times 10^7$ | 8.96 | A |
| Example 11 | $6.60 \times 10^6$ | $4.86 \times 10^7$ | 7.37 | A |
| Example 12 | $1.10 \times 10^7$ | $4.88 \times 10^7$ | 4.42 | A |
| Example 13 | $9.57 \times 10^6$ | $8.34 \times 10^7$ | 8.72 | A |
| Example 14 | $9.44 \times 10^6$ | $1.05 \times 10^8$ | 11.11 | B |
| Example 15 | $1.18 \times 10^7$ | $1.45 \times 10^8$ | 12.30 | B |
| Example 16 | $9.12 \times 10^6$ | $4.67 \times 10^7$ | 5.12 | A |
| Example 17 | $1.15 \times 10^7$ | $7.75 \times 10^7$ | 6.71 | A |
| Example 18 | $1.13 \times 10^7$ | $5.18 \times 10^7$ | 4.60 | A |
| Example 19 | $1.11 \times 10^7$ | $8.55 \times 10^7$ | 7.71 | A |
| Example 20 | $8.61 \times 10^6$ | $9.10 \times 10^7$ | 10.57 | A |
| Example 21 | $8.30 \times 10^6$ | $2.70 \times 10^7$ | 3.26 | A |
| Example 22 | $1.03 \times 10^7$ | $8.31 \times 10^7$ | 8.05 | A |
| Example 23 | $1.15 \times 10^7$ | $1.58 \times 10^8$ | 13.66 | B |
| Example 24 | $1.25 \times 10^7$ | $1.22 \times 10^8$ | 9.74 | B |
| Example 25 | $1.02 \times 10^7$ | $6.02 \times 10^7$ | 5.88 | A |
| Example 26 | $1.28 \times 10^7$ | $1.72 \times 10^8$ | 13.46 | B |
| Example 27 | $1.17 \times 10^7$ | $1.48 \times 10^8$ | 12.67 | B |
| Example 28 | $1.31 \times 10^7$ | $1.86 \times 10^8$ | 14.23 | B |
| Example 29 | $1.22 \times 10^7$ | $2.10 \times 10^8$ | 17.24 | B |
| Example 30 | $1.24 \times 10^7$ | $1.12 \times 10^8$ | 9.01 | B |
| Comparative Example 1 | $1.35 \times 10^7$ | $1.17 \times 10^9$ | 86.66 | C |
| Comparative Example 2 | $1.40 \times 10^7$ | $8.49 \times 10^8$ | 60.57 | C |
| Comparative Example 3 | $1.44 \times 10^7$ | $8.05 \times 10^8$ | 56.04 | C |
| Comparative Example 4 | $1.39 \times 10^7$ | $8.63 \times 10^8$ | 62.29 | C |
| Comparative Example 5 | $1.39 \times 10^7$ | $8.08 \times 10^8$ | 58.30 | C |
| Comparative Example 6 | $1.29 \times 10^7$ | $8.43 \times 10^8$ | 65.08 | C |
| Comparative Example 7 | $1.26 \times 10^7$ | $7.43 \times 10^8$ | 58.80 | C |
| Comparative Example 8 | $1.33 \times 10^7$ | $7.93 \times 10^8$ | 59.83 | C |
| Comparative Example 9 | $1.30 \times 10^7$ | $8.25 \times 10^8$ | 63.63 | C |
| Comparative Example 10 | $1.26 \times 10^7$ | $9.29 \times 10^8$ | 74.01 | C |

As shown in Table 12, each of the developing rollers according to Examples 1 to 30 showed a small increase in resistance value under a low-temperature environment having a temperature of, for example, 0° C., and satisfactorily maintained image quality because the resin layers of the rollers each contained a resin containing a specific cation structure, an anion, and inorganic particles having a hydrophobicity degree of 40% or more and 80% or less. In, for example, Example 1 and Comparative Example 2 in which the resin layers had the same composition except the inorganic particles, an increase in resistance value at low temperature in Example 1 in which the inorganic particles P-1 having a hydrophobicity degree of 60% were used was smaller than that in Comparative Example 2 in which the inorganic particles P-8 having a hydrophobicity degree of 10% were used. In addition, particularly in each of Examples 1 to 4, 8 to 11, and 16 in each of which a resin containing at least one structure selected from the group consisting of structures represented by the structural formulae (2) and (10), and the inorganic particles P-1 having a hydrophobicity degree of 60% and a primary particle diameter of 30 nm, and subjected to the hydrophobic treatment with the alkylsilane and the silicone oil were used, an increase in resistance value was suppressed at a higher level.

Meanwhile, in each of the developing rollers according to Comparative Examples 1 to 10 whose resin layers were each free of a specific cation structure or inorganic particles having a hydrophobicity degree of 40% or more and 80% or less, an increase in resistance value and the occurrence of a ghost image were observed under a low-temperature environment.

[Measurement of Tack Value]

A resin sheet corresponding to each of Examples was produced as a sample for measuring a tack value by the following procedure. The paint for forming a resin layer was cast in a mold so as to have a thickness of 200 μm, and was dried until its fluidity disappeared. After that, the mold was mounted on a horizontal table, and the dried product was dried at an air temperature of 23° C. for 24 hours. Then, the dried product was subjected to heating treatment at a temperature of 150° C. for 1 hour. The heated product was cooled to room temperature, and was then peeled from the mold. Thus, the resin sheet serving as a test piece for measuring a tack value was obtained.

A tacking tester (product name: TAC-II, manufactured by Rhesca Co., Ltd.) was used in the measurement of the tack value of the resin sheet. The resin sheet was left at rest under an environment having a temperature of 40° C. and a relative humidity of 95% for 24 hours, and then the measurement was performed under the following conditions. The measurement was performed three times, and the average value of the measured values was defined as the tack value. As the tack value to be obtained as described above becomes lower, the tackiness of the surface of the resin sheet reduces, and hence toner sticking to the surface can be suppressed. The term "toner sticking" refers to, for example, a phenomenon in which, when an electrophotographic member serving as a developer carrier is left to stand under a high-temperature and high-humidity environment for a long time period, toner sticks to the surface of the developer carrier.

Measurement contact portion: A stainless steel-made probe having a diameter of 5 mm
Load sensor: LT25A-100
Penetration speed at the time of contact: 30 mm/min
Lifting speed at the time of the test: 600 mm/min
Load at the time of the contact: 60 gf
Contact rest time: 5 seconds
Measurement environment: An environment having a temperature of 40° C. and a relative humidity of 95%

[Evaluation of Initial Sticking Density of Toner]

The following evaluation was performed as the evaluation of the initial sticking density of toner by using a developing roller whose resistance value had been measured. The developing roller obtained in each of Examples and Comparative Examples was loaded as the developing roller 16 into a yellow toner process cartridge for a laser printer (product name: LBP7700C, manufactured by Canon Inc.) having a configuration illustrated in FIG. 4. Then, an operation of outputting a white solid image was performed with the laser printer to establish a state in which the surface of the developing roller was coated with yellow toner. The amount of the toner per unit area of the surface was separately measured to be 0.45 mg/cm². Herein, the amount of the toner per unit area on the developing roller was determined by: sucking and collecting the toner on the developing roller with a suction-type Faraday gauge having a filter in itself; and dividing an increase in mass of the filter at that time by the area of the surface from which the toner was collected.

The developing roller in such state was removed from the yellow toner process cartridge. The removed developing roller was mounted on a polytetrafluoroethylene-made flat plate. The developing roller was brought into press contact with the flat plate at a load of 300 gf (a load of 150 gf on each of both ends of a mandrel), and was left to stand under an environment having a temperature of 40° C. and a relative humidity of 95% for 3 months. Next, the developing roller was released from the state of being in press contact with the flat plate, and was left at rest under an environment having a temperature of 25° C. and a relative humidity of 45% for 3 hours. After that, air was blown onto the entirety of the surface of the developing roller. Herein, the air blowing was performed under the conditions of: an aperture of the nozzle of an air blow gun of 3 mm; a pressure of high-pressure air or a nitrogen gas of 0.6 MPa; a distance between the surface of the developing roller and the nozzle of 20 cm; a reciprocating movement speed of the gun in the longitudinal direction of the developing roller of 30 cm/s; a number of revolutions of the developing roller of 30 rpm; and a blowing time of 30 s.

Next, the toner that could not have been removed by the air blowing and hence stuck onto the developing roller was peeled with an adhesive tape (product name: MENDING TAPE, manufactured by Sumitomo 3M Limited). The adhesive tape to which the yellow toner had adhered was placed on plain paper, and its reflection density was measured with a reflection densitometer (product name: TC-6DS/A, manufactured by Tokyo Denshoku Co., Ltd.). In addition, as a control, an adhesive tape to which no toner adhered was similarly placed on plain paper, and its reflection density was similarly measured. Then, a reflectance reduction amount (%) was calculated with respect to the reflection density of the adhesive tape to which no toner adhered.

The measurement was performed at a total of 3 points, that is, the central portion of the developing roller and both end portions thereof, and the arithmetic average value of the measured values was defined as the initial sticking density of the toner of the developing roller to be evaluated. It can be said that, as the initial sticking density becomes lower, the sticking of the toner to the surface of the developing roller can be suppressed to a larger extent.

TABLE 13

|  | Tack value (gf) | Initial sticking density (reflectance reduction amount) (%) |
| --- | --- | --- |
| Example 1 | 37 | 1.0 |
| Example 2 | 49 | 1.5 |
| Example 3 | 29 | 1.1 |
| Example 4 | 28 | 1.0 |
| Example 5 | 31 | 1.4 |
| Example 6 | 33 | 1.2 |
| Example 7 | 37 | 0.8 |
| Example 8 | 35 | 0.9 |
| Example 9 | 29 | 0.9 |
| Example 10 | 34 | 1.2 |
| Example 11 | 43 | 1.2 |
| Example 12 | 25 | 1.0 |
| Example 13 | 36 | 1.4 |
| Example 14 | 38 | 1.0 |
| Example 15 | 37 | 1.3 |
| Example 16 | 46 | 0.9 |
| Example 17 | 39 | 1.5 |
| Example 18 | 33 | 0.9 |

TABLE 13-continued

|  | Tack value (gf) | Initial sticking density (reflectance reduction amount) (%) |
| --- | --- | --- |
| Example 19 | 43 | 1.2 |
| Example 20 | 28 | 1.2 |
| Example 21 | 48 | 1.1 |
| Example 22 | 25 | 1.1 |
| Example 23 | 48 | 0.9 |
| Example 24 | 26 | 1.2 |
| Example 25 | 37 | 1.5 |
| Example 26 | 46 | 1.3 |
| Example 27 | 77 | 4.3 |
| Example 28 | 79 | 5.0 |
| Example 29 | 81 | 5.1 |
| Example 30 | 75 | 5.3 |

As shown in Table 13, the tack values of the resins according to Examples 1 to 26 were suppressed to relatively low levels because the resins each contained a specific structure represented by any one of the structural formulae (7) to (9). In addition, a reduction in initial sticking density evaluated by using a developing roller containing the corresponding resin in its resin layer was also suppressed to a relatively low level.

Production of Charging Roller

Example 31

(Preparation of Substrate)
Prepared as the substrate was a product obtained by applying and baking a primer (product name: "DY39-012", manufactured by Dow Corning Toray Co., Ltd.) to a cored bar made of stainless steel (SUS304) having a diameter of 6 mm.

(Formation of Elastic Layer)
The following respective materials were mixed with a pressure-type kneader to provide an A-kneaded rubber composition.

NBR rubber (product name: Nipol DN219, manufactured by Zeon Corporation): 100.0 parts by mass Carbon black (product name: TOKABLACK #4300, manufactured by Tokai Carbon Co., Ltd.): 40.0 parts by mass Calcium carbonate (product name: NANOX #30, manufactured by Maruo Calcium Co., Ltd.): 20.0 parts by mass Stearic acid (product name: Stearic Acid S, manufactured by Kao Corporation): 1.0 part by mass Further, 166.0 parts by mass of the resultant A-kneaded rubber composition and the following respective materials were mixed with an open roll to prepare an unvulcanized rubber composition.

Sulfur (product name: Sulfax 200S, manufactured by Tsurumi Chemical Industry Co., Ltd.): 1.2 parts by mass Tetrabenzylthiuram disulfide (product name: TBZTD, manufactured by Sanshin Chemical Industry Co., Ltd.): 4.5 parts by mass Next, a crosshead extruder having a mechanism for supplying an electroconductive mandrel and a mechanism for discharging an unvulcanized rubber roller was prepared. A die having an inner diameter of 16.5 mm was attached to a crosshead, and the temperature of each of the extruder and the crosshead, and the speed at which the electroconductive mandrel was conveyed were adjusted to 80° C. and 60 mm/sec, respectively. Under the foregoing conditions, the unvulcanized rubber composition was supplied from the extruder, and the electroconductive mandrel was covered with the unvulcanized rubber composition as an elastic layer in the crosshead. Thus, an unvulcanized rubber roller was obtained. Next, the unvulcanized rubber roller was loaded into a hot-air vulcanizing furnace at 170° C., and was heated for 60 minutes to provide an unpolished electroconductive roller. After that, the end portions of the elastic layer were cut off, and the surface of the elastic layer was polished with a rotary grindstone. Thus, an elastic roller D-2 having a diameter at each of positions distant from its central portion toward both of its end portions by 90 mm each of 8.4 mm, and having a diameter at the central portion of 8.5 mm was produced.

(Formation of Resin Layer)

The following materials were mixed and stirred as materials for a resin layer.

Ionic compound I-15: 14.7 parts by mass
Inorganic particles P-1: 47.7 parts by mass
Polyol A-1: 100.0 parts by mass
Isocyanate group-terminated prepolymer B-1: 290.7 parts by mass
Urethane resin fine particles (product name: "Art Pearl C-400", manufactured by Negami Chemical Industrial Co., Ltd.) 31.8 parts by mass Next, methyl ethyl ketone was added so as to achieve a total solid content ratio of 30 mass %, and then the contents were mixed in a sand mill. Then, the viscosity of the mixture was further adjusted to from 10 cps to 12 cps with methyl ethyl ketone. Thus, a paint for forming a resin layer was prepared.

A coating film of the paint for forming a resin layer was formed on the surface of the elastic layer of the elastic roller D-2 produced in advance by immersing the elastic roller D-2 in the paint, and was dried. Further, the resultant was subjected to heating treatment at a temperature of 150° C. for 1 hour. Thus, a charging roller according to Example 31 including a resin layer having a thickness of about 15 m formed on the outer periphery of the elastic layer according to Example 31 was produced.

Examples 32, 33, 35, and 36

Charging rollers according to Examples 32, 33, 35, and 36 were each produced in the same manner as in Example 31 except that the kinds and blending amounts of the ionic compound, the inorganic particles, the polyol, the isocyanate group-terminated prepolymer, and the urethane resin fine particles were changed as shown in Table 14.

TABLE 14

|  | Ionic compound (part(s) by mass) | | Inorganic particles (part(s) by mass) | | Polyol (part(s) by mass) | | Isocyanate group-terminated prepolymer (part(s) by mass) | | Urethane resin fine particles (part(s) by mass) |
| --- | --- | --- | --- | --- | --- | --- | --- | --- | --- |
| Example 32 | I-23 | 11.7 | P-1 | 44.7 | A-1 | 100.0 | B-1 | 159.9 | 22.4 |
| Example 33 | I-1 | 12.1 | P-6 | 44.8 | A-2 | 100.0 | B-2 | 159.9 | 22.4 |
| Example 35 | I-12 | 8.5 | P-4 | 44.1 | A-2 | 100.0 | B-2 | 159.9 | 22.0 |
| Example 36 | I-1 | 17.3 | P-4 | 64.2 | A-6 | 100.0 | B-6 | 290.7 | 32.1 |

Example 34

A charging roller according to Example 34 was produced in the same manner as in Example 31 except that the following materials serving as materials for a resin layer were mixed and stirred.

Ionic compound I-7: 12.1 parts by mass
Inorganic particles P-3: 37.2 parts by mass
Polyol A-2: 100.0 parts by mass
Isocyanate group-terminated prepolymer B-2: 194.1 parts by mass
Urethane resin fine particles (product name: Art Pearl C-400, manufactured by Negami Chemical Industrial Co., Ltd.): 24.8 parts by mass
Carbon black (product name: TOKABLACK #4300, manufactured by Tokai Carbon Co., Ltd.): 12.4 parts by mass Comparative Examples 11 to 20

Charging rollers according to Comparative Examples 11 to 20 were each produced in the same manner as in Example 31 except that the kinds and blending amounts of the ionic compound, the inorganic particles, the polyol, the isocyanate group-terminated prepolymer, and the urethane resin fine particles were changed as shown in Table 15.

TABLE 15

|  | Ionic compound (part(s) by mass) | | Inorganic particles (part(s) by mass) | | Polyol (part(s) by mass) | | Isocyanate group-terminated prepolymer (part(s) by mass) | | Urethane resin fine particles (part(s) by mass) |
|---|---|---|---|---|---|---|---|---|---|
| Comparative Example 11 | I-27 | 18.5 | P-1 | 54.1 | A-1 | 100.0 | B-1 | 217.4 | 27.1 |
| Comparative Example 12 | I-15 | 14.7 | P-8 | 63.6 | A-1 | 100.0 | B-1 | 290.7 | 31.8 |
| Comparative Example 13 | I-20 | 18.1 | P-10 | 71.2 | A-1 | 100.0 | B-1 | 339.7 | 35.6 |
| Comparative Example 14 | I-21 | 15.5 | P-11 | 63.8 | A-1 | 100.0 | B-1 | 290.7 | 31.9 |
| Comparative Example 15 | I-15 | 14.7 | P-12 | 63.6 | A-1 | 100.0 | B-1 | 290.7 | 31.8 |
| Comparative Example 16 | I-23 | 16.7 | P-8 | 64.0 | A-1 | 100.0 | B-1 | 290.7 | 32.0 |
| Comparative Example 17 | I-24 | 17.0 | P-10 | 64.1 | A-1 | 100.0 | B-1 | 290.7 | 32.0 |
| Comparative Example 18 | I-25 | 15.3 | P-11 | 63.7 | A-1 | 100.0 | B-1 | 290.7 | 31.9 |
| Comparative Example 19 | I-1 | 17.3 | P-12 | 64.2 | A-1 | 100.0 | B-1 | 290.7 | 32.1 |
| Comparative Example 20 | I-7 | 17.3 | P-9 | 71.0 | A-1 | 100.0 | B-1 | 339.7 | 35.5 |

<Evaluation of Charging Roller>

The charging rollers according to Examples 31 to 36 and Comparative Examples 11 to 20 thus obtained were each evaluated for the following items. The evaluation results are collectively shown in Table 16 and Table 17.

[Measurement of Resistance Value of Roller]

As in the evaluation of a developing roller, each of the charging rollers was left to stand under a N/N environment and under an environment at 0° C. for 6 hours each, and then its resistance values were measured under the respective environments.

(Measurement of Resistance Value)

The measurement of the resistance value of the charging roller was performed with the same apparatus as that in the measurement of the resistance value of a developing roller described in the foregoing. However, the number of revolutions of the roller and an applied voltage at the time of the measurement were set to 30 rpm and 200 V, respectively. The measurement was performed in the same manner as in the case of the developing roller except the foregoing, and the resultant value was defined as the resistance value of the charging roller.

[Evaluation of Performance as Charging Roller]

(Evaluation of Horizontal Stripe Image Under Environment Having Temperature of 0° C.)

Fine stripe-like density unevenness may occur in a halftone image owing to an increase in resistance value of a charging roller. The unevenness is referred to as "horizontal stripe image". The horizontal stripe image tends to worsen as the resistance value increases, and tends to be conspicuous along with long-term utilization of the roller. An electrophotographic member was incorporated as the charging roller into a laser printer, and the following evaluation was performed.

Each of the charging rollers obtained in Examples 31 to 36 and Comparative Examples 11 to 20 was loaded as a charging roller into an electrophotographic laser printer (product name: HP Color Laserjet Enterprise CP4515dn, manufactured by Hewlett-Packard Company). The printer was placed in an environment at 0° C., and was then left to stand for 2 hours. Next, an endurance test in which an image having a print density of 4% (image in which horizontal lines each having a width of 2 dots were drawn at intervals of 50 dots in a direction perpendicular to the rotation direction of a photosensitive member) was continuously output was performed. In addition, after the image had been output on 24,000 sheets of paper, a halftone image (image in which horizontal lines each having a width of 1 dot were drawn at intervals of 2 dots in the direction perpendicular to the rotation direction of the photosensitive member) was output for an image check. The resultant image was visually observed, and the presence or absence of the occurrence of a horizontal stripe was evaluated.

Rank A: The level at which no horizontal stripe occurs.

Rank B: The level at which a horizontal stripe slightly occurs only in an end portion of the image.

Rank C: The level at which a horizontal stripe occurs in substantially a half region of the image, and is hence conspicuous.

TABLE 16

| | Roller resistance under N/N environment ($\Omega$) | Roller resistance at 0° C. ($\Omega$) | (Resistance at 0° C.)/ (resistance under N/N environment) | Horizontal stripe at 0° C. |
|---|---|---|---|---|
| Example 31 | $6.77 \times 10^6$ | $2.35 \times 10^7$ | 3.48 | A |
| Example 32 | $7.54 \times 10^6$ | $8.86 \times 10^7$ | 11.76 | A |
| Example 33 | $1.01 \times 10^7$ | $7.13 \times 10^7$ | 7.09 | A |
| Example 34 | $1.32 \times 10^7$ | $9.30 \times 10^7$ | 7.04 | A |
| Example 35 | $1.34 \times 10^7$ | $1.90 \times 10^8$ | 14.18 | B |
| Example 36 | $1.14 \times 10^7$ | $1.77 \times 10^8$ | 15.50 | B |
| Comparative Example 11 | $1.23 \times 10^7$ | $1.04 \times 10^9$ | 84.56 | C |
| Comparative Example 12 | $1.20 \times 10^7$ | $6.47 \times 10^8$ | 53.93 | C |
| Comparative Example 13 | $1.32 \times 10^7$ | $7.77 \times 10^8$ | 58.90 | C |
| Comparative Example 14 | $1.45 \times 10^7$ | $8.69 \times 10^8$ | 60.13 | C |
| Comparative Example 15 | $1.45 \times 10^7$ | $8.03 \times 10^8$ | 55.29 | C |
| Comparative Example 16 | $1.46 \times 10^7$ | $8.24 \times 10^8$ | 56.32 | C |
| Comparative Example 17 | $1.23 \times 10^7$ | $7.32 \times 10^8$ | 59.74 | C |
| Comparative Example 18 | $1.31 \times 10^7$ | $7.51 \times 10^8$ | 57.43 | C |
| Comparative Example 19 | $1.31 \times 10^7$ | $8.89 \times 10^8$ | 68.03 | C |

TABLE 16-continued

| | Roller resistance under N/N environment (Ω) | Roller resistance at 0° C. (Ω) | (Resistance at 0° C.)/ (resistance under N/N environment) | Horizontal stripe at 0° C. |
|---|---|---|---|---|
| Comparative Example 20 | $1.20 \times 10^7$ | $8.34 \times 10^8$ | 69.66 | C |

As shown in Table 16, each of the charging rollers according to Examples 31 to 36 showed a small increase in resistance value under a low-temperature environment having a temperature of, for example, 0° C., and satisfactorily maintained image quality because the resin layers of the rollers each contained a resin containing a specific cation structure, an anion, and inorganic particles having a hydrophobicity degree of 40% or more and 80% or less. In, for example, Example 31 and Comparative Example 12 in which the resin layers had the same composition except the inorganic particles, an increase in resistance value at low temperature in Example 31 in which the inorganic particles P-1 having a hydrophobicity degree of 60% were used was smaller than that in Comparative Example 12 in which the inorganic particles P-8 having a hydrophobicity degree of 10% were used. In addition, particularly in Example 31 in which a resin containing structures represented by the structural formulae (2) and (10), and the inorganic particles having a hydrophobicity degree of 60% and a primary particle diameter of 30 nm, and subjected to the hydrophobic treatment with the alkylsilane and the silicone oil were used, an increase in resistance value was suppressed at a higher level.

Meanwhile, in each of the charging rollers according to Comparative Examples 11 to 20 whose resin layers were each free of a specific cation structure or inorganic particles having a hydrophobicity degree of 40% or more and 80% or less, an increase in resistance value and the occurrence of a horizontal stripe were observed under a low-temperature environment.

[Measurement of Tack Value]
The measurement of the tack value of a charging roller was performed in the same manner as in the evaluation of a developing roller.

[Evaluation of Contamination of Surface of Charging Roller]
The evaluation of the contamination of the surface of a charging roller after image output was performed as an evaluation concerning the tackiness of the surface of the charging roller.

Each of the charging rollers obtained in Examples 31 to 36 and Comparative Examples 11 to 20 was loaded as a charging roller into an electrophotographic laser printer (product name: HP Color Laserjet Enterprise CP4515dn, manufactured by Hewlett-Packard Company). The printer was placed in an environment having a temperature of 30° C. and a relative humidity of 80%, and was then left to stand for 2 hours. Next, an endurance test in which an image having a print density of 4% (image in which horizontal lines each having a width of 2 dots were drawn at intervals of 50 dots in a direction perpendicular to the rotation direction of a photosensitive member) was continuously output on 24,000 sheets of paper was performed. After that, the charging roller was removed from the process cartridge, and the contamination of the charging roller was evaluated by the following method. Toner sticking onto the charging roller was peeled with an adhesive tape (product name: MENDING TAPE, manufactured by Sumitomo 3M Limited). The adhesive tape to which the toner had adhered was placed on plain paper, and its reflection density was measured with a reflection densitometer (product name: TC-6DS/A, manufactured by Tokyo Denshoku Co., Ltd.). In addition, as a control, an adhesive tape to which no toner adhered was similarly placed on plain paper, and its reflection density was similarly measured. Then, a difference in reflectance with respect to the reflection density of the adhesive tape to which no toner adhered was adopted as the value of a difference in coloring density. A smaller value of the difference in coloring density means that a state in which the contamination amount of the surface of the charging roller is reduced to a larger extent is established.

TABLE 17

| | Tack value (gf) | Difference in coloring density |
|---|---|---|
| Example 31 | 29 | 17.3 |
| Example 32 | 47 | 17.3 |
| Example 33 | 34 | 12.1 |
| Example 34 | 38 | 10.2 |
| Example 35 | 47 | 11.1 |
| Example 36 | 78 | 43.7 |

As shown in Table 17, the tack values of the resins according to Examples 31 to 35 were suppressed to relatively low levels because the resins each contained a specific structure represented by the structural formula (7) or (8). In addition, a difference in coloring density evaluated by using a charging roller containing the corresponding resin in its resin layer was also suppressed to a relatively low level.

Production of Developing Blade

Example 37

(Preparation of Substrate)
Stainless steel having a thickness of 0.08 mm (SUS304, manufactured by Nisshin Steel Co., Ltd.) was press-cut into dimensions measuring 200 mm long by 23 mm wide to prepare a stainless steel-made sheet (hereinafter referred to as "SUS sheet") as a substrate.

(Formation of Resin Layer)
The following materials were mixed and stirred as materials for a resin layer.
Ionic compound I-15: 14.7 parts by mass
Inorganic particles P-1: 63.6 parts by mass
Polyol A-1: 100.0 parts by mass
Isocyanate group-terminated prepolymer B-1: 290.7 parts by mass
Urethane resin fine particles (product name: "Art Pearl C-400", manufactured by Negami Chemical Industrial Co., Ltd.): 31.8 parts by mass
Next, methyl ethyl ketone was added to the mixed solution so as to achieve a total solid content ratio of 30 mass %, and then the contents were mixed in a sand mill. Then, the viscosity of the mixture was further adjusted to from 10 cps to 12 cps with methyl ethyl ketone. Thus, a paint for forming a resin layer was prepared.

As illustrated in FIG. 2A and FIG. 2B, the cut SUS sheet was immersed in the paint for forming a resin layer to form a coating film of the paint so as to have a length L from a longitudinal-side end of the SUS sheet of 1.5 mm, followed by drying. Further, the resultant was subjected to heating treatment at a temperature of 140° C. for 1 hour. Thus, a developing blade according to Example 37 including a resin layer having a thickness T of 10 μm on the longitudinal-side end surface of the SUS sheet was produced.

Examples 38 and 40 to 42

Developing blades according to Examples 38 and 40 to 42 were each produced in the same manner as in Example 37 except that the kinds and blending amounts of the ionic compound, the inorganic particles, the polyol, the isocyanate group-terminated prepolymer, and the urethane resin fine particles were changed as shown in Table 18.

TABLE 18

|  | Ionic compound (part(s) by mass) | | Inorganic particles (part(s) by mass) | | Polyol (part(s) by mass) | | Isocyanate group-terminated prepolymer (part(s) by mass) | | Urethane resin fine particles (part(s) by mass) |
|---|---|---|---|---|---|---|---|---|---|
| Example 38 | I-24 | 11.8 | P-1 | 44.7 | A-3 | 100.0 | B-3 | 159.9 | 22.4 |
| Example 40 | I-7 | 12.1 | P-3 | 49.6 | A-3 | 100.0 | B-3 | 194.1 | 24.8 |
| Example 41 | I-12 | 8.5 | P-4 | 44.1 | A-3 | 100.0 | B-3 | 159.9 | 22.0 |
| Example 42 | I-1 | 12.1 | P-4 | 44.8 | A-7 | 100.0 | B-7 | 159.9 | 22.4 |

Example 39

A developing blade according to Example 39 was produced in the same manner as in Example 37 except that the following materials serving as materials for a resin layer were mixed and stirred.
Ionic compound I-1: 12.1 parts by mass
Inorganic particles P-6: 33.6 parts by mass
Polyol A-3: 100.0 parts by mass
Isocyanate group-terminated prepolymer B-3: 159.9 parts by mass
Urethane resin fine particles (product name: Art Pearl C-400, manufactured by Negami Chemical Industrial Co., Ltd.): 22.4 parts by mass
Carbon black (product name: TOKABLACK #4300, manufactured by Tokai Carbon Co., Ltd.): 11.2 parts by mass Comparative Examples 21 to 30

Developing blades according to Comparative Examples 21 to 30 were each produced in the same manner as in Example 37 except that the kinds and blending amounts of the ionic compound, the inorganic particles, the polyol, the isocyanate group-terminated prepolymer and the urethane resin fine particles were changed as shown in Table 19.

<Evaluation of Developing Blade>

The developing blades according to Examples 37 to 42 and Comparative Examples 21 to 30 thus obtained were each evaluated for the following items. The evaluation results are collectively shown in Table 20 and Table 21.
[Measurement of Resistance Value of Blade]
Each of the developing blades was left to stand under a N/N environment and under an environment at 0° C. for 6 hours each, and then its resistance values were measured under the respective environments.
(Measurement of Resistance Value)
The measurement of the resistance value of the developing blade was performed with a resistance value fluctuation-evaluating jig illustrated in each of FIG. 5A and FIG. 5B as described below. The developing blade was used instead of the developing roller 16 in the jig illustrated in each of FIG. 5A and FIG. 5B. As illustrated in FIG. 5A, while substrate portions on both ends of the developing blade where no resin layer was formed were each pressed with a load of 4.9 N through the electroconductive bearing 38, the developing blade was fixed without the rotation of the columnar metal 37 having a diameter of 30 mm. Next, as illustrated in FIG. 5B, a voltage of 50 V was applied from the high-voltage power source 39, and a potential difference between both ends of a resistor having a known resistance value (having

TABLE 19

|  | Ionic compound (part(s) by mass) | | Inorganic particles (part(s) by mass) | | Polyol (part(s) by mass) | | Isocyanate group-terminated prepolymer (part(s) by mass) | | Urethane resin fine particles (part(s) by mass) |
|---|---|---|---|---|---|---|---|---|---|
| Comparative Example 21 | I-27 | 18.5 | P-1 | 54.1 | A-1 | 100.0 | B-1 | 217.4 | 27.1 |
| Comparative Example 22 | I-15 | 14.7 | P-8 | 63.6 | A-1 | 100.0 | B-1 | 290.7 | 31.8 |
| Comparative Example 23 | I-20 | 18.1 | P-10 | 71.2 | A-1 | 100.0 | B-1 | 339.7 | 35.6 |
| Comparative Example 24 | I-21 | 15.5 | P-11 | 63.8 | A-1 | 100.0 | B-1 | 290.7 | 31.9 |
| Comparative Example 25 | I-15 | 14.7 | P-12 | 63.6 | A-1 | 100.0 | B-1 | 290.7 | 31.8 |
| Comparative Example 26 | I-23 | 16.7 | P-8 | 64.0 | A-1 | 100.0 | B-1 | 290.7 | 32.0 |
| Comparative Example 27 | I-24 | 17.0 | P-10 | 64.1 | A-1 | 100.0 | B-1 | 290.7 | 32.0 |
| Comparative Example 28 | I-25 | 15.3 | P-11 | 63.7 | A-1 | 100.0 | B-1 | 290.7 | 31.9 |
| Comparative Example 29 | I-1 | 17.3 | P-12 | 64.2 | A-1 | 100.0 | B-1 | 290.7 | 32.1 |
| Comparative Example 30 | I-7 | 17.3 | P-9 | 71.0 | A-1 | 100.0 | B-1 | 339.7 | 35.5 | a resistance value lower than the resistance value of the developing blade by two orders of magnitude or more) placed between the columnar metal 37 and the ground was measured. The potential difference was measured by using a voltmeter 40 (product name: 189TRUE RMS MULTIMETER; manufactured by Fluke Corporation). A current that had flowed through the developing blade into the columnar metal 37 was determined by calculation based on the measured potential difference and the resistance value of the resistor. Then, the applied voltage of 50 V was divided by the resultant current to determine the resistance value of the developing blade. In the measurement of the potential difference, 2 seconds after the application of the voltage, sampling was performed for 3 seconds and a value calculated from the average value of the sampled data was defined as a blade resistance value.

[Evaluation of Performance as Developing Blade]

(Evaluation of Presence or Absence of Toner Aggregation Resulting from Regulation Failure of Developing Blade)

The developing blade obtained in each of Examples and Comparative Examples was loaded as the developing blade 21 into a process cartridge for a laser printer (product name: LBP7700C, manufactured by Canon Inc.) having a configuration illustrated in FIG. 4. The developing roller was not changed. Then, the process cartridge was incorporated into the laser printer. The printer was placed in an environment at 0° C., and was then left to stand for 2 hours. Next, a black image having a print percentage of 1% was continuously output on 100 sheets of paper. After that, a white solid image was output on new copier paper. After those images had been output, a state in which the surface of the developing blade was coated with toner was visually observed, and the presence or absence of electrostatic toner aggregation resulting from the charging abnormality of the toner was evaluated by the following criteria. When the regulation failure of the toner by the developing blade occurs, such an image detrimental effect as described below may occur: spot-like unevenness occurs in a non-printed portion, or a toner lump or the like occurs on an image.

Rank A: No regulation failure is present on the toner coat.
Rank B: A regulation failure is present on the toner coat, but does not appear in any image.
Rank C: A regulation failure appears in an image.

TABLE 20

| | Roller resistance under N/N environment (Ω) | Roller resistance at 0° C. (Ω) | (Resistance at 0° C.)/ (resistance under N/N environment) | Regulation failure at 0° C. |
|---|---|---|---|---|
| Example 37 | 7.22 × 10$^7$ | 5.95 × 10$^7$ | 8.24 | A |
| Example 38 | 8.45 × 10$^6$ | 6.26 × 10$^7$ | 7.42 | A |
| Example 39 | 1.15 × 10$^7$ | 1.65 × 10$^8$ | 14.34 | B |
| Example 40 | 1.16 × 10$^7$ | 1.00 × 10$^8$ | 8.70 | B |
| Example 41 | 1.23 × 10$^7$ | 1.57 × 10$^8$ | 12.78 | B |
| Example 42 | 1.21 × 10$^7$ | 1.69 × 10$^8$ | 13.94 | B |
| Comparative Example 21 | 1.19 × 10$^7$ | 1.06 × 10$^9$ | 88.79 | C |
| Comparative Example 22 | 1.48 × 10$^7$ | 8.55 × 10$^8$ | 57.88 | C |
| Comparative Example 23 | 1.43 × 10$^7$ | 9.13 × 10$^8$ | 63.93 | C |
| Comparative Example 24 | 1.28 × 10$^7$ | 7.97 × 10$^8$ | 62.44 | C |
| Comparative Example 25 | 1.38 × 10$^7$ | 7.78 × 10$^8$ | 56.55 | C |
| Comparative Example 26 | 1.32 × 10$^7$ | 8.50 × 10$^8$ | 64.55 | C |
| Comparative Example 27 | 1.41 × 10$^7$ | 7.83 × 10$^8$ | 55.58 | C |
| Comparative Example 28 | 1.20 × 10$^7$ | 7.75 × 10$^8$ | 64.88 | C |
| Comparative Example 29 | 1.42 × 10$^7$ | 9.31 × 10$^8$ | 65.60 | C |
| Comparative Example 30 | 1.21 × 10$^7$ | 8.33 × 10$^8$ | 68.85 | C |

As shown in Table 20, each of the developing blades according to Examples 37 to 42 showed a small increase in resistance value under a low-temperature environment having a temperature of, for example, 0° C., and satisfactory regulation failure evaluation because the resin layers of the blades each contained a resin containing a specific cation structure, an anion, and inorganic particles having a hydrophobicity degree of 40% or more and 80% or less. In, for example, Example 37 and Comparative Example 22 in which the resin layers had the same composition except the inorganic particles, an increase in resistance value at low temperature in Example 37 in which the inorganic particles P-1 having a hydrophobicity degree of 60% were used was smaller than that in Comparative Example 22 in which the inorganic particles P-8 having a hydrophobicity degree of 10% were used. In addition, particularly in Example 38 in which a resin containing structures represented by the structural formulae (5) and (12), and the inorganic particles P-1 having a hydrophobicity degree of 60% and a primary particle diameter of 30 nm, and subjected to the hydrophobic treatment with the alkylsilane and the silicone oil were used, an increase in resistance value was suppressed at a higher level.

Meanwhile, in each of the developing blades according to Comparative Examples 21 to 30 whose resin layers were each free of a specific cation structure or inorganic particles having a hydrophobicity degree of 40% or more and 80% or less, an increase in resistance value and the occurrence of a regulation failure were observed under a low-temperature environment.

[Measurement of Tack Value]

The measurement of the tack value of a developing blade was performed in the same manner as in the evaluation of a developing roller.

[Evaluation of Initial Sticking Density of Toner]

The following evaluation was performed as the evaluation of the initial sticking density of toner by using a developing blade whose resistance value had been measured. The developing blade obtained in each of Examples and Comparative Examples was loaded as the developing blade 21 into a yellow toner process cartridge for a laser printer (product name: LBP7700C, manufactured by Canon Inc.) having a configuration illustrated in FIG. 4. Then, an operation of outputting a white solid image was performed with the laser printer to establish a state in which the surface of the developing blade was coated with yellow toner. The developing blade in such state was removed from the yellow toner process cartridge. The removed developing blade was mounted on a polytetrafluoroethylene-made flat plate. The developing blade was brought into press contact with the flat plate at a load of 300 gf (a load of 150 gf on each of both ends of a mandrel), and was left to stand under an environment having a temperature of 40° C. and a relative humidity of 95% for 3 months. Next, the developing blade was released from the state of being in press contact with the flat plate, and was left at rest under an environment having a temperature of 25° C. and a relative humidity of 45% for 3 hours. After that, air was blown onto the press-contact surface of the developing blade. Herein, the air blowing was performed under the conditions of: an aperture of the nozzle of an air blow gun of 3 mm; a pressure of high-pressure air or a nitrogen gas of 0.6 MPa; a distance between the surface of the developing blade and the nozzle of 20 cm; a reciprocating movement speed of the gun in the longitudinal direction of the developing blade of 30 cm/s; and a blowing time of 20 s. Next, the toner that had stuck onto the developing blade was peeled with an adhesive tape (product name: MENDING TAPE, manufactured by Sumitomo 3M Limited). The adhesive tape to which the yellow toner had adhered was placed on plain paper, and its reflection density was measured with a reflection densitometer (product name: TC-6DS/A, manufactured by Tokyo Denshoku Co., Ltd.). In addition, as a control, an adhesive tape to which no toner adhered was similarly placed on plain paper, and its reflection density was similarly measured. Then, a reflectance reduction amount (%) was calculated with respect to the reflection density of the adhesive tape to which no toner adhered. The measurement was performed at a total of 3 points, that is, the central portion of the developing blade and both end portions thereof, and the arithmetic average value of the measured values was defined as the initial sticking density of the toner of the developing blade to be evaluated. It can be said that, as the initial sticking density becomes lower, the sticking of the toner to the surface of the developing blade can be suppressed to a larger extent.

TABLE 21

|  | Tack value (gf) | Initial sticking density (reflectance reduction amount) (%) |
|---|---|---|
| Example 37 | 32 | 1.1 |
| Example 38 | 49 | 0.6 |
| Example 39 | 27 | 1.4 |
| Example 40 | 43 | 1.1 |
| Example 41 | 43 | 0.6 |
| Example 42 | 81 | 5.2 |

As shown in Table 21, the tack values of the resins according to Examples 37 to 41 were suppressed to relatively low levels because the resins each contained a specific structure represented by the structural formula (7) or (8). In addition, a reduction in initial sticking density evaluated by using a developing roller containing the corresponding resin in its resin layer was also suppressed to a relatively low level.

Production of Toner-Supplying Roller

Example 43

As a substrate, a cored bar made of stainless steel (SUS304) having a diameter of 5 mm was placed in a mold, and a urethane rubber composition obtained by mixing the following materials was injected into a cavity formed in the mold.

Ionic compound I-15: 5.0 parts by mass
Inorganic particles P-1: 10.0 parts by mass
Polyol A-9: 84.2 parts by mass
Polyol A-10: 18.6 parts by mass
Isocyanate (product name: COSMONATE TM20; manufactured by Mitsui Chemical Industry Co., Ltd.): 22.7 parts by mass
Silicone foam stabilizer (product name: SRX274C, manufactured by Dow Corning Toray Silicone Co., Ltd.): 1.0 part by mass
Amine catalyst (product name: TOYOCAT-ET, manufactured by Tosoh Corporation): 0.3 part by mass
Amine catalyst (product name: TOYOCAT-L33, manufactured by Tosoh Corporation): 0.2 part by mass
Water: 2.0 parts by mass Subsequently, the mold was heated, and the urethane rubber composition was vulcanized at a temperature of 50° C. for 20 minutes to be foamed and cured. The substrate having a polyurethane foam layer on the peripheral surface thereof was removed from the mold. Thus, a toner-supplying roller according to Example 43 including a polyurethane foam layer having a diameter of 16.1 mm formed on the outer periphery of the substrate was produced.

Examples 44, 45, 47, and 48

Toner-supplying rollers according to Examples 44, 45, 47, and 48 were each produced in the same manner as in Example 43 except that the kinds and blending amounts of the ionic compound and the inorganic particles were changed as shown in Table 22.

TABLE 22

|  | Ionic compound (part(s) by mass) | | Inorganic particles (part(s) by mass) | |
|---|---|---|---|---|
| Example 44 | I-25 | 5.2 | P-1 | 10.0 |
| Example 45 | I-1 | 5.9 | P-3 | 10.0 |
| Example 47 | I-12 | 4.1 | P-4 | 10.0 |
| Example 48 | I-1 | 5.9 | P-4 | 10.0 |

Example 46

A toner-supplying roller according to Example 46 was produced in the same manner as in Example 43 except that the following materials serving as materials for a resin layer were mixed and stirred.

Ionic compound I-7: 5.3 parts by mass
Inorganic particles P-3: 7.0 parts by mass
Polyol A-9: 84.2 parts by mass
Polyol A-10: 18.6 parts by mass
Isocyanate (product name: COSMONATE TM20; manufactured by Mitsui Chemical Industry Co., Ltd.): 22.7 parts by mass
Silicone foam stabilizer (product name: SRX274C, manufactured by Dow Corning Toray Silicone Co., Ltd.): 1.0 part by mass
Amine catalyst (product name: TOYOCAT-ET, manufactured by Tosoh Corporation): 0.3 part by mass
Amine catalyst (product name: TOYOCAT-L33, manufactured by Tosoh Corporation): 0.2 part by mass
Water: 2.0 parts by mass
Carbon black (product name: TOKABLACK #4300, manufactured by Tokai Carbon Co., Ltd.): 3.0 parts by mass Reference Example 1

A toner-supplying roller according to Reference Example 1 was produced in the same manner as in Example 43 except that the following materials serving as materials for a resin layer were mixed and stirred.

Ionic compound I-15: 5.0 parts by mass
Polyol A-9: 84.2 parts by mass
Polyol A-10: 18.6 parts by mass
Isocyanate (product name: COSMONATE TM20; manufactured by Mitsui Chemical Industry Co., Ltd.): 22.7 parts by mass
Silicone foam stabilizer (product name: SRX274C, manufactured by Dow Corning Toray Silicone Co., Ltd.): 1.0 part by mass
Amine catalyst (product name: TOYOCAT-ET, manufactured by Tosoh Corporation): 0.3 part by mass
Amine catalyst (product name: TOYOCAT-L33, manufactured by Tosoh Corporation): 0.2 part by mass
Water: 2.0 parts by mass Reference Example 2

A toner-supplying roller according to Reference Example 2 was produced in the same manner as in Example 43 except that the following materials serving as materials for a resin layer were mixed and stirred.

Ionic compound I-15: 5.0 parts by mass
Polyol (product name: EP-3033, manufactured by Mitsui Chemical Industry Co., Ltd.): 100.0 parts by mass
Isocyanate (product name: COSMONATE TM20; manufactured by Mitsui Chemical Industry Co., Ltd.): 23.6 parts by mass
Silicone foam stabilizer (product name: SRX274C, manufactured by Dow Corning Toray Silicone Co., Ltd.): 1.0 part by mass
Amine catalyst (product name: TOYOCAT-ET, manufactured by Tosoh Corporation): 0.3 part by mass
Amine catalyst (product name: TOYOCAT-L33, manufactured by Tosoh Corporation): 0.2 part by mass
Water: 2.0 parts by mass Comparative Examples 31 to 40

Toner-supplying rollers according to Comparative Examples 31 to 40 were each produced in the same manner as in Example 43 except that the kinds and blending amounts of the ionic compound and the inorganic particles were changed as shown in Table 23.

TABLE 23

|  | Ionic compound (part(s) by mass) |  | Inorganic particles (part(s) by mass) |  |
| --- | --- | --- | --- | --- |
| Comparative Example 31 | I-27 | 7.6 | P-1 | 10.0 |
| Comparative Example 32 | I-15 | 5.0 | P-8 | 10.0 |
| Comparative Example 33 | I-20 | 5.5 | P-10 | 10.0 |
| Comparative Example 34 | I-21 | 5.3 | P-11 | 10.0 |
| Comparative Example 35 | I-15 | 5.0 | P-12 | 10.0 |
| Comparative Example 36 | I-23 | 5.7 | P-8 | 10.0 |
| Comparative Example 37 | I-24 | 5.8 | P-10 | 10.0 |
| Comparative Example 38 | I-25 | 5.2 | P-11 | 10.0 |
| Comparative Example 39 | I-1 | 5.9 | P-12 | 10.0 |
| Comparative Example 40 | I-7 | 5.3 | P-9 | 10.0 |

<Evaluation of Toner-Supplying Roller>

The toner-supplying rollers according to Examples 43 to 48, Reference Examples 1 and 2, and Comparative Examples 31 to 40 thus obtained were each evaluated for the following items. The evaluation results are collectively shown in Table 24.

[Measurement of Resistance Value of Roller]

As in the evaluation of a developing roller, each of the toner-supplying rollers was left to stand under a N/N environment and under an environment at 0° C. for 6 hours each, and then its resistance values were measured under the respective environments.

(Evaluation of Resistance Value)

The resistance value of the toner-supplying roller was measured by using the same apparatus as that in the measurement of the resistance value of the developing roller described above. The load to be applied to both ends of the substrate was set to 2.5 N, and the number of revolutions of the roller during the measurement was set to 32 rpm. The measurement was performed in the same manner as in the case of the developing roller except the foregoing, and the resultant value was defined as the resistance value of the toner-supplying roller.

[Evaluation of Performance as Toner-Supplying Roller]

(Evaluation of Regulation Failure)

The toner-supplying roller obtained in each of Examples and Comparative Examples was loaded into a process cartridge for a laser printer (product name: LBP7700C, manufactured by Canon Inc.) having a configuration illustrated in FIG. 4. Then, the process cartridge was incorporated into the laser printer. The printer was placed in an environment at 0° C., and was then left to stand for 2 hours. Next, a black image having a print percentage of 1% was continuously output on 100 sheets of paper. After that, a white solid image was output on new copier paper. After those images had been output, a state in which the surface of the developing blade was coated with toner was observed, and the presence or absence of electrostatic toner aggregation (regulation failure) resulting from the charging abnormality of the toner was visually observed. Evaluation criteria for the evaluation of the regulation failure are as described below. When the regulation failure occurs, such an image detrimental effect as described below may occur: spot-like unevenness occurs in a non-printed portion, or a toner lump or the like occurs on an image.

Rank A: No regulation failure is present on the toner coat.
Rank B: A regulation failure is present on the toner coat, but does not appear in any image.
Rank C: A regulation failure appears in an image.

TABLE 24

|  | Roller resistance under N/N environment ($\Omega$) | Roller resistance at 0° C. ($\Omega$) | (Resistance at 0° C.)/ (resistance under N/N environment) | Regulation failure at 0° C. |
| --- | --- | --- | --- | --- |
| Example 43 | $8.05 \times 10^6$ | $6.80 \times 10^7$ | 8.45 | A |
| Example 44 | $1.00 \times 10^7$ | $1.23 \times 10^8$ | 12.25 | B |

TABLE 24-continued

| | Roller resistance under N/N environment (Ω) | Roller resistance at 0° C. (Ω) | (Resistance at 0° C.)/ (resistance under N/N environment) | Regulation failure at 0° C. |
|---|---|---|---|---|
| Example 45 | $9.97 \times 10^6$ | $1.31 \times 10^8$ | 13.09 | B |
| Example 46 | $1.21 \times 10^7$ | $1.82 \times 10^8$ | 15.05 | B |
| Example 47 | $1.22 \times 10^7$ | $1.96 \times 10^8$ | 16.11 | B |
| Example 48 | $1.26 \times 10^7$ | $2.21 \times 10^8$ | 17.56 | B |
| Reference Example 1 | $1.07 \times 10^7$ | $9.84 \times 10^7$ | 9.23 | A |
| Reference Example 2 | $8.16 \times 10^6$ | $8.56 \times 10^7$ | 10.50 | A |
| Comparative Example 31 | $1.21 \times 10^7$ | $1.06 \times 10^9$ | 87.74 | C |
| Comparative Example 32 | $1.21 \times 10^7$ | $6.58 \times 10^8$ | 54.39 | C |
| Comparative Example 33 | $1.30 \times 10^7$ | $8.21 \times 10^8$ | 63.34 | C |
| Comparative Example 34 | $1.35 \times 10^7$ | $8.90 \times 10^8$ | 65.77 | C |
| Comparative Example 35 | $1.29 \times 10^7$ | $6.94 \times 10^8$ | 53.98 | C |
| Comparative Example 36 | $1.38 \times 10^7$ | $8.65 \times 10^8$ | 62.87 | C |
| Comparative Example 37 | $1.48 \times 10^7$ | $8.75 \times 10^8$ | 59.25 | C |
| Comparative Example 38 | $1.26 \times 10^7$ | $7.98 \times 10^8$ | 63.25 | C |
| Comparative Example 39 | $1.30 \times 10^7$ | $8.79 \times 10^8$ | 67.86 | C |
| Comparative Example 40 | $1.36 \times 10^7$ | $9.75 \times 10^8$ | 71.55 | C |

As shown in Table 24, each of the toner-supplying rollers according to Examples 43 to 48 showed a small increase in resistance value under a low-temperature environment having a temperature of, for example, 0° C., and satisfactory regulation failure evaluation because the resin layers of the rollers each contained a resin containing a specific cation structure, an anion, and inorganic particles having a hydrophobicity degree of 40% or more and 80% or less. In, for example, Example 43 and Comparative Example 32 in which the resin layers had the same composition except the inorganic particles, an increase in resistance value at low temperature in Example 43 in which the inorganic particles P-1 having a hydrophobicity degree of 60% were used was smaller than that in Comparative Example 32 in which the inorganic particles P-8 having a hydrophobicity degree of 10% were used. In addition, particularly in Example 43 in which a resin containing structures represented by the structural formulae (2) and (10), and the inorganic particles P-1 having a hydrophobicity degree of 60% or more and a primary particle diameter of 30 nm, and subjected to the hydrophobic treatment with the alkylsilane and the silicone oil were used, an increase in resistance value was suppressed at a higher level.

Meanwhile, in each of the toner-supplying rollers according to Comparative Examples 31 to 40 whose resin layers were each free of a specific cation structure or inorganic particles having a hydrophobicity degree of 40% or more and 80% or less, an increase in resistance value and the occurrence of a regulation failure were observed under a low-temperature environment.

In each of Reference Examples 1 and 2 each of which was free of inorganic particles, anion migration inhibition did not occur, and hence an increase in resistance value and the occurrence of a regulation failure under a low-temperature environment were absent.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142811, filed Jul. 30, 2018, which is hereby incorporated by reference herein in its entirety.

What is claimed is:

1. An electrophotographic member comprising:
an electroconductive substrate; and
a resin layer on the electroconductive substrate,
wherein the resin layer contains
an anion,
inorganic particles, wherein a hydrophobicity degree calculated from the inorganic particles extracted from the resin layer is 40% or more and 80% or less, and
a resin having at least one cation structure selected from the group consisting of structures represented by the structural formulae (1) to (6):

Structural formula (1)

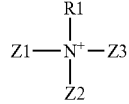

in the structural formula (1),
R1 represents a hydrogen atom or a hydrocarbon group having 1 to 4 carbon atoms,
Z1 to Z3 each independently represent any one structure selected from the group consisting of structures represented by the structural formulae (Z101) to (Z103), or a hydrocarbon group having 1 to 4 carbon atoms, and
at least one of Z1 to Z3 represents any one structure selected from the group consisting of the structures represented by the structural formulae (Z101) to (Z103);

Structural formula (2)

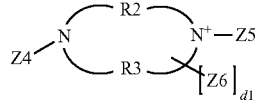

in the structural formula (2),
R2 and R3 each represent a hydrocarbon group needed for forming a nitrogen-containing heteroaromatic five-membered ring together with nitrogen atoms to which the hydrocarbon group is bonded,
Z4 and Z5 each independently represent any one structure selected from the group consisting of the structures represented by the structural formulae (Z101) to (Z103), a hydrogen atom, or a hydrocarbon group having 1 to 4 carbon atoms, and Z6 represents any one structure selected from the group consisting of the structures represented by the structural formulae (Z101) to (Z103), a hydrogen atom, or a hydrocarbon group having 1 to 4 carbon atoms,
at least one of Z4 to Z6 represents any one structure selected from the group consisting of the structures represented by the structural formulae (Z101) to (Z103), and d1 represents an integer of 0 or 1;

Structural formula (3)

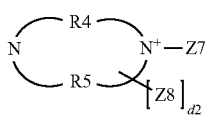

in the structural formula (3),
R4 and R5 each represent a hydrocarbon group needed for forming a nitrogen-containing heteroaromatic six-membered ring together with nitrogen atoms to which the hydrocarbon group is bonded,
Z7 represents any one structure selected from the group consisting of the structures represented by the structural formulae (Z101) to (Z103), a hydrogen atom, or a hydrocarbon group having 1 to 4 carbon atoms,
Z8 represents any one structure selected from the group consisting of the structures represented by the structural formulae (Z101) to (Z103), a hydrogen atom, or a hydrocarbon group having 1 to 4 carbon atoms,
at least one of Z7 or Z8 represents any one structure selected from the group consisting of the structures represented by the structural formulae (Z101) to (Z103), and
d2 represents an integer of from 0 to 2, and when d2 represents 2, Z8s may be identical to or different from each other;

Structural formula (4)

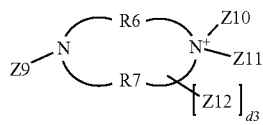

in the structural formula (4),
R6 and R7 each represent a hydrocarbon group needed for forming a nitrogen-containing heteroalicyclic group together with nitrogen atoms to which the hydrocarbon group is bonded,
Z9 to Z11 each independently represent any one structure selected from the group consisting of the structures represented by the structural formulae (Z101) to (Z103), a hydrogen atom, or a hydrocarbon group having 1 to 4 carbon atoms,
Z12 represents any one structure selected from the group consisting of the structures represented by the structural formulae (Z101) to (Z103), a hydrogen atom, or a hydrocarbon group having 1 to 4 carbon atoms,
at least one of Z9 to Z12 represents any one structure selected from the group consisting of the structures represented by the structural formulae (Z101) to (Z103), and
d3 represents an integer of from 0 to 2, and when d3 represents 2, Z12s may be identical to or different from each other;

Structural formula (5)

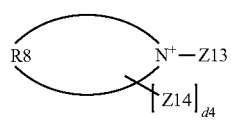

in the structural formula (5),
R8 represents a hydrocarbon group needed for forming a nitrogen-containing aromatic ring together with a nitrogen atom to which the hydrocarbon group is bonded,
Z13 represents any one structure selected from the group consisting of the structures represented by the structural formulae (Z101) to (Z103), a hydrogen atom, or a hydrocarbon group having 1 to 4 carbon atoms,
Z14 represents any one structure selected from the group consisting of the structures represented by the structural formulae (Z101) to (Z103), a hydrogen atom, or a hydrocarbon group having 1 to 4 carbon atoms,
at least one of Z13 or Z14 represents any one structure selected from the group consisting of the structures represented by the structural formulae (Z101) to (Z103), and
d4 represents an integer of 0 or 1;

Structural formula (6)

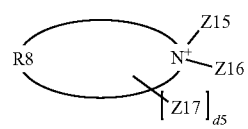

in the structural formula (6),
R9 represents a hydrocarbon group needed for forming a nitrogen-containing alicyclic group together with a nitrogen atom to which the hydrocarbon group is bonded,
Z15 and Z16 each independently represent any one structure selected from the group consisting of the structures represented by the structural formulae (Z101) to (Z103), a hydrogen atom, or a hydrocarbon group having 1 to 4 carbon atoms,
Z17 represents any one structure selected from the group consisting of the structures represented by the structural formulae (Z101) to (Z103), a hydrogen atom, or a hydrocarbon group having 1 to 4 carbon atoms,
at least one of Z15 to Z17 represents any one structure selected from the group consisting of the structures represented by the structural formulae (Z101) to (Z103), and
d5 represents an integer of 0 or 1;

Structural formula (Z101)

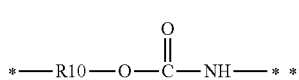

Structural formula (Z102)

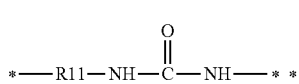

Structural formula (Z103)

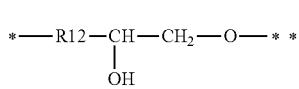

in the structural formulae (Z101), (Z102), and (Z103),
R10, R11, and R12 each independently represent a linear or branched divalent hydrocarbon group,
symbol "*" represents a bonding site with a nitrogen atom in the structural formula (1), or a bonding site with a nitrogen atom in a nitrogen-containing heterocycle in any one of the structural formulae (2) to (6) or with a carbon atom in the nitrogen-containing heterocycle, and symbol "**" represents a bonding site with a carbon atom in a polymer chain forming the resin having the cation structure.

2. The electrophotographic member according to claim 1, wherein the resin having the cation structure further has at least one structure selected from the group consisting of structures represented by the structural formulae (7) to (9):

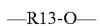  Structural formula (7)

in the structural formula (7), R13 represents a linear or branched divalent hydrocarbon group having 4 to 6 carbon atoms;

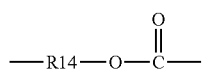  Structural formula (8)

in the structural formula (8), R14 represents a linear or branched divalent hydrocarbon group having 4 to 8 carbon atoms;

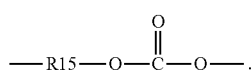  Structural formula (9)

in the structural formula (9), R15 represents a linear or branched divalent hydrocarbon group having 5 to 8 carbon atoms.

3. The electrophotographic member according to claim 1, wherein the anion comprises at least one selected from the group consisting of a fluoroalkylsulfonylimide anion, a fluorosulfonylimide anion, a fluoroalkylsulfonate anion, a fluorosulfonate anion, a fluoroalkylcarboxylic acid anion, a fluoroalkylmethide anion, a fluoroboric acid anion, a fluorophosphoric acid anion, a dicyanamide anion, and a thiocyanate anion.

4. The electrophotographic member according to claim 1, wherein the inorganic particles having a hydrophobicity degree of 40% or more and 80% or less comprise silica particles.

5. The electrophotographic member according to claim 1, wherein the structure represented by the structural formula (2) comprises a structure represented by the structural formula (10):

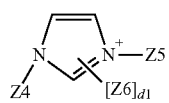  Structural formula (10)

in the structural formula (10), Z4, Z5, Z6, and d1 are identical to those of the structural formula (2).

6. The electrophotographic member according to claim 1, wherein the structure represented by the structural formula (4) comprises a structure represented by the structural formula (11):

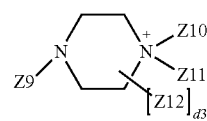  Structural formula (11)

in the structural formula (11), Z9, Z10, Z1, Z12, and d3 are identical to those of the structural formula (4).

7. The electrophotographic member according to claim 1, wherein the structure represented by the structural formula (5) comprises a structure represented by the structural formula (12):

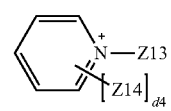  Structural formula (12)

in the structural formula (12), Z113, Z114, and d4 are identical to those of the structural formula (5).

8. The electrophotographic member according to claim 1, wherein the structure represented by the structural formula (6) comprises a structure represented by the structural formula (13):

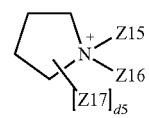  Structural formula (13)

in the structural formula (13), Z15, Z16, Z17, and d5 are identical to those of the structural formula (6).

9. A process cartridge, which is removably mounted onto a main body of an electrophotographic image-forming apparatus, the process cartridge comprising at least one unit selected from the group consisting of a charging unit, a developing unit, and a cleaning unit, at least one of the unit including an electrophotographic member,
wherein the electrophotographic member includes an electroconductive substrate and a resin layer on the electroconductive substrate,
wherein the resin layer contains
an anion,
inorganic particles, wherein a hydrophobicity degree calculated from the inorganic particles extracted from the resin layer is 40% or more and 80% or less, and
a resin having at least one cation structure selected from the group consisting of structures represented by the structural formulae (1) to (6):

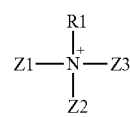  Structural formula (1)

in the structural formula (1),
R1 represents a hydrogen atom or a hydrocarbon group having 1 to 4 carbon atoms, Z1 to Z3 each independently represent any one structure selected from the group consisting of structures represented by the structural formulae (Z101) to (Z103), or a hydrocarbon group having 1 to 4 carbon atoms, and at least one of Z1 to Z3 represents any one structure selected from the group consisting of the structures represented by the structural formulae (Z101) to (Z103);

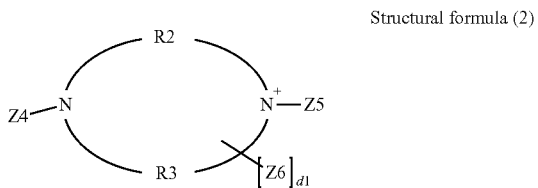

Structural formula (2)

in the structural formula (2),

R2 and R3 each represent a hydrocarbon group needed for forming a nitrogen-containing heteroaromatic five-membered ring together with nitrogen atoms to which the hydrocarbon group is bonded, Z4 and Z5 each independently represent any one structure selected from the group consisting of the structures represented by the structural formulae (Z101) to (Z103), a hydrogen atom, or a hydrocarbon group having 1 to 4 carbon atoms, and Z6 represents any one structure selected from the group consisting of the structures represented by the structural formulae (Z101) to (Z103), a hydrogen atom, or a hydrocarbon group having 1 to 4 carbon atoms, at least one of Z4 to Z6 represents any one structure selected from the group consisting of the structures represented by the structural formulae (Z101) to (Z103), and d1 represents an integer of 0 or 1;

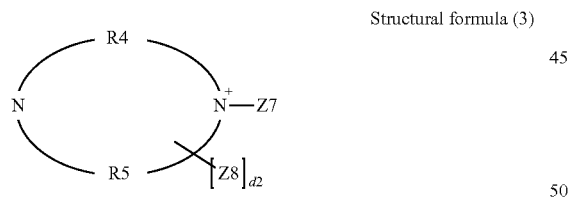

Structural formula (3)

in the structural formula (3),

R4 and R5 each represent a hydrocarbon group needed for forming a nitrogen-containing heteroaromatic six-membered ring together with nitrogen atoms to which the hydrocarbon group is bonded, Z7 represents any one structure selected from the group consisting of the structures represented by the structural formulae (Z101) to (Z103), a hydrogen atom, or a hydrocarbon group having 1 to 4 carbon atoms, Z8 represents any one structure selected from the group consisting of the structures represented by the structural formulae (Z101) to (Z103), a hydrogen atom, or a hydrocarbon group having 1 to 4 carbon atoms, at least one of Z7 or Z8 represents any one structure selected from the group consisting of the structures represented by the structural formulae (Z101) to (Z103), and d2 represents an integer of from 0 to 2, and when d2 represents 2, Z8s may be identical to or different from each other;

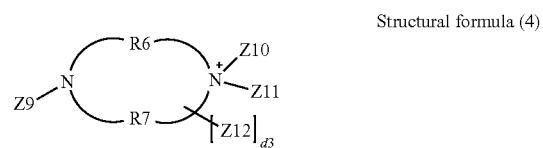

Structural formula (4)

in the structural formula (4),

R6 and R7 each represent a hydrocarbon group needed for forming a nitrogen-containing heteroalicyclic group together with nitrogen atoms to which the hydrocarbon group is bonded, Z9 to Z11 each independently represent any one structure selected from the group consisting of the structures represented by the structural formulae (Z101) to (Z103), a hydrogen atom, or a hydrocarbon group having 1 to 4 carbon atoms, Z12 represents any one structure selected from the group consisting of the structures represented by the structural formulae (Z101) to (Z103), a hydrogen atom, or a hydrocarbon group having 1 to 4 carbon atoms, at least one of Z9 to Z12 represents any one structure selected from the group consisting of the structures represented by the structural formulae (Z101) to (Z103), and d3 represents an integer of from 0 to 2, and when d3 represents 2, Z12s may be identical to or different from each other;

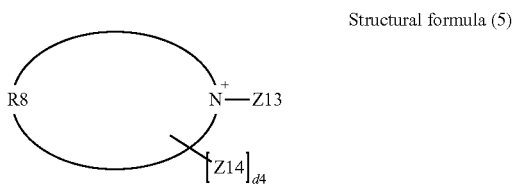

Structural formula (5)

in the structural formula (5),

R8 represents a hydrocarbon group needed for forming a nitrogen-containing aromatic ring together with a nitrogen atom to which the hydrocarbon group is bonded, Z13 represents any one structure selected from the group consisting of the structures represented by the structural formulae (Z101) to (Z103), a hydrogen atom, or a hydrocarbon group having 1 to 4 carbon atoms, Z14 represents any one structure selected from the group consisting of the structures represented by the structural formulae (Z101) to (Z103), a hydrogen atom, or a hydrocarbon group having 1 to 4 carbon atoms, at least one of Z13 or Z14 represents any one structure selected from the group consisting of the structures represented by the structural formulae (Z101) to (Z103), and d4 represents an integer of 0 or 1;

Structural formula (6)

$$R9 \diagup \overset{N^+ \diagup Z15}{\underset{[Z17]_{d5}}{\diagdown Z16}}$$

in the structural formula (6),

R9 represents a hydrocarbon group needed for forming a nitrogen-containing alicyclic group together with a nitrogen atom to which the hydrocarbon group is bonded, Z15 and Z16 each independently represent any one structure selected from the group consisting of the structures represented by the structural formulae (Z101) to (Z103), a hydrogen atom, or a hydrocarbon group having 1 to 4 carbon atoms, Z17 represents any one structure selected from the group consisting of the structures represented by the structural formulae (Z101) to (Z103), a hydrogen atom, or a hydrocarbon group having 1 to 4 carbon atoms, at least one of Z15 to Z17 represents any one structure selected from the group consisting of the structures represented by the structural formulae (Z101) to (Z103), and d5 represents an integer of 0 or 1;

Structural formula (Z101)

$$*-R10-O-\overset{O}{\underset{\|}{C}}-NH-**$$

Structural formula (Z102)

$$*-R11-NH-\overset{O}{\underset{\|}{C}}-NH-**$$

Structural formula (Z103)

$$*-R12-\underset{OH}{\underset{|}{CH}}-CH_2-O-**$$

in the structural formulae (Z101), (Z102), and (Z103),

R10, R11, and R12 each independently represent a linear or branched divalent hydrocarbon group, symbol "*" represents a bonding site with a nitrogen atom in the structural formula (1), or a bonding site with a nitrogen atom in a nitrogen-containing heterocycle in any one of the structural formulae (2) to (6) or with a carbon atom in the nitrogen-containing heterocycle, and symbol "**" represents a bonding site with a carbon atom in a polymer chain forming the resin having the cation structure.

10. An electrophotographic image-forming apparatus comprising at least one unit selected from the group consisting of a charging unit, a developing unit, and a cleaning unit, at least one of the unit including an electrophotographic member, wherein the electrophotographic member includes an electroconductive substrate and a resin layer on the electroconductive substrate, wherein the resin layer contains an anion, inorganic particles, wherein a hydrophobicity degree calculated from the inorganic particles extracted from the resin layer is 40% or more and 80% or less, and a resin having at least one cation structure selected from the group consisting of structures represented by the structural formulae (1) to (6):

Structural formula (1)

$$Z1-\underset{Z2}{\overset{R1}{\underset{|}{\overset{|}{N^+}}}}-Z3$$

in the structural formula (1),

R1 represents a hydrogen atom or a hydrocarbon group having 1 to 4 carbon atoms, Z1 to Z3 each independently represent any one structure selected from the group consisting of structures represented by the structural formulae (Z101) to (Z103), or a hydrocarbon group having 1 to 4 carbon atoms, and at least one of Z1 to Z3 represents any one structure selected from the group consisting of the structures represented by the structural formulae (Z101) to (Z103);

Structural formula (2)

$$Z4-N\underset{R3}{\overset{R2}{\diagup\diagdown}}N^+-Z5$$
$$[Z6]_{d1}$$

in the structural formula (2),

R2 and R3 each represent a hydrocarbon group needed for forming a nitrogen-containing heteroaromatic five-membered ring together with nitrogen atoms to which the hydrocarbon group is bonded, Z4 and Z5 each independently represent any one structure selected from the group consisting of the structures represented by the structural formulae (Z101) to (Z103), a hydrogen atom, or a hydrocarbon group having 1 to 4 carbon atoms, and Z6 represents any one structure selected from the group consisting of the structures represented by the structural formulae (Z101) to (Z103), a hydrogen atom, or a hydrocarbon group having 1 to 4 carbon atoms, at least one of Z4 to Z6 represents any one structure selected from the group consisting of the structures represented by the structural formulae (Z101) to (Z103), and d1 represents an integer of 0 or 1;

Structural formula (3)

$$N\underset{R5}{\overset{R4}{\diagup\diagdown}}N^+-Z7$$
$$[Z8]_{d2}$$

in the structural formula (3),

R4 and R5 each represent a hydrocarbon group needed for forming a nitrogen-containing heteroaromatic six-membered ring together with nitrogen atoms to which the hydrocarbon group is bonded, Z7 represents any one structure selected from the group consisting of the structures represented by the structural formulae (Z101) to (Z103), a hydrogen atom, or a hydrocarbon group having 1 to 4 carbon atoms, Z8 represents any one structure selected from the group consisting of the structures represented by the structural formulae (Z101) to (Z103), a hydrogen atom, or a hydrocarbon group having 1 to 4 carbon atoms, at least one of Z7 or Z8 represents any one structure selected from the group consisting of the structures represented by the structural formulae (Z101) to (Z103), and d2 represents an integer of from 0 to 2, and when d2 represents 2, Z8s may be identical to or different from each other;

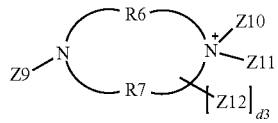

Structural formula (4)

in the structural formula (4),

R6 and R7 each represent a hydrocarbon group needed for forming a nitrogen-containing heteroalicyclic group together with nitrogen atoms to which the hydrocarbon group is bonded, Z9 to Z11 each independently represent any one structure selected from the group consisting of the structures represented by the structural formulae (Z101) to (Z103), a hydrogen atom, or a hydrocarbon group having 1 to 4 carbon atoms, Z12 represents any one structure selected from the group consisting of the structures represented by the structural formulae (Z101) to (Z103), a hydrogen atom, or a hydrocarbon group having 1 to 4 carbon atoms, at least one of Z9 to Z12 represents any one structure selected from the group consisting of the structures represented by the structural formulae (Z101) to (Z103), and d3 represents an integer of from 0 to 2, and when d3 represents 2, Z12s may be identical to or different from each other;

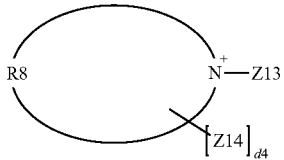

Structural formula (5)

in the structural formula (5),

R8 represents a hydrocarbon group needed for forming a nitrogen-containing aromatic ring together with a nitrogen atom to which the hydrocarbon group is bonded, Z13 represents any one structure selected from the group consisting of the structures represented by the structural formulae (Z101) to (Z103), a hydrogen atom, or a hydrocarbon group having 1 to 4 carbon atoms, Z14 represents any one structure selected from the group consisting of the structures represented by the structural formulae (Z101) to (Z103), a hydrogen atom, or a hydrocarbon group having 1 to 4 carbon atoms, at least one of Z13 or Z14 represents any one structure selected from the group consisting of the structures represented by the structural formulae (Z101) to (Z103), and d4 represents an integer of 0 or 1;

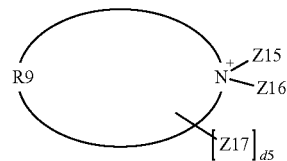

Structural formula (6)

in the structural formula (6),

R9 represents a hydrocarbon group needed for forming a nitrogen-containing alicyclic group together with a nitrogen atom to which the hydrocarbon group is bonded, Z15 and Z16 each independently represent any one structure selected from the group consisting of the structures represented by the structural formulae (Z101) to (Z103), a hydrogen atom, or a hydrocarbon group having 1 to 4 carbon atoms, Z17 represents any one structure selected from the group consisting of the structures represented by the structural formulae (Z101) to (Z103), a hydrogen atom, or a hydrocarbon group having 1 to 4 carbon atoms, at least one of Z15 to Z17 represents any one structure selected from the group consisting of the structures represented by the structural formulae (Z101) to (Z103), and d5 represents an integer of 0 or 1;

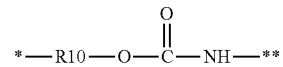

Structural formula (Z101)

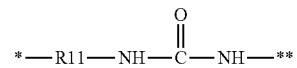

Structural formula (Z102)

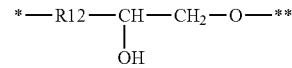

Structural formula (Z103)

in the structural formulae (Z101), (Z102), and (Z103),

R10, R11, and R12 each independently represent a linear or branched divalent hydrocarbon group, symbol "*" represents a bonding site with a nitrogen atom in the structural formula (1), or a bonding site with a nitrogen atom in a nitrogen-containing heterocycle in any one of the structural formulae (2) to (6) or with a carbon atom in the nitrogen-containing heterocycle, and symbol "**" represents a bonding site with a carbon atom in a polymer chain forming the resin having the cation structure.

* * * * *